(12) United States Patent
Goren et al.

(10) Patent No.: US 12,736,635 B2
(45) Date of Patent: Sep. 15, 2026

(54) EYE SAFE LIDAR SYSTEM WITH VARIABLE RESOLUTION MULTI-BEAM SCANNING

(71) Applicant: INNOVIZ TECHNOLOGIES LTD., Rosh Ha'Ayin (IL)

(72) Inventors: Nir Goren, Herut (IL); Ronen Eshel, Herzliya (IL)

(73) Assignee: INNOVIZ TECHNOLOGIES LTD., Rosh Ha'Ayin (IL)

( * ) Notice: Subject to any disclaimer, the term of this patent is extended or adjusted under 35 U.S.C. 154(b) by 871 days.

(21) Appl. No.: 18/156,194

(22) Filed: Jan. 18, 2023

(65) Prior Publication Data

US 2024/0241225 A1 Jul. 18, 2024

(51) Int. Cl.
*G01S 7/48* (2006.01)
*G01S 7/481* (2006.01)
*G01S 7/4865* (2020.01)

(52) U.S. Cl.
CPC .......... *G01S 7/4817* (2013.01); *G01S 7/4865* (2013.01)

(58) Field of Classification Search
USPC .......................................................... 356/5.01
See application file for complete search history.

(56) References Cited

U.S. PATENT DOCUMENTS 7,544,945 B2 6/2009 Tan et al.
10,302,749 B2 5/2019 Droz et al.
10,514,462 B2 * 12/2019 Englard ............... G05D 1/0221
10,983,197 B1 4/2021 Zhu et al.
11,194,048 B1 12/2021 Burbank et al.
11,353,559 B2 6/2022 Campbell et al.
11,675,053 B2 * 6/2023 Zhang .................... G02B 26/10 356/5.01

(Continued)

FOREIGN PATENT DOCUMENTS

DE 102017127582 A1 4/2019
JP 2020-126065 A 8/2020

(Continued)

OTHER PUBLICATIONS

Office Action, dated Jul. 22, 2022, issued in U.S. Appl. No. 17/668,045.

(Continued)

*Primary Examiner* — James R Hulka
(74) *Attorney, Agent, or Firm* — Meitar Patents Ltd.; Daniel Kligler

(57) ABSTRACT

A LIDAR system may have a laser emission unit configured to generate a plurality of laser beams. The LIDAR system may also have an optical system configured to transmit the plurality of laser beams from the laser emission unit to a common scanning unit. The common scanning unit may be configured to project the plurality of laser beams towards a first set of spaced apart locations of a field of view of the LIDAR system. The first set of spaced apart locations may be associated with a first plurality of parallel scan lines traversing the field of view. The common scanning unit may also be configured to simultaneously scan the field of view along the first plurality of scan lines by sequentially illuminating non-contiguous segments in a first set of non-contiguous segments of the field of view positioned along the first plurality of scan lines.

28 Claims, 29 Drawing Sheets

(56) References Cited

U.S. PATENT DOCUMENTS

| | | | | |
|---|---|---|---|---|
| 11,971,488 | B2 * | 4/2024 | Eshel | G01S 7/4865 |
| 11,977,169 | B2 * | 5/2024 | Eshel | G01S 7/4812 |
| 12,379,503 | B2 * | 8/2025 | Eshel | G01S 17/931 |
| 12,429,564 | B2 * | 9/2025 | Moscovici | G01S 17/58 |
| 2007/0181810 | A1 | 8/2007 | Tan et al. | |
| 2008/0170282 | A1 | 7/2008 | Amada et al. | |
| 2010/0046953 | A1 | 2/2010 | Shaw et al. | |
| 2011/0298820 | A1 | 12/2011 | Hajjar | |
| 2017/0289524 | A1 | 10/2017 | Pacala et al. | |
| 2017/0307736 | A1 | 10/2017 | Donovan | |
| 2018/0062345 | A1 | 3/2018 | Bills et al. | |
| 2018/0081037 | A1 | 3/2018 | Medina et al. | |
| 2018/0081038 | A1 | 3/2018 | Medina et al. | |
| 2018/0100928 | A1 | 4/2018 | Keilaf et al. | |
| 2018/0113200 | A1 | 4/2018 | Steinberg et al. | |
| 2018/0113216 | A1 | 4/2018 | Kremier et al. | |
| 2018/0284224 | A1 | 10/2018 | Weed et al. | |
| 2018/0284286 | A1 | 10/2018 | Eichenholz et al. | |
| 2019/0107607 | A1 | 4/2019 | Danzinger | |
| 2019/0178988 | A1 | 6/2019 | Englard et al. | |
| 2019/0265336 | A1 | 8/2019 | Zhang et al. | |
| 2019/0310375 | A1 | 10/2019 | Finkelstein et al. | |
| 2019/0331772 | A1 | 10/2019 | Qiu et al. | |
| 2019/0383911 | A1 | 12/2019 | Zhang et al. | |
| 2020/0103506 | A1 | 4/2020 | Kamil et al. | |
| 2020/0348418 | A1 | 11/2020 | Sutton et al. | |
| 2021/0356601 | A1 | 11/2021 | Burbank et al. | |
| 2022/0187471 | A1 * | 6/2022 | Eshel | G01S 17/89 |
| 2022/0276345 | A1 * | 9/2022 | Eshel | G01S 7/4814 |
| 2022/0276348 | A1 * | 9/2022 | Eshel | G01S 7/4817 |
| 2022/0342047 | A1 * | 10/2022 | Moscovici | G01S 7/484 |
| 2024/0264313 | A1 * | 8/2024 | Eshel | G01S 17/42 |

FOREIGN PATENT DOCUMENTS

| | | | |
|---|---|---|---|
| KR | 10-2016-0146820 | A | 12/2016 |
| WO | 2021014210 | A1 | 1/2021 |
| WO | 2022-053874 | A2 | 3/2022 |

OTHER PUBLICATIONS

Office Action, dated Nov. 18, 2022, issued in U.S. Appl. No. 17/668,045.

Office Action, dated Jun. 30, 2022, issued in U.S. Appl. No. 17/686,499.

Office Action, dated Nov. 22, 2022, issued in U.S. Appl. No. 17/686,499.

Partial Search Report and Provisional Opinion, dated Feb. 14, 2022, issued in International Patent Application No. PCT/IB/2021/000698 (9 pages).

International Search Report and Written Opinion in International Application No. PCT/IB2023/000737, Apr. 25, 2024, (11 pages).

* cited by examiner

1500

| | | | | | | |
|---|---|---|---|---|---|---|
| c | 1A | 2A | 1B | 2B | 1C | 2C |
| d | 3A | 4A | 3B | 4B | 3C | 4C |
| e | 5A | 6A | 5B | 6B | 5C | 6C |
| f | 1A | 2A | 1B | 2B | 1C | 2C |
| g | 3A | 4A | 3B | 4B | 3C | 4C |
| h | 5A | 6A | 5B | 6B | 5C | 6C |

| | | | | | | |
|---|---|---|---|---|---|---|
| c | 1A | 2A | 1B | 2B | 1C | 2C |
| d | 4A | 3A | 4B | 3B | 4C | 3C |
| e | 5A | 6A | 5B | 6B | 5C | 6C |
| f | 1A | 2A | 1B | 2B | 1C | 2C |
| g | 4A | 3A | 4B | 3B | 4C | 3C |
| h | 5A | 6A | 5B | 6B | 5C | 6C |

FIG. 15C

| 1A | 2A | 1B | 2B | 1C | 2C |
|---|---|---|---|---|---|
| 3A | 4A | 3B | 4B | 3C | 4C |
| 5A | 6A | 5B | 6B | 5C | 6C |
| 1A | 2A | 1B | 2B | 1C | 2C |
| 3A | 4A | 3B | 4B | 3C | 4C |
| 5A | 6A | 5B | 6B | 5C | 6C |

FIG. 20A

| 1A | 2A | 1B | 2B | 1C | 2C |
|---|---|---|---|---|---|
| 3A | 4A | 3B | 4B | 3C | 4C |
| 5A | 6A | 5B | 6B | 5C | 6C |
| 1A | 2A | 1B | 2B | 1C | 2C |
| 3A | 4A | 3B | 4B | 3C | 4C |
| 5A | 6A | 5B | 6B | 5C | 6C |

FIG. 20B

| 1A | 2A | 1B | 2B | 1C | 2C |
|---|---|---|---|---|---|
| 3A | 4A | 3B | 4B | 3C | 4C |
| 5A | 6A | 5B | 6B | 5C | 6C |
| 1A | 2A | 1B | 2B | 1C | 2C |
| 3A | 4A | 3B | 4B | 3C | 4C |
| 5A | 6A | 5B | 6B | 5C | 6C |

FIG. 20C

| 1A | 2A | 1B | 2B | 1C | 2C |
|---|---|---|---|---|---|
| 3A | 4A | 3B | 4B | 3C | 4C |
| 5A | 6A | 5B | 6B | 5C | 6C |
| 1A | 2A | 1B | 2B | 1C | 2C |
| 3A | 4A | 3B | 4B | 3C | 4C |
| 5A | 6A | 5B | 6B | 5C | 6C |

FIG. 20D

EYE SAFE LIDAR SYSTEM WITH VARIABLE RESOLUTION MULTI-BEAM SCANNING

TECHNICAL FIELD

The present disclosure relates generally to technology for scanning a surrounding environment and, for example, to systems and methods that use LIDAR technology to detect objects in the surrounding environment.

BACKGROUND

With the advent of driver assist systems and autonomous vehicles, automobiles need to be equipped with systems capable of reliably sensing and interpreting their surroundings, including identifying obstacles, hazards, objects, and other physical parameters that might impact navigation of the vehicle. To this end, a number of differing technologies have been suggested including radar, LIDAR, camera-based systems, operating alone or in a redundant manner.

One consideration with driver assistance systems and autonomous vehicles is an ability of the system to determine surroundings across different conditions including, rain, fog, darkness, bright light, and snow. A light detection and ranging system, (LIDAR a/k/a LADAR) is an example of technology that can work well in differing conditions, by measuring distances to objects by illuminating objects with light and measuring the reflected pulses with a sensor. A laser is one example of a light source that can be used in a LIDAR system. An electro-optical system such as a LIDAR system may include a light deflector for projecting light emitted by a light source into the environment of the electro-optical system. The light deflector may be controlled to pivot around at least one axis for projecting the light into a desired location in the field of view of the electro-optical system. It may be desirable to design improved systems and methods for determining the position and/or orientation of the light deflector for controlling and/or monitoring the movement of the light deflector with precision.

The systems and methods of the present disclosure are directed towards improving performance of monitoring the position and/or orientation of a light deflector used in electro-optical systems.

SUMMARY

In an embodiment, a LIDAR system is disclosed. The LIDAR system may include a laser emission unit configured to generate a plurality of laser beams; and an optical system configured to transmit the plurality of laser beams received from the laser emission unit towards a common scanning unit. The common scanning unit may be configured to project the plurality of laser beams towards a first set of spaced apart locations of a field of view of the LIDAR system, the first set of spaced apart locations being associated with a first plurality of parallel scan lines traversing the field of view. The common scanning unit may also be configured to simultaneously scan the field of view along the first plurality of scan lines by sequentially illuminating non-contiguous segments in a first set of non-contiguous segments of the field of view positioned along the first plurality of scan lines.

In an embodiment, a method of operating a LIDAR system is disclosed. The method may include generating, using a laser emission unit, a plurality of laser beams. The method may also include transmitting, using an optical system, the plurality of laser beams received from the laser emission unit towards a common scanning unit. Further, the method may include projecting, using the common scanning unit, the plurality of laser beams towards a first set of spaced apart locations of a field of view of the LIDAR system. The first set of spaced apart locations may be associated with a first plurality of parallel scan lines traversing the field of view. The method may include simultaneously scanning, using the common scanning unit, the field of view along the first plurality of scan lines by sequentially illuminating a first set of non-contiguous segments of the field of view positioned along the first plurality of scan lines.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 15B illustrates an example of a plurality of segments of the field of view disposed along one or more of scan lines of FIG. 15A consistent with some embodiments of the present disclosure.

FIG. 15C illustrates another example of a plurality of segments of the field of view disposed along one or more of scan lines of FIG. 15A consistent with some embodiments of the present disclosure.

FIGS. 18A and 18B illustrate exemplary graphs showing a number of points or pulses per second emitted in a region of interest and in regions outside the region of interest consistent with some embodiments of the present disclosure.

FIGS. 20A, 20B, 20B, and 20D illustrate exemplary schemes for using the high and low energy pulses to illuminate non-contiguous segments of the field of view consistent with some embodiments of the present disclosure.

DETAILED DESCRIPTION

Figure 1:
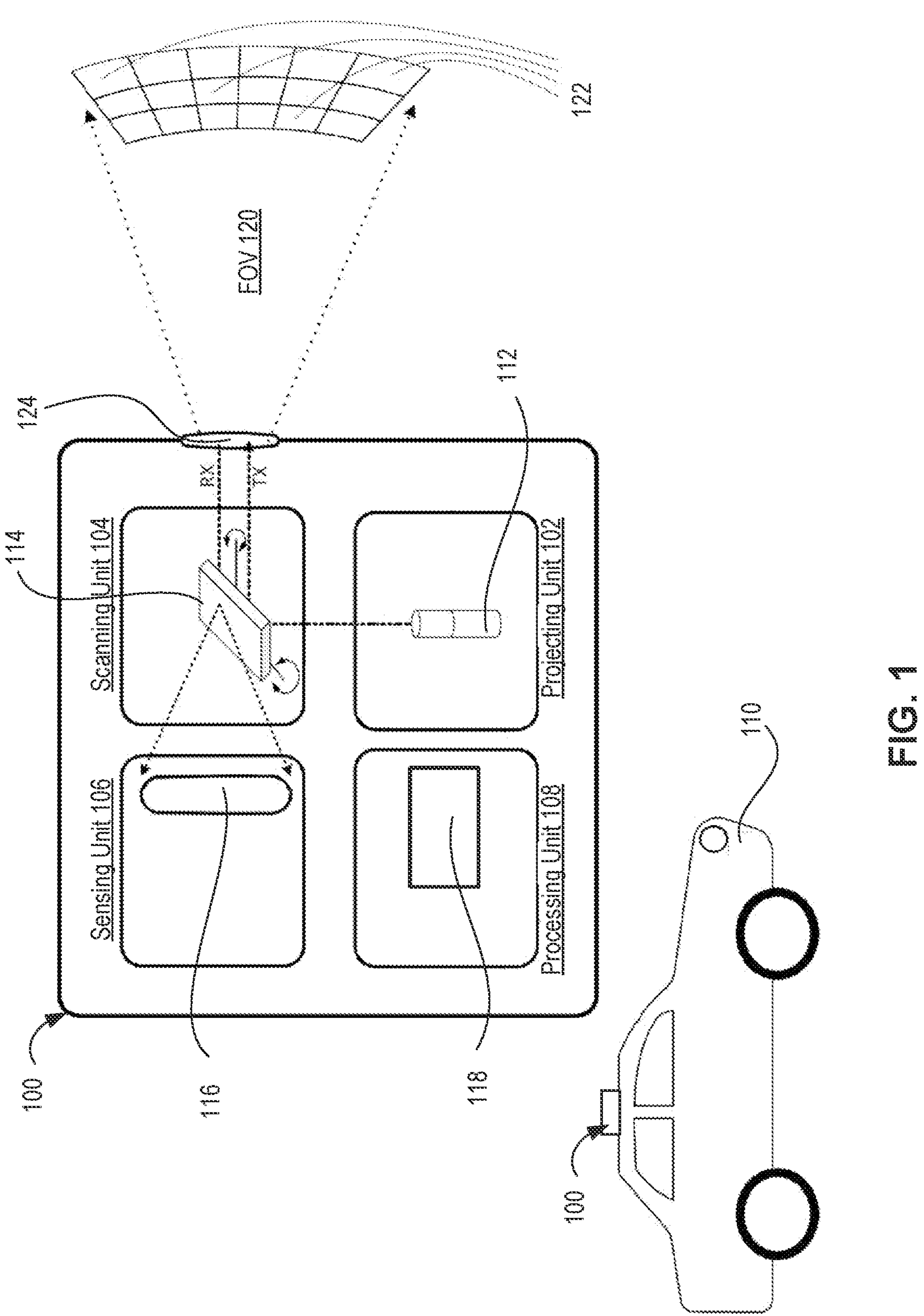
FIG. 1 is a diagram illustrating an exemplary LIDAR system consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Terms Definitions

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g., number of meters, number of inches, number of kilometers, number of millimeters), a number of arbitrary length units (e.g., number of LIDAR system lengths), a ratio between the distance to another length (e.g., a ratio to a length of an object detected in a field of view of the LIDAR system), an amount of time (e.g., given as standard unit, arbitrary units or ratio, for example, the time it takes light to travel between the tangible objects), one or more locations (e.g., specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g., by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g., location information (e.g., relative positions) between the projection location, the detection location of the signal (especially if distanced from one another), and more.

In some embodiments, the LIDAR system may be used for detecting a plurality of objects in an environment of the LIDAR system. The term "detecting an object in an environment of the LIDAR system" broadly includes generating information which is indicative of an object that reflected light toward a detector associated with the LIDAR system. If more than one object is detected by the LIDAR system, the generated information pertaining to different objects may be interconnected, for example a car is driving on a road, a bird is sitting on the tree, a man touches a bicycle, a van moves towards a building. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25°, 50°, 100°, 180°, etc.), and up to a predefined vertical elevation (e.g., ±10°, ±20°, ±40°-20°, ±90° or 0°-90°).

As used herein, the term "detecting an object" may broadly refer to determining an existence of the object (e.g., an object may exist in a certain direction with respect to the LIDAR system and/or to another reference location, or an object may exist in a certain spatial volume). Additionally or alternatively, the term "detecting an object" may refer to determining a distance between the object and another location (e.g., a location of the LIDAR system, a location on earth, or a location of another object). Additionally or alternatively, the term "detecting an object" may refer to identifying the object (e.g., classifying a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with 0.1°×0.1° or 0.3°×0.3° of the field of view.

Consistent with the present disclosure, the term "object" broadly includes a finite composition of matter that may reflect light from at least a portion thereof. For example, an object may be at least partially solid (e.g., cars, trees); at least partially liquid (e.g., puddles on the road, rain); at least partly gaseous (e.g., fumes, clouds); made from a multitude of distinct particles (e.g., sand storm, fog, spray); and may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side opposing the LIDAR system will be detected); in other cases, light may be projected on only part of the object (e.g., laser beam projected onto a road or a building); in other cases, the object may be partly blocked by another object between the LIDAR system and the detected object; in other cases, the LIDAR's sensor may only detects light reflected from a portion of the object, e.g., because ambient light or other interferences interfere with detection of some portions of the object.

Consistent with the present disclosure, a LIDAR system may be configured to detect objects by scanning the environment of LIDAR system. The term "scanning the environment of LIDAR system" broadly includes illuminating the field of view or a portion of the field of view of the LIDAR system. In one example, scanning the environment of LIDAR system may be achieved by moving or pivoting a light deflector to deflect light in differing directions toward different parts of the field of view. In another example, scanning the environment of LIDAR system may be achieved by changing a positioning (i.e. location and/or orientation) of a sensor with respect to the field of view. In another example, scanning the environment of LIDAR system may be achieved by changing a positioning (i.e. location and/or orientation) of a light source with respect to the field of view. In yet another example, scanning the environment of LIDAR system may be achieved by changing the positions of at least one light source and of at least one sensor to move rigidly respect to the field of view (i.e. the relative distance and orientation of the at least one sensor and of the at least one light source remains).

As used herein the term "field of view of the LIDAR system" may broadly include an extent of the observable environment of LIDAR system in which objects may be detected. It is noted that the field of view (FOV) of the LIDAR system may be affected by various conditions such as but not limited to: an orientation of the LIDAR system (e.g., is the direction of an optical axis of the LIDAR system); a position of the LIDAR system with respect to the environment (e.g., distance above ground and adjacent topography and obstacles); operational parameters of the LIDAR system (e.g., emission power, computational settings, defined angles of operation), etc. The field of view of LIDAR system may be defined, for example, by a solid angle (e.g., defined using $\phi$, $\theta$ angles, in which $\phi$ and $\theta$ are angles defined in perpendicular planes, e.g., with respect to symmetry axes of the LIDAR system and/or its FOV). In one example, the field of view may also be defined within a certain range (e.g., up to 200 m).

Similarly, the term "instantaneous field of view" may broadly include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, LIDAR system may be configured to scan scenes in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g., earth, roads, grass, sidewalks, road surface marking), sky, man-made objects (e.g., vehicles, buildings, signs), vegetation, people, animals, light projecting elements (e.g., flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g., a triangle mesh). The terms "point cloud" and "point cloud model" are widely known in the art, and should be construed to include a set of data points located spatially in some coordinate system (i.e., having an identifiable location in a space described by a respective coordinate system). The term "point cloud point" refer to a point in space (which may be dimensionless, or a miniature cellular space, e.g., 1 $cm^3$), and whose location may be described by the point cloud model using a set of coordinates (e.g., (X,Y,Z), (r,φ,θ)). By way of example only, the point cloud model may store additional information for some or all of its points (e.g., color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes.

Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR system may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR system may include at least one scanning unit with at least one light deflector configured to deflect light from the light source in order to scan the field of view. The term "light deflector" broadly includes any mechanism or module which is configured to make light deviate from its original path; for example, a mirror, a prism, controllable lens, a mechanical mirror, mechanical scanning polygons, active diffraction (e.g., controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g., a mirror), at least one refracting element (e.g., a prism, a lens), and so on. In one example, the light deflector may be movable, to cause light to deviate to differing degrees (e.g., discrete degrees, or over a continuous span of degrees). The light deflector may optionally be controllable in different ways (e.g., deflect to a degree a, change deflection angle by $\Delta\alpha$, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., θ and φ coordinates). Alternatively or in addition, the light deflector may optionally be operable to change an angle of deflection between predetermined settings (e.g., along a predefined scanning route) or otherwise. With respect the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A and 3B.

Disclosed embodiments may involve pivoting the light deflector in order to scan the field of view. As used herein the term "pivoting" broadly includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementations, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure it considered to be pivoted. In other embodiments, some types of light deflectors (e.g., non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term “instantaneous position of the light deflector” (also referred to as “state of the light deflector”) broadly refers to the location or position in space where at least one controlled component of the light deflector is situated at an instantaneous point in time, or over a short span of time. In one embodiment, the instantaneous position of light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g., mirror, prism), usually to a limited degree with respect to the maximal degree of change during a scanning of the field of view. For example, a scanning of the entire the field of view of the LIDAR system may include changing deflection of light over a span of 30°, and the instantaneous position of the at least one light deflector may include angular shifts of the light deflector within 0.05°. In other embodiments, the term “instantaneous position of the light deflector” may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR system may include at least one sensing unit with at least one sensor configured to detect reflections from objects in the field of view. The term “sensor” broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g., atmospheric temperature, rain, etc.). In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 μm and about 50 μm, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR system may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store information representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIG. 5.

System Overview

FIG. 1 illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination vehicle without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and watercraft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

It should be noted that LIDAR system 100 or any of its components may be used together with any of the example embodiments and methods disclosed herein. Further, while some aspects of LIDAR system 100 are described relative to an exemplary vehicle-based LIDAR platform, LIDAR system 100, any of its components, or any of the processes described herein may be applicable to LIDAR systems of other platform types.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflections signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1, LIDAR system 100 may include a single scanning unit 104 mounted on a roof vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting a multiple LIDAR systems 100 on vehicle 110, each with a single scanning unit 104. It is nevertheless noted that the one or more LIDAR systems 100 do not have to provide a complete 360° field of view, and that narrower fields of view may be useful in some situations. For example, vehicle 110 may require a first LIDAR system 100 having a field of view of 75° looking ahead of the vehicle, and possibly a second LIDAR system 100 with a similar FOV looking backward (optionally with a lower detection range). It is also noted that different vertical field of view angles may also be implemented.

The Projecting Unit

Figure 2A:
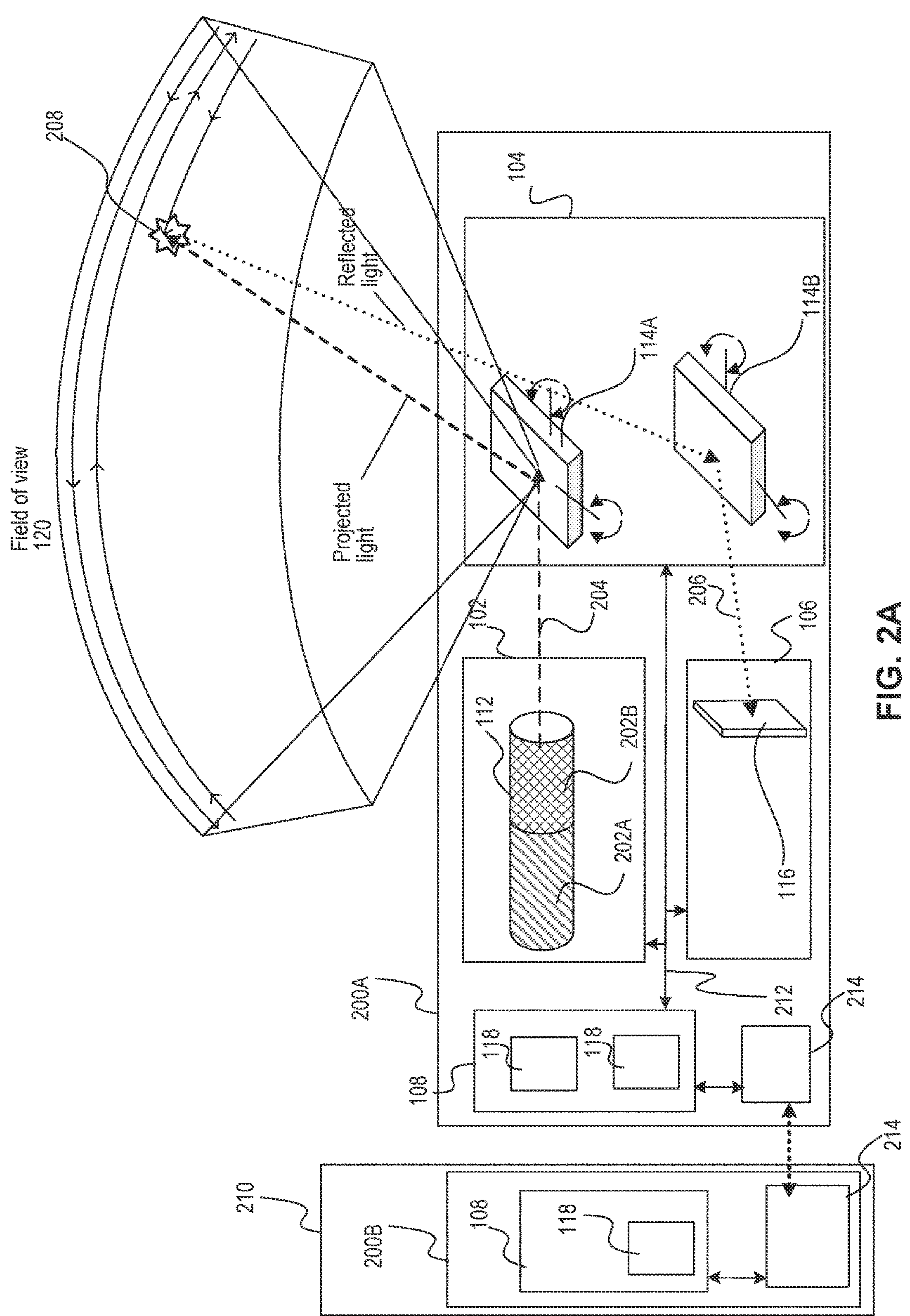
FIGS. 2A and 2B are diagrams illustrating different configurations of projecting units in accordance with some embodiments of the present disclosure.
Figure 2B:
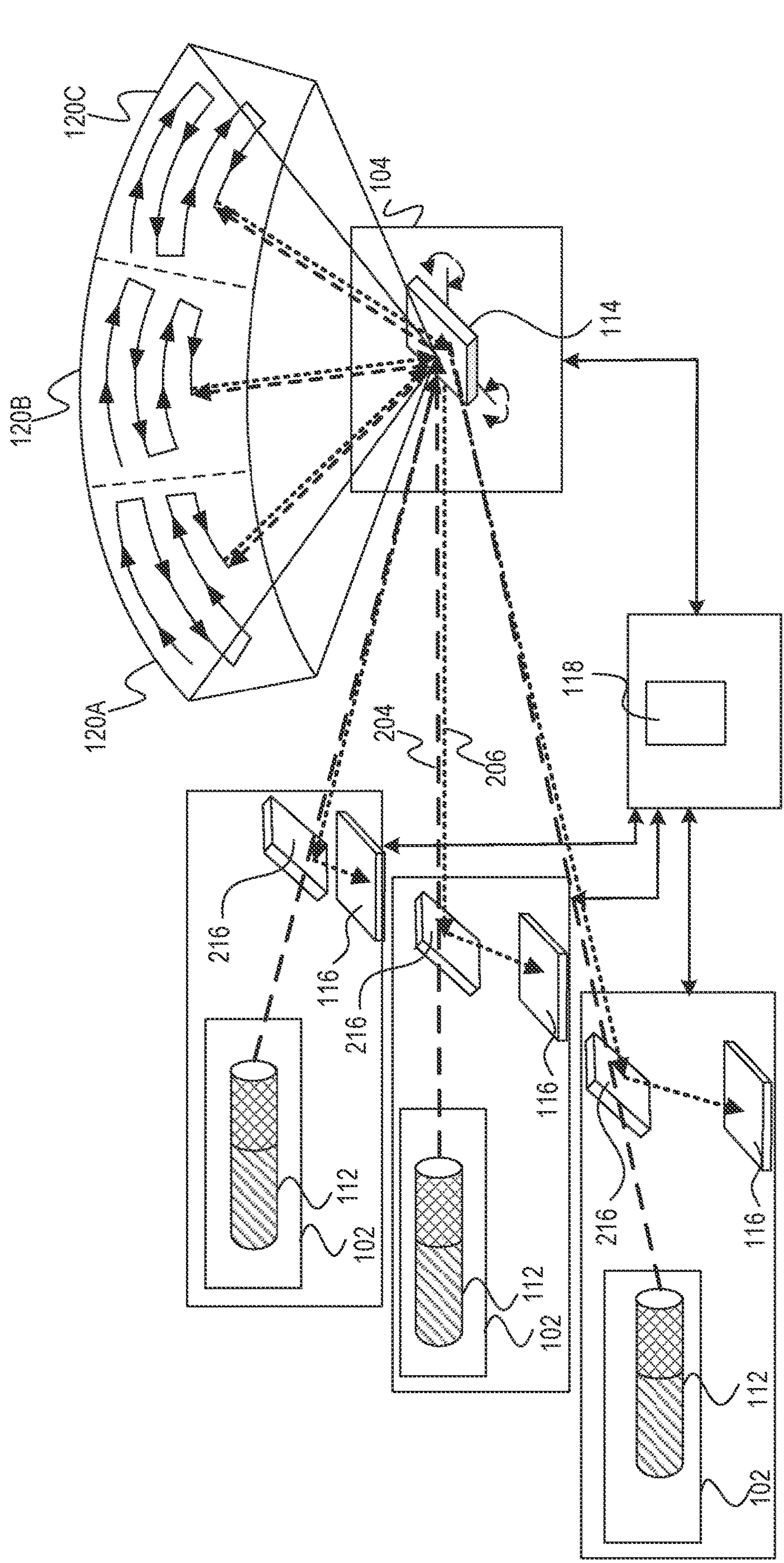

FIGS. 2A and 2B depict various configurations of projecting unit 102 and its role in LIDAR system 100. Specifically, FIG. 2A is a diagram illustrating projecting unit 102 with a single light source; and FIG. 2B is a diagram illustrating a plurality of projecting units 102 with a plurality of light sources aimed at a common light deflector 114. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration" broadly refers to LIDAR systems configurations in which the projected light exiting the LIDAR system and the reflected light entering the LIDAR system pass through substantially different optical paths. In some embodiments, a bi-static configuration of LIDAR system 100 may include a separation of the optical paths by using completely different optical components, by using parallel but not fully separated optical components, or by using the same optical components for only part of the of the optical paths (optical components may include, for example, windows, lenses, mirrors, beam splitters, etc.). In the example depicted in FIG. 2A, the bi-static configuration includes a configuration where the outbound light and the inbound light pass through a single optical window 124 but scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources).

In this embodiment, all the components of LIDAR system 100 may be contained within a single housing 200, or may be divided among a plurality of housings. As shown, projecting unit 102 is associated with a single light source 112 that includes a laser diode 202A (or one or more laser diodes coupled together) configured to emit light (projected light 204). In one non-limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g., for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 also include a pivotable return deflector 114B that direct photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such computing environment may include at least one processor and/or may be connected LIDAR system 100 via the cloud. In some embodiments, host 210 may also include interfaces to external devices such as camera and sensors configured to measure different characteristics of host 210 (e.g., acceleration, steering wheel deflection, reverse drive, etc.). Consistent with the present disclosure, LIDAR system 100 may be fixed to a stationary object associated with host 210 (e.g., a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g., cameras, microphones, radar systems). In one example, LIDAR system 100 may be used by a security system.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated service digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In another embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR system configurations in which the projected light exiting from the LIDAR system and the reflected light entering the LIDAR system pass through substantially similar optical paths. In one example, the outbound light beam and the inbound light beam may share at least one optical assembly through which both outbound and inbound light beams pass. In another example, the outbound light may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hits an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical 216 may include an optical isolator that allows the passage of light in only one direction. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 102 may project light with differing wavelengths, and all the light sources 112 may be directed to the same portion (or overlapping portions) of field of view 120.

The Scanning Unit

Figure 3A:
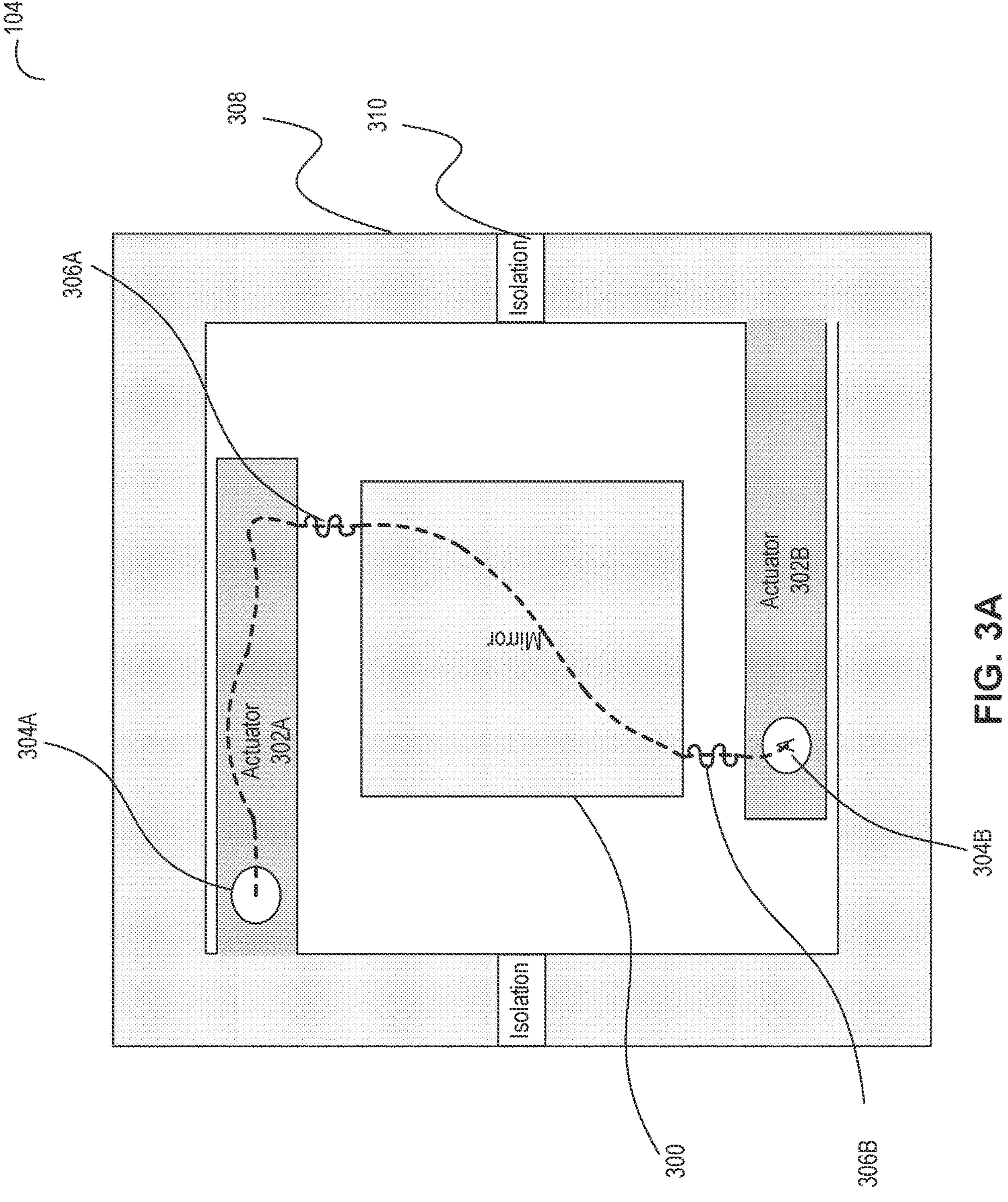
FIGS. 3A and 3B are diagrams illustrating different configurations of scanning units in accordance with some embodiments of the present disclosure.
Figure 3B:
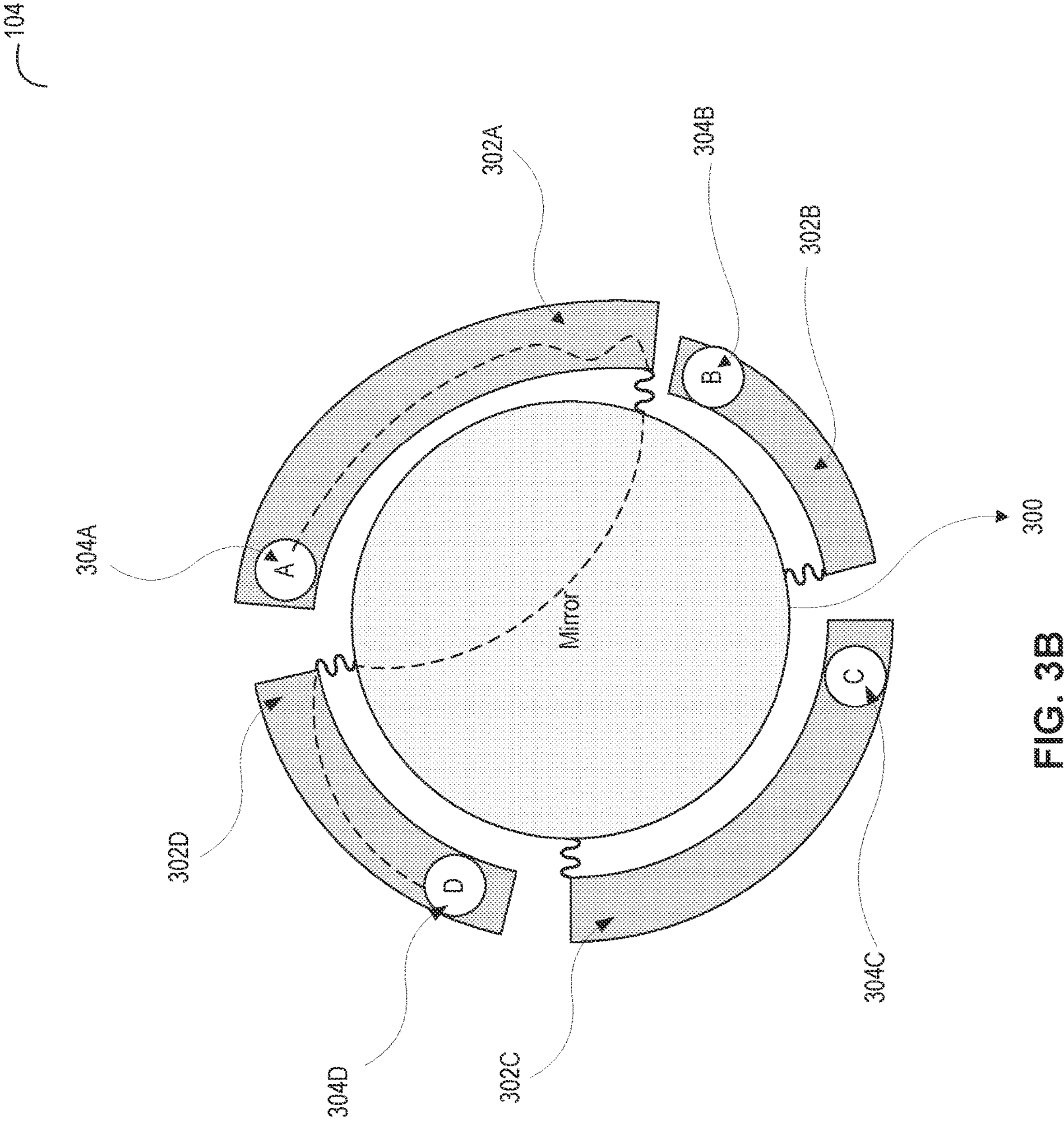

FIGS. 3A and 3B depict various configurations of scanning unit 104 and its role in LIDAR system 100. Specifically, FIG. 3A is a diagram illustrating scanning unit 104 with a MEMS mirror (e.g., square shaped), and FIG. 3B is a diagram illustrating another scanning unit 104 with a MEMS mirror (e.g., round shaped. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g., PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes. This embodiment is described in greater detail below with reference to FIGS. 32-34.

During scanning, current (represented in the figure as the dashed line) may flow from contact 304A to contact 304B (through actuator 302A, spring 306A, mirror 300, spring 306B, and actuator 302B). Isolation gaps in semiconducting frame 308 such as isolation gap 310 may cause actuator 302A and 302B to be two separate islands connected electrically through springs 306 and frame 308. The current flow, or any associated electrical parameter (voltage, current frequency, capacitance, relative dielectric constant, etc.), may be monitored by an associated position feedback. In case of a mechanical failure—where one of the components is damaged—the current flow through the structure would alter and change from its functional calibrated values. At an extreme situation (for example, when a spring is broken), the current would stop completely due to a circuit break in the electrical chain by means of a faulty element.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. In the illustrated example, the current (represented in the figure as the dashed line) flows from contact 304A to contact 304D, but in other cases current may flow from contact 304A to contact 304B, from contact 304A to contact 304C, from contact 304B to contact 304C, from contact 304B to contact 304D, or from contact 304C to contact 304D. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least one deflector 114 may have a dual axis square-shaped mirror or single axis round-shaped mirror. Examples of round and square mirrors are depicted in FIGS. 3A and 3B as examples only. Any shape may be employed depending on system specifications. In one embodiment, actuators 302 may be incorporated as an integral part of at least of deflector 114, such that power to move MEMS mirror 300 is applied directly towards it. In addition, MEMS mirror 300 may be connected to frame 308 by one or more rigid supporting elements. In another embodiment, at least one deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance.

The Sensing Unit

Figure 4A:
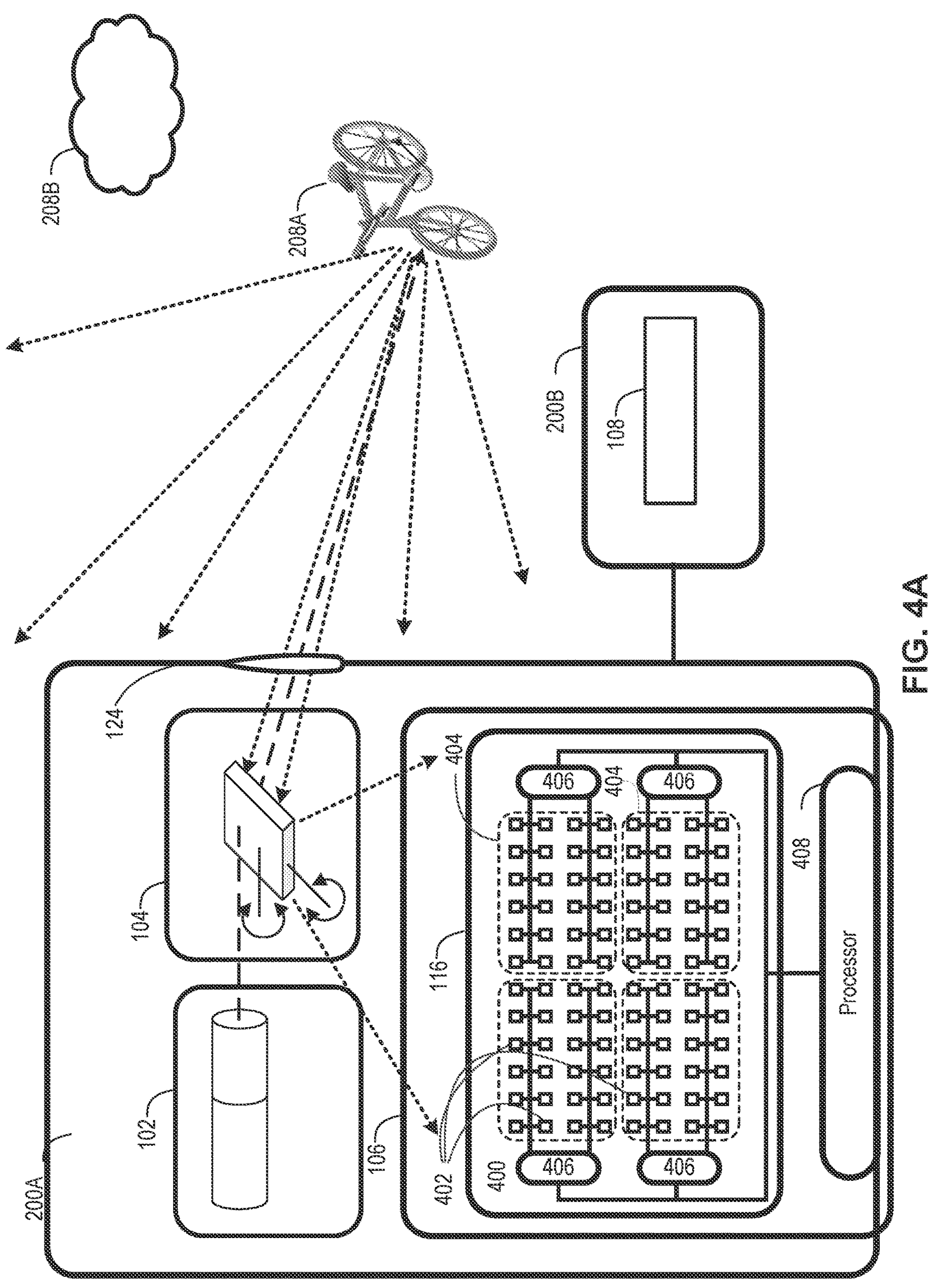
FIGS. 4A and 4B are diagrams illustrating different configurations of sensing units in accordance with some embodiments of the present disclosure.
Figure 4B:
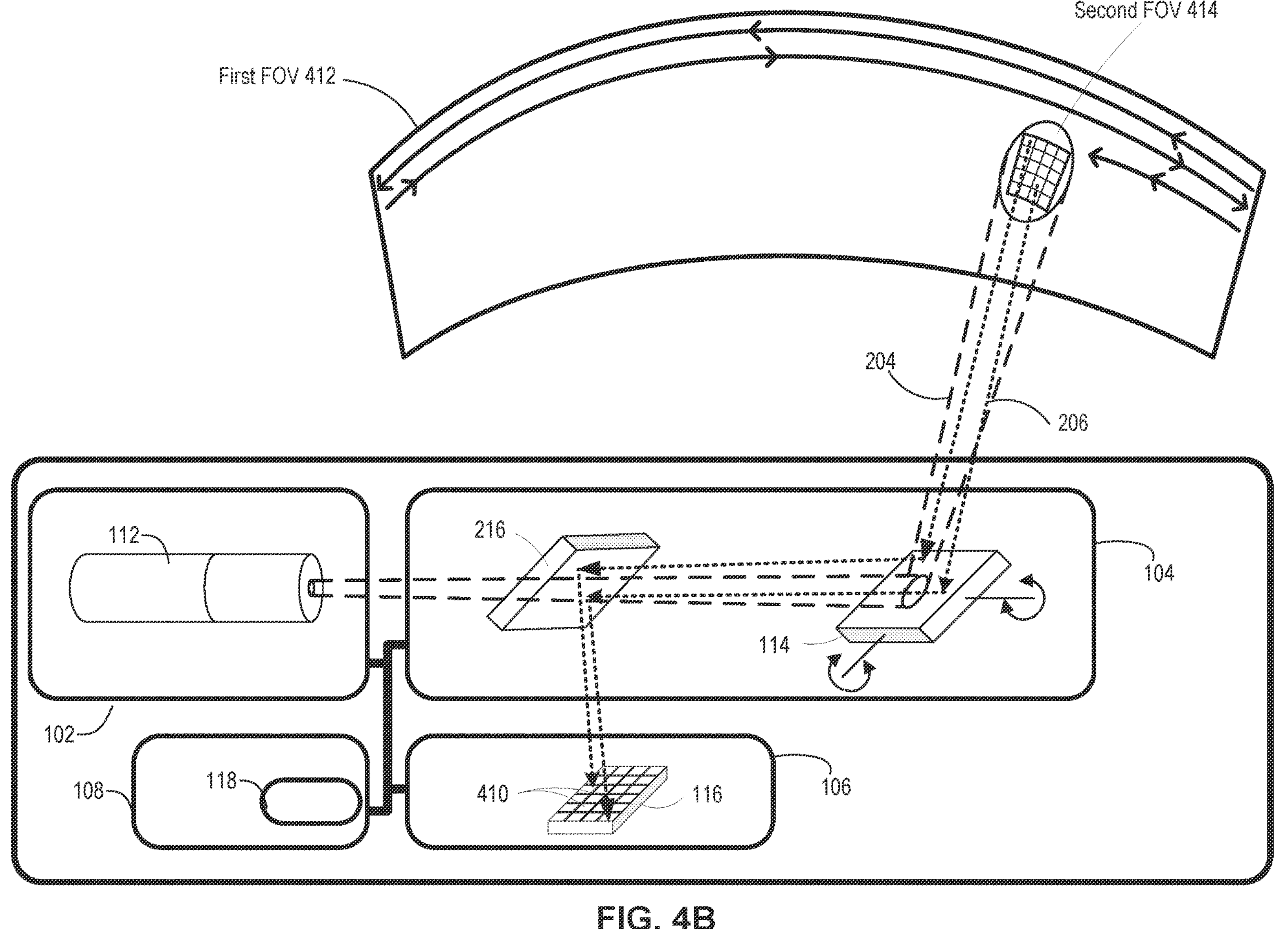

FIGS. 4A and 4B depict various configurations of sensing unit 106 and its role in LIDAR system 100. Specifically, FIG. 4A is a diagram illustrating an example sensing unit 106 with a detector array, and FIG. 4B is a diagram illustrating monostatic scanning using a two-dimensional sensor. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208B) in field of view 120 located at different distances from LIDAR system 100 (could be meters or more). Objects 208 may be a solid object (e.g., a road, a tree, a car, a person), fluid object (e.g., fog, water, atmosphere particles), or object of another type (e.g., dust or a powdery illuminated object). When the photons emitted from light source 112 hit object 208 they either reflect, refract, or get absorbed. Typically, as shown in the figure, only a portion of the photons reflected from object 208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g., as shown) or any other arrangement. Detection elements 402 may operate concurrently or partially concurrently with each other. Specifically, each detection element 402 may issue detection information for every sampling duration (e.g., every 1 nanosecond). In one example, detector array 400 may be a SiPM (Silicon photomultipliers) which is a solid-state single-photon-sensitive device built from an array of single photon avalanche diodes (SPADs, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g., SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g., within detector array 400)—and may be shaped in different shapes (e.g., rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310—unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the region of output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g., within vehicle 110), and sensing unit 106 may include a dedicated processor 408 for analyzing the reflected light. Alternatively, processing unit 108 may be used for analyzing reflected light 206. It is noted that LIDAR system 100 may be implemented multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e.g., summed) with signals of other detectors of the region 404 before being passed to processor 408. However, this is only an example and the circuitry of sensor 116 may transmit information from a detection element 402 to processor 408 via other routes (not via a region output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4×6 detectors 410 (also referred to as "pixels"). In one embodiment, a pixel size may be about 1×1 mm. Sensor 116 is two-dimensional in the sense that it has more than one set (e.g., row, column) of detectors 410 in two non-parallel axes (e.g., orthogonal axes, as exemplified in the illustrated examples). The number of detectors 410 in sensor 116 may vary between differing implementations, e.g. depending on the desired resolution, signal to noise ratio (SNR), desired detection distance, and so on. For example, sensor 116 may have anywhere between 5 and 5,000 pixels. In another example (not shown in the figure) Also, sensor 116 may be a one-dimensional matrix (e.g., 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs) or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 412" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 412 may be between about 0.05° and 1° elongated in the vertical dimension. Even if LIDAR system 100 includes more than one two-dimensional sensor 116, the combined field of view of the sensors array may still be smaller than the first FOV 412, e.g. by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly Consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal point (e.g., the focal point may be a plane) to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent to each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

It is noted that the one or more sensors 116 of system 100 may receive light from a scanning deflector 114 or directly from the FOV without scanning. Even if light from the entire FOV arrives to the at least one sensor 116 at the same time, in some implementations the one or more sensors 116 may sample only parts of the FOV for detection output at any given time. For example, if the illumination of projection unit 102 illuminates different parts of the FOV at different times (whether using a deflector 114 and/or by activating different light sources 112 at different times), light may arrive at all of the pixels or sensors 116 of sensing unit 106, and only pixels/sensors which are expected to detect the LIDAR illumination may be actively collecting data for detection outputs. This way, the rest of the pixels/sensors do not unnecessarily collect ambient noise. Referring to the scanning—in the outbound or in the inbound directions—it is noted that substantially different scales of scanning may be implemented. For example, in some implementations the scanned area may cover 1%% or 0.1%% of the FOV, while in other implementations the scanned area may cover 10% or 25% of the FOV. All other relative portions of the FOV values may also be implemented, of course.

The Processing Unit

Figure 5:
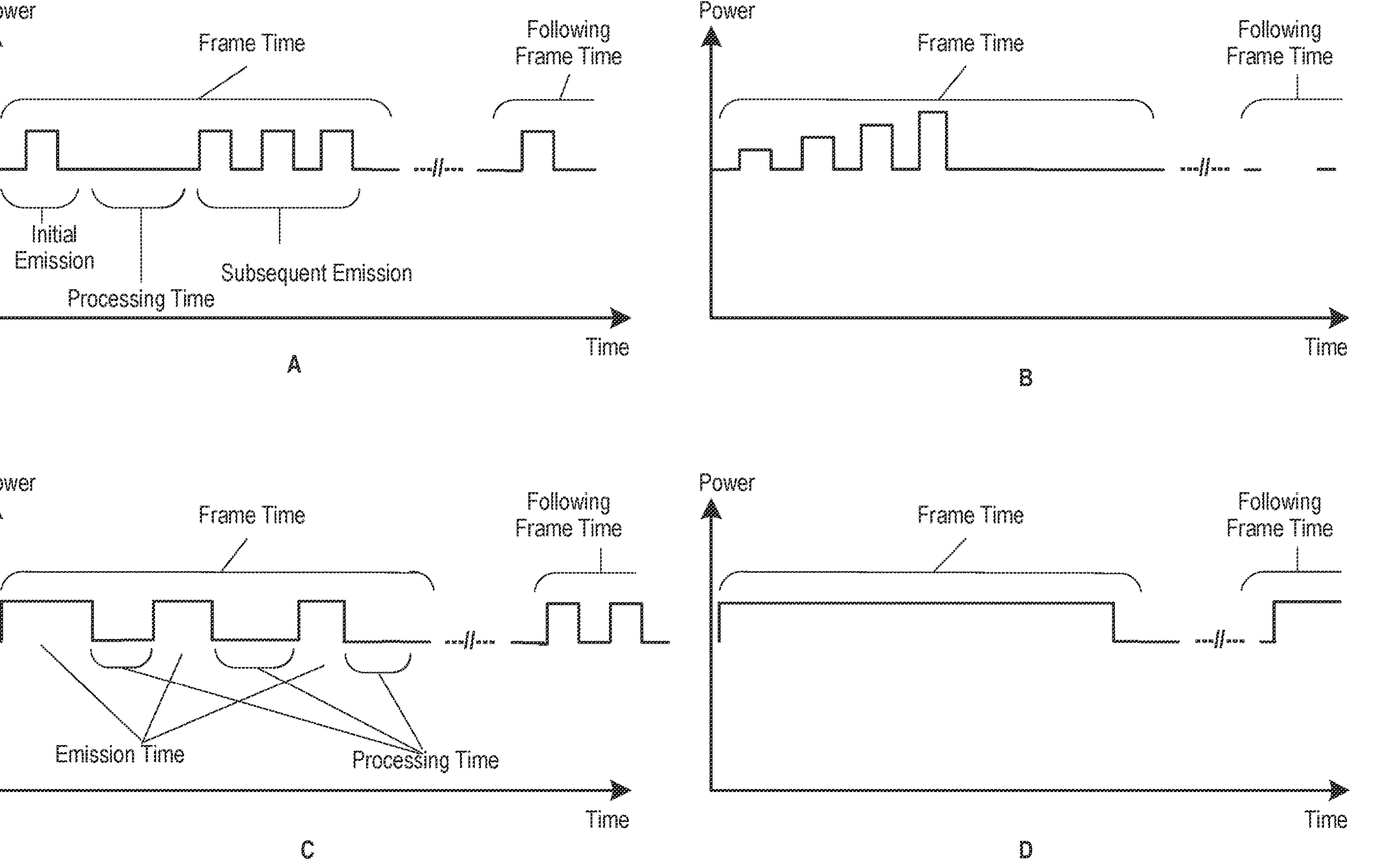
FIG. 5 includes four example diagrams illustrating emission patterns in a single frame-time for a single portion of the field of view.

FIG. 5 depicts different functionalities of processing units 108 in accordance with some embodiments of the present disclosure. Specifically, FIG. 5 is a diagram illustrating emission patterns in a single frame-time for a single portion of the field of view. FIG. 5 illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5 depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g., one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g., for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame).

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g., 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following:

a. Overall energy of the subsequent emission.
b. Energy profile of the subsequent emission.
c. A number of light-pulse-repetition per frame.
d. Light modulation characteristics such as duration, rate, peak, average power, and pulse shape.
e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g., regions of interest, further distanced targets, low reflection targets, etc.) while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined upon after every pulse emitted, or after a number of pulses emitted.

Processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g., camera, GPS), received (directly or indirectly) from host 210, or any combination of the above. In some embodiments, the identification of at least one region of interest may include identification of portions, areas, sections, pixels, or objects within field of view 120 that are important to monitor.

Examples of areas that may be identified as regions of interest may include crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Additional details and examples on different components of LIDAR system 100 and their associated functionalities are included in Applicant's United States Patent Application Publication Nos. 2018/0100928 published Apr. 12, 2018; 2018/0113216 published Apr. 26, 2018; 2018/0081037 published Mar. 22, 2018; and 2018/0081038 published Mar. 22, 2018, which are incorporated herein by reference in their entirety.

Eye safety requirements in LIDAR systems and other electrooptical systems may limit the amount of illumination that can be emitted by the system per time unit. A maximum permissible exposure (MPE) may be defined for different light sources, depending on various factors such as the wavelength of the power source. The MPE defines the highest power or energy density (in W/cm2 or J/cm2) that is considered safe. In some instances, the MPE may depend on the overall time of the exposure.

Meeting eye safety requirements may involve the use of a wide field of view. LIDAR systems may include a large number of components to obtain and collect data over a wide FOV, while providing high reliability of the system. Existing systems typically include a laser emitter, scanning mirrors, and a detector (referred to as a Laser Range Finder [LRF]) for each beam emitted from the laser. However, existing systems may have high complexity, a large number of components (e.g., require multiple LRF's), and may be expensive. Moreover, a wider field of view may require a larger amount of time to fully scan all portions of the field of view. Thus, there is a need to reduce the system complexity, the number of parts, and cost, while providing LIDAR and other optical systems capable of providing desired levels of detection speed, detection range, and sensitivity, while maintaining eye safety. The presently disclosed embodiments are aimed at addressing this need. Furthermore, unlike conventional LIDAR systems, the presently disclosed systems and methods also advantageously allow controlling of the vertical and horizontal resolution in an independent or dependent manner.

For example, in some embodiments of this disclosure, one of the ways to reduce the complexity and increase the speed of scanning of the field of view may involve using an emitting system that emits two or more beams. In some embodiments, the LIDAR system may use a beam splitter to split a laser beam originating from a single light source into two or more beams. Alternatively, the emitting system may include a laser array, and the laser array may include two or more laser emitters that may generate the two or more beams of laser light. The two or more beams (resultant from the beam splitter or the laser array) may be made incident on a scanning device (e.g., a scanning mirror, prism, or other type of scanning device). In some cases, the scanning device may include a single bi-axial scanning mirror. Alternatively, the scanning device may include two or more mirrors, or transparent scanners. This configuration may provide certain benefits relative to traditional LIDAR systems such as: 1) each of the beams may be spaced apart such that the LIDAR system has an improved eye safety at any range; and 2) the multi-beam system, including a plurality of aligned beams that may be generated together, may provide an ability to selectively control scanning resolution relative to the field of view or relative to portions of the field of view.

For example, the system may optionally be operated or configured to provide variable resolution in a vertical or horizontal direction, depending on whether the system employs horizontally oriented or vertically oriented scan lines to scan the field of view. In one embodiment, the spots resulting from a split laser beam may be equidistant from one another, and a scanning mirror may be associated with a minimum vertical tilt increment (e.g., 0.2 deg associated with a maximal resolution). In some cases, the scanning mirror may be operated using a greater than a minimum vertical tilt increment to generate scan lines of variable vertical spacing over selected regions of the FOV. In other cases, the laser beam may be split such that the resulting spots are not equidistant, but rather, may be more closely spaced along a vertical direction in a region overlapping a horizon. In still other embodiments, a combination of mirror tilt angle and spot spacing may enable overlapping or interleaving scan lines from two or more different spots to potentially enable scanning resolutions higher than a maximum resolution offered by a minimum vertical tilt increment of the mirror.

Such variable resolution may offer an opportunity to reduce processing overhead associated with each scan of the FOV. For example, a middle region (e.g., a region of interest or area of interest) of the FOV, which may be associated with regions near the horizon and may typically include more distant objects or higher densities of objects of interest, may be scanned with a relatively high resolution (e.g., using scans associated with more closely spaced vertically oriented laser spots and/or more closely spaced laser scan lines). In contrast, regions of the FOV farther from the horizon, which may include objects more closely located relative to the LIDAR, may be scanned with a lower resolution (e.g., using spots and/or scan lines that are more widely spaced).

A field of view may be subdivided into a plurality of segments (or field-of-view pixels). For example, in some embodiments, the field of view may be divided into segments (or field-of-view pixels) of substantially the same or uniform size. In some embodiments, the field of view may be divided into segments (or field-of-view pixels) having different sizes. In some embodiments, the field of view may be divided into segments (or field-of-view pixels) arranged in the form of a two-dimensional array of rows and columns, where each row of segments (or field-of-view pixels) may be positioned along respective scan lines extending from a minimum extent of the field of view to a maximum extent of the field of view in a horizontal or vertical direction. Additionally, to ensure eye safety with the use of multiple laser beams, the multiple beams may be configured to illuminate non-contiguous segments of the field of view to minimize an amount of energy that may enter an eye present in the field of view at any given time.

Figure 6:
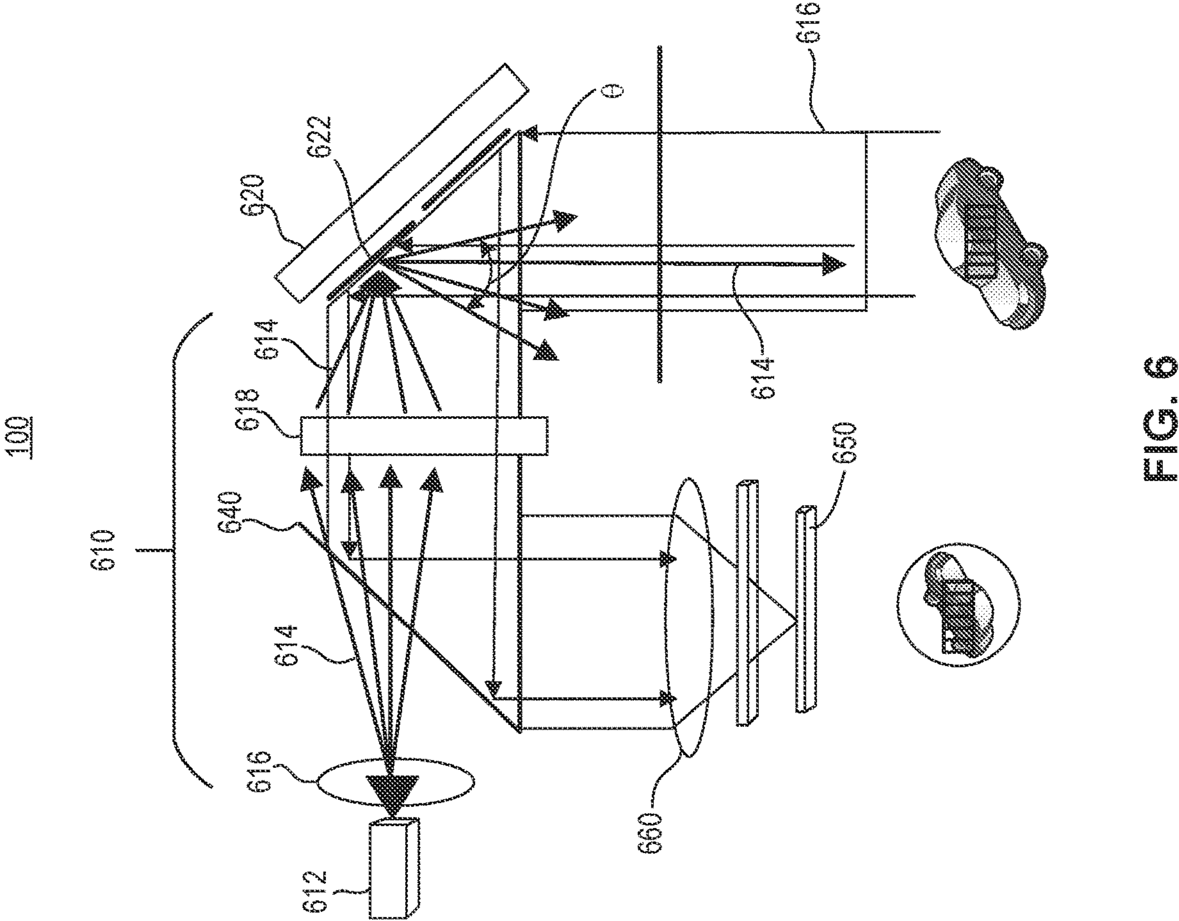
FIG. 6 is a diagram illustrates a schematic configuration of an exemplary disclosed LIDAR system consistent with some embodiments of the present disclosure.

A LIDAR system, including some of the above features is disclosed. By way of example, FIGS. 1, 2A, 2B, 4A, 4B, and 6 illustrate an exemplary LIDAR system 100 consistent with this disclosure. For example, FIG. 6 illustrates a schematic configuration of an exemplary disclosed LIDAR system 100 configured to generate multiple beams of emitted light, steered by scanning mirrors, and sensed on a single detector, enabling scanning of a Field of View (FOV) of +/−50 degrees (Horizontal), all on the same optical path with a single set of optical parts. As illustrated in FIG. 6, laser light beams 614 may be emitted from a quad laser array 612. The laser light beams 614 may be generated by multiple laser emitters, a laser bar/array, or by a single laser beam split into multiple beams. Laser beams 614 may be directed to scanning mirrors 620 (e.g., a MEMs scanner) by a system of lenses 616 and folding mirrors 618 (e.g., optical system 610). Laser beams 614 may be steered by way of scanning mirrors 620. The reflected light 616 may enter LIDAR system 100 and may be directed to a dichroic mirror (polarizing splitter) 640, and then focused onto a single detector 650 with lens 660. As illustrated in FIG. 6, each of beams 642 may be directed via shared optical parts (e.g., 616, 618, 620, 640, etc.), reducing the number of components and thus the cost to construct LIDAR system 100.

Figure 7A:
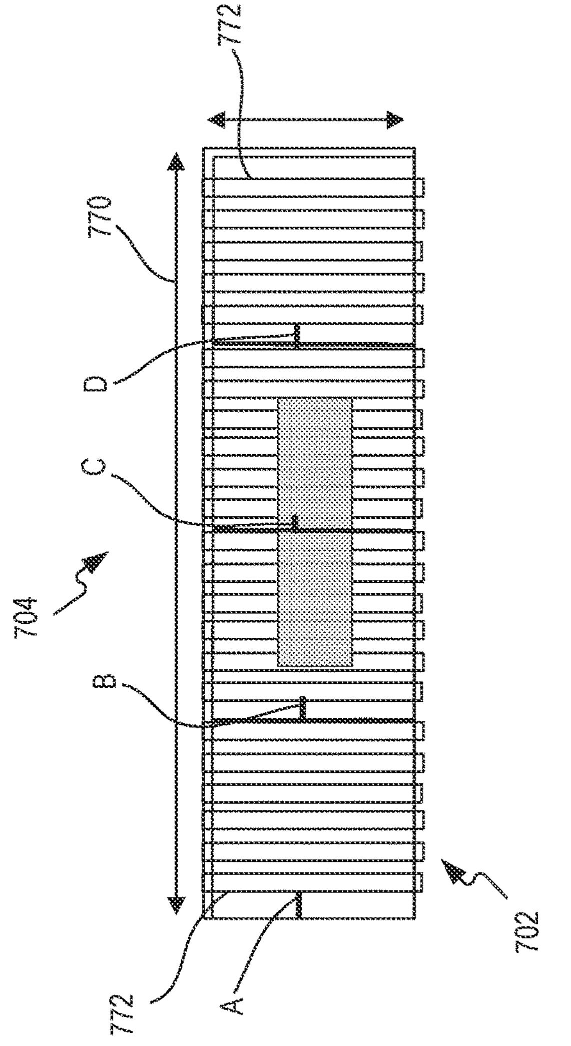
FIG. 7A is a diagram illustrating vertical scanning of a field of view consistent with some embodiments of the present disclosure.

FIG. 7A illustrates a FOV (100 degrees×15 degrees) 770, which may be scanned vertically. Scanning mirrors 720 may direct laser beams 714 along scan lines 772. Reflected laser beams 714 from positions along scan lines 772 may be directed towards detector 750. Although vertical scan lines have been illustrated in FIG. 7B, it is contemplated that LIDAR system may additionally or alternatively be configured to scan FOV 770 along horizontal scan lines. Furthermore, the number or spots and/or pixels discussed above is exemplary and nonlimiting and each active area 752 may have any number of channels and detector 750 may be configured to detect any number of spots of reflected laser beams 716. As discussed above, the FOV may be subdivided into a plurality of segments of field-of-view pixels. For example, in one embodiment, the FOV may be subdivided into field-of-view pixels, each having a size of 0.05 degrees× 0.05 degrees. Thus, for example, a FOV of 100×15 degrees may include 300 rows (e.g., corresponding to 15 degrees) of field-of-view pixels, each row having 2000 pixels (e.g., corresponding to 100 degrees).

Figure 7B:
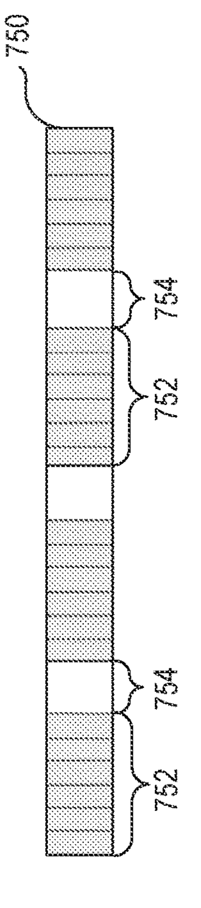
FIG. 7B is a diagram illustrating an example of a detector, having active areas separated by inactive areas consistent with some embodiments of the present disclosure.

FIG. 7B illustrates an example of detector 750, having active areas 752 separated by inactive areas 754. As illustrated in FIG. 7B, detector 750 may detect spots (e.g., A, B, C, D) of reflected laser beams 716. As also illustrated in FIG. 7B, each active area 752 may have a plurality of pixels or channels. In some embodiments, each active area 752 may detect laser beams reflected from a single field-of-view pixel. In some embodiments, each active area 752 may detect laser beams reflected from more than one field-of-view pixel. Alternatively, more than one active area 752 may detect laser beams reflected from a single field-of-view pixel or from multiple field-of-view pixels. As illustrated in FIGS. 7B and 7C, the disclosed monostatic configuration may transmit and receive a plurality of beams on the same optical path, saving many optical components and multiple MEMs modules, with a FOV of 100×15 degrees.

Figure 8:
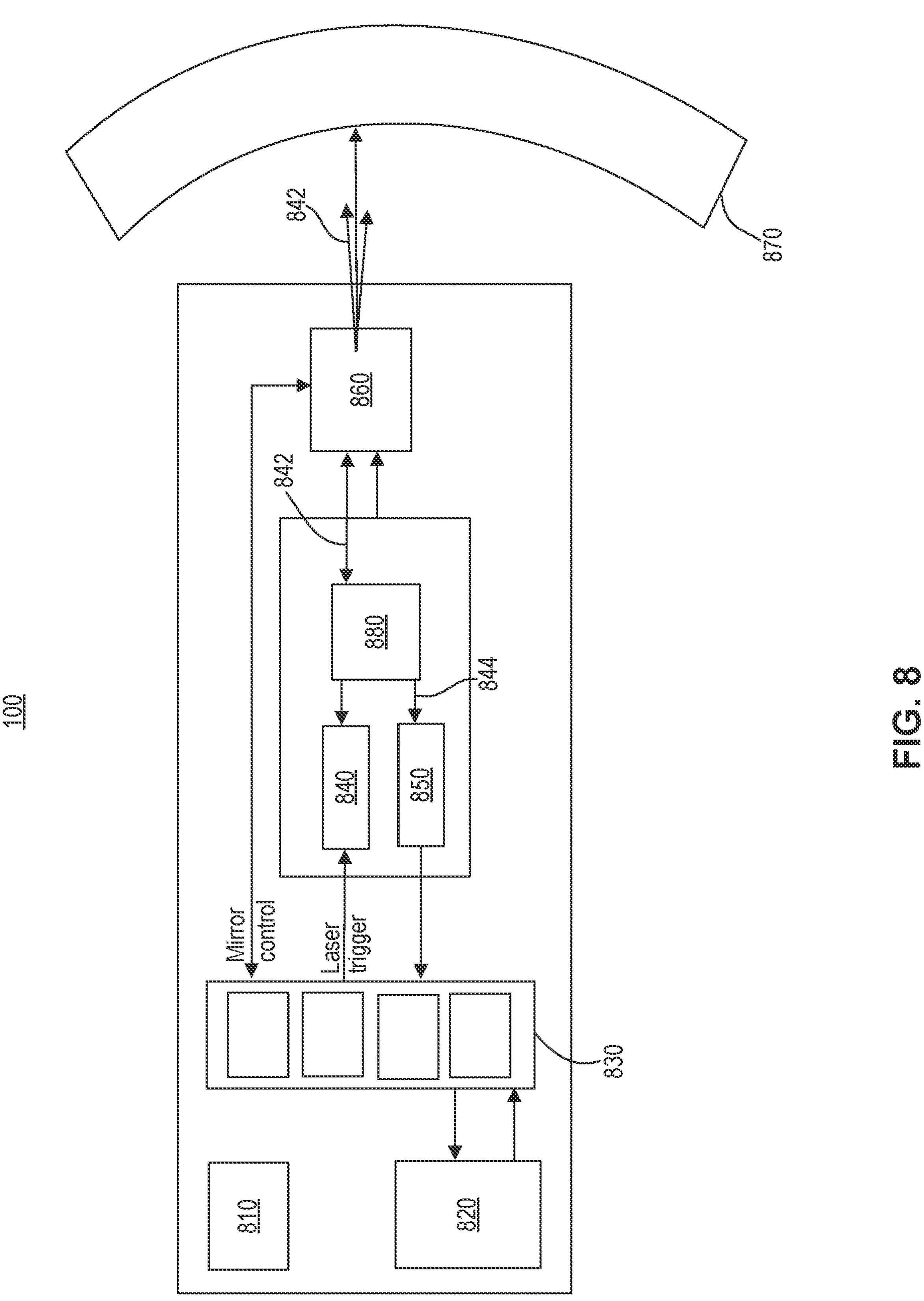
FIG. 8 is a high-level block diagram of an exemplary architecture for an exemplary LIDAR system consistent with some embodiments of the present disclosure.

FIG. 8 illustrates a high-level block diagram of an exemplary architecture for LIDAR system 100. As illustrated in FIG. 8, LIDAR system 100 may include power supply 810, controller 820, optical module 830, laser array 840, sensor array 850, and scanner 860. As also illustrated in FIG. 8, light beams 842 from laser array 840 may be incident upon 2-D scanner 860 that may direct the light to FOV 870. Reflected light beams 844 returning from the FOV 870 may be received at 2-D scanner 860, which may direct reflected light beams 844 to sensor array 850, which may be configured to detect reflected light beams 844. Controller 820 may perform time of flight calculations to determine distances to various objects in the FOV 870, and a point cloud of distance values may be generated for each scan of FOV 870. In some embodiments, common optical components 880 may be used both to transmit laser light 842 emitted from laser array 840 to 2-D scanner 860 and toward FOV 870 and to direct reflected light 842 received at 2-D scanner 860 from FOV 870 to sensor array 850. Such an arrangement may provide significant advantages in terms of reduced complexity, lower cost, reliability, and performance. This arrangement may additionally reduce blooming artifacts compared to a continuous detector array and laser array scheme, since the laser beams are optically separated, and the active areas on the detector are separated.

In some embodiments, the LIDAR system includes a laser emission unit configured to generate a plurality of laser beams. In some embodiments, the LIDAR system includes an optical system configured to transmit the plurality of laser beams received from the laser emission unit towards a common scanning unit. As discussed above, LIDAR system 100 may include laser emission unit 102 (e.g., projecting unit). In some embodiments, laser emission unit may include one or more light sources that may be laser light sources. As also discussed above, one or more of the laser light sources may include, for example, one or more laser diodes 202A that may be configured to emit one or more beams of laser light 204. It is contemplated that the disclosed LIDAR system 100 may include laser emission unit 102 configured to emit two or more beams of laser light (see e.g., FIG. 2B). It is contemplated that in some embodiments, LIDAR system 100 may include a laser light source in the form of a laser array, and the laser array may include two or more laser emitters. Various laser sources may be employed. For example, the plurality of laser beams may be generated by multiple laser emitters, a laser bar/array, or by one or more laser beam split into multiple laser beams. Laser sources associated with the laser array may include pulsed lasers having a wavelength of 860 nm-950 nm. Multiple laser sources may be included in the laser array, and the array may be arranged in a 1-D pattern or 2-D pattern. Laser sources arranged in a 1-D configuration may include a laser bar array including multiple (e.g., two or more) laser sources.

In some embodiments, the LIDAR system may include a common scanning unit configured to receive the plurality of laser beams, wherein the common scanning unit may be configured to project the plurality of laser beams toward a field of view of the LIDAR system. As discussed above with reference to FIGS. 7A and 8, LIDAR system 100 may include a common scanning unit (e.g., 720, 860). Common scanning unit 720, 860 may include a variety of optical components configured to direct laser light towards the field of view. For example, common scanning unit 720, 860 may include one or more scanning mirrors, light-transmissive scanning prisms, diffraction elements, liquid crystal deflectors, MEMs mirrors, etc. For example, the two or more laser beams, resultant from a beam splitter may be made incident on a scanning mirror device (e.g., 720, 860).

In some embodiments, the common scanning unit is configured to project the plurality of laser beams towards a first set of spaced apart locations of a field of view of the LIDAR system, the first set of spaced apart locations being associated with a first plurality of parallel scan lines traversing the field of view. For example, the LIDAR system may include a common scanning unit configured to receive the plurality of laser beams. The common scanning unit may be configured to project the plurality of laser beams toward a field of view of the LIDAR system. As discussed above with reference to FIGS. 7A and 8, LIDAR system 100 may include a common scanning unit (e.g., 720, 860). Common scanning unit 720, 860 may include a variety of optical components configured to direct laser light towards the field of view. For example, scanning unit 720, 860 may include one or more light-transmissive scanning prisms, diffraction elements, liquid crystal deflectors, MEMs mirrors, etc. As also discussed above, the two or more beams, resultant from a beam splitter (e.g., 1110) or the laser array (900, 950, etc.) may be made incident on a scanning mirror device (e.g., 720, 860).

The common scanning unit may be configured to direct the plurality laser beams, incident on the common scanning unit, towards a field of view such that the laser beams may illuminate locations or points on the field of view that are spaced apart from each other. In one exemplary embodiment, the locations or points of the field of view illuminated by the plurality of laser beams may be spaced apart from each other vertically at equal or unequal distances from each other. Thus, for example, the common scanning unit may illuminate a plurality of spaced apart locations along a vertical axis on the field of view.

By way of example, as discussed above, a FOV of 100×15 degrees may be divided into a plurality of segments, each of size 0.05×0.05 degrees, providing an array of 2000×300 segments (or field-of-view pixels). In some embodiments, the common scanning unit (e.g., 720 or 860) may be configured to direct the plurality of laser beams towards the FOV to illuminate field-of-view pixels vertically spaced apart from each other. For example, in the FOV example having an array of 2000×300 segments (or field-of-view pixels). The common scanning unit may be configured to illuminate field-of-view pixels in a plurality of spaced apart rows of field-of-view pixels. For example, the common scanning unit may be configured to illuminate pixels in every second row, every third row, every fourth row, or every nth row, where n is >1.

It is contemplated that in some embodiments, the common scanning unit may instead be configured to illuminate the plurality of locations or points that may be spaced apart horizontally from each other at equal or unequal distances. For example, in a FOV of 100×15 divided into an array of 2000×300 segments (or field-of-view pixels), the common scanning unit (e.g., 720, 860) may be configured to illuminate pixels in every second column, every third column, every fourth column, or every mth row, where m is >1. Although horizontal and vertical arrangements have been discussed above, it is contemplated that the common scanning unit may be configured to illuminate a plurality of locations of the field of view (e.g., segments or field-of-view pixels) that may be spaced apart from each other in any direction.

Figure 9:
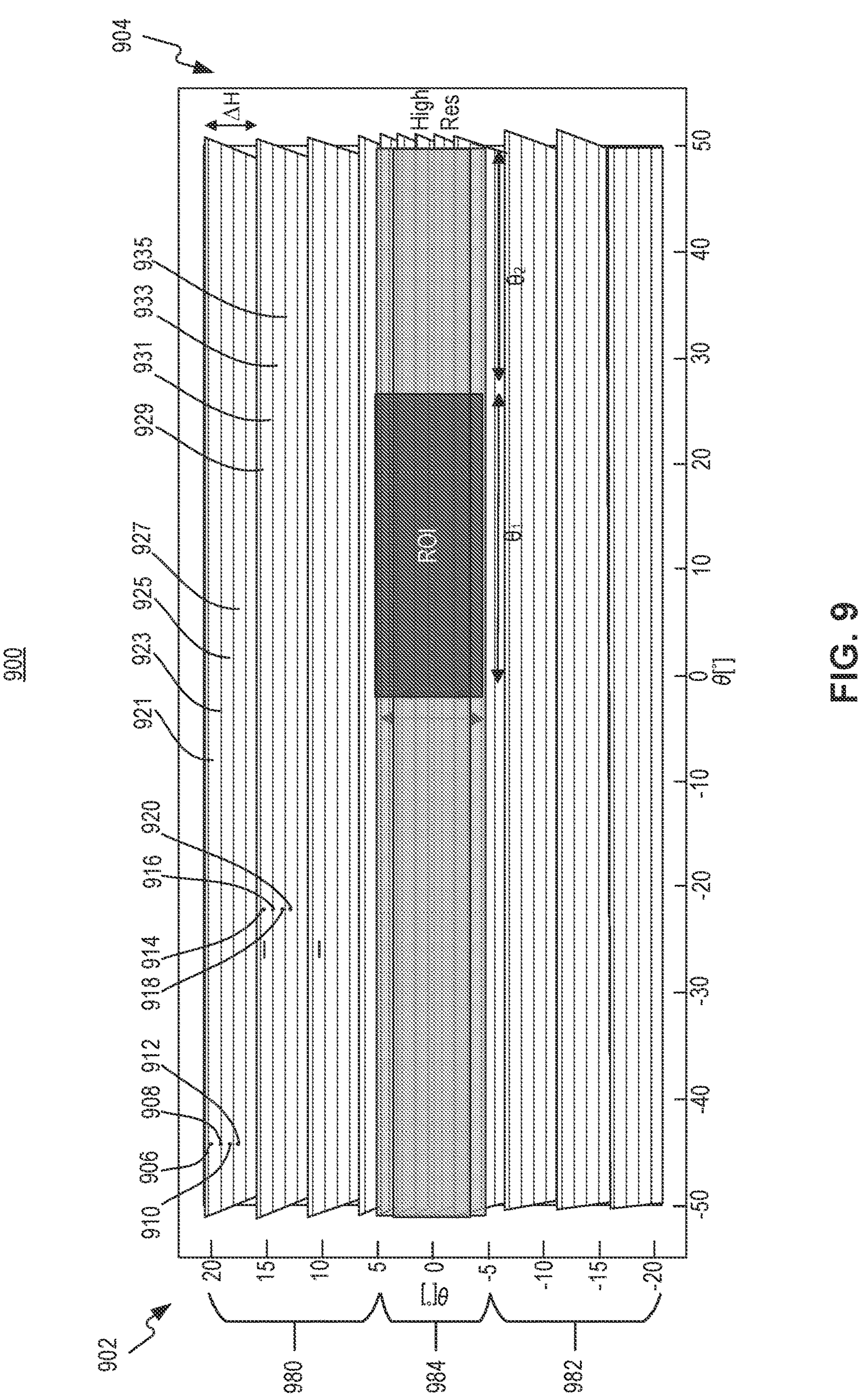
FIG. 9 is a diagram illustrating scan lines traversing a field of view consistent with some embodiments of the present disclosure.

In some embodiments, the plurality of spaced apart locations are associated with a first plurality of parallel scan lines traversing the field of view. For example, as discussed above, the plurality of segments (or field-of-view pixels) may be arranged in an array of rows and columns, where each row may be arranged along a scan line that may extend across a field of view. Thus, for example, the common scanning unit (e.g. 720, 860) may rotate about a scan axis to sequentially illuminate pixels positioned along a row, thereby scanning the FOV along a scan line extending across the FOV. In some embodiments, the scan lines may extend across the field of view horizontally (e.g., along rows of field-of-view pixels) from a minimum extent (left-most end) of the field of view to a maximum extent (e.g., right-most end) of the field of view. By way of example, FIG. 9 illustrates a plurality of parallel scan lines 921, 923, 925, 927 that may traverse the field of view 900 horizontally from a left-most end 902 (e.g., minimum extent of the field of view) to a right-most end 904 (e.g., maximum extent of the field of view). As also illustrated in FIG. 9, scan lines 921, 923, 925, 927 are associated with the plurality of vertically spaced apart locations 906, 908, 910, 912, respectively, which in turn may correspond to respective segments or field-of-view pixels.

In some embodiments, the scan lines may extend across the field of view vertically (e.g., along columns of field-of-view pixels) from a minimum extent (e.g. bottom end) of the field of view to a maximum extent (top end) of the field of view. By way of example, FIG. 7B illustrates a FOV (100 degrees×15 degrees) 770, with scan lines 772 extending vertically from a minimum extent 702 (e.g. bottom end) of the field of view to a maximum extent 704 (top end) of the field of view.

In some embodiments, the common scanning unit is further configured to displace the plurality of laser beams from the first set of locations to a second set of locations associated with a second plurality of parallel scan lines traversing the field of view. For example, the common scanning unit may be configured to rotate about a tilt axis in such a way that the plurality of laser beams may be displaced vertically to a second set of locations different from the first set of locations. In some embodiments, the tilt axis may be oriented generally perpendicular to the scan axis of the common scanning unit. By way of example, as illustrated in FIG. 9, the common scanning unit (e.g., 720, 860) may be configured to rotate about the tilt axis, thereby displacing the plurality of laser beams from a first plurality of locations 906, 908, 910, 912 to a second plurality of locations 914, 916, 918, 920, respectively. The first plurality of locations 906, 908, 910, 912 may be associated with a first set of scan lines 921, 923, 925, 927, or a first set of rows of field-of-view pixels. Likewise, the second plurality of locations 914, 916, 918, 920 may be associated with a second set of scan lines 929, 931, 933, 935, or a second set of rows of field-of-view pixels. For example, in one embodiment, the first plurality of locations 906, 908, 910, 912 may be associated with rows 1, 5, 9, and 13 of the array of field-of-view pixels, and the second plurality of locations 914, 916, 918, 920 may be associated with rows 17, 21, 25, and 29 of the array of field-of-view pixels. As also illustrated in FIG. 9, the second plurality of scan lines 929, 931, 933, 935 may be associated with the plurality of vertically spaced apart locations 914, 916, 918, 920, respectively. Although a vertical displacement of the scan lines and spaced apart locations has been described above, it is contemplated that in some embodiments, the common scanning unit may be configured to rotate in such a way that the plurality of laser beams may be displaced horizontally to a second set of locations different from the first set of locations. It is also contemplated that in some embodiments, the common scanning unit may be configured to rotate in such a way that the plurality of laser beams may be displaced in the same or different directions to a second set of locations different from the first set of locations. Additionally, although only a few (e.g., four) first and second locations and/or first and second plurality of scan lines have been described above with respect to FIG. 9, it is contemplated that the common scanning unit may direct any number of laser beams towards respective spaced apart locations of the field of view and may also displace those laser beams in any direction to a new set of spaced apart locations of the field of view.

In some embodiments, the common scanning unit includes a single biaxial scanning mirror upon which the plurality of laser beams are made incident. In some embodiments, the biaxial scanning mirror is rotatable in two axes, the two axes including a tilt axis and a scan axis. In some embodiments, rotation of the biaxial scanning mirror about the scan axis causes movement of the plurality of laser beams along the first plurality of scan lines traversing the field of view of the LIDAR system. Likewise, rotation of the biaxial scanning mirror about the tilt axis causes displacement of the plurality of laser beams from a first set of locations associated with a first plurality of scan lines to a second set of locations associated with a second plurality of scan lines. For example, the common scanning unit may include a mirror capable of rotating about two axes of rotation (e.g., a biaxial mirror). The biaxial mirror may be configured to rotate about a first axis causing the plurality of laser beams to be directed from a minimum extent to a maximum extent of the field of view in one direction (e.g., horizontal direction). The first axis may be referred to as a scan axis, for example, because rotation of the mirror about the scan axis may move the laser beams in a scanning direction from a minimum extent to a maximum extent of the field of view in one direction (e.g., horizontal direction). The biaxial mirror may be configured to rotate about a second axis that may allow the plurality of laser beams to be moved vertically from a first plurality of spaced apart locations to a second plurality of spaced apart locations as described above. The second axis may be referred to as a tilt axis, for example, because rotation of the mirror about the tilt axis may cause the laser beams to be displaced in a direction transverse to the scanning direction. In some embodiments, the first axis may be disposed generally perpendicular to the second axis. It is contemplated, however, that first and second axis may be inclined relative to each other at any angle.

By way of example, as illustrated in FIG. 9, the common scanning unit (e.g., 720, 860) may be configured to move (e.g., rotate) about a first axis (e.g., scan axis) to cause the plurality of laser beams to move from a minimum extent (e.g., left-most extent 902) of the field of view to a maximum extent (e.g., right-most extent 904) of the field of view along a first plurality of scan lines 921, 923, 925, 927. As also illustrated in FIG. 9, the common scanning unit (e.g., 720, 860) may be configured to move (e.g., rotate) about a second axis (e.g., tilt axis) to cause the plurality of laser beams to move from the first plurality of spaced apart locations 910, 906, 908, 912 to a second plurality of spaced apart locations 914, 916, 918, 920, respectively. Although rotation about the scan axis has been described above as causing a horizontal movement of the plurality of laser beams, it is contemplated that in some embodiments, rotation of the common scanning unit about the scan axis may cause movement of the plurality of laser beams from a minimum extent (e.g., lower-most and) to a maximum extent (e.g., upper-most extent). Likewise, in some embodiments, rotation of the common scanning unit about a tilt axis may cause displacement of the plurality of laser beams from a first plurality of locations to a second plurality of locations in a horizontal direction as opposed to in the vertical direction.

In some embodiments, the common scanning unit includes one of a biaxial scanner, a combination of a single axis mirror and a polygon, or a single axis scanner mounted on a rotating element. For example, in some embodiments, the common scanning unit may include a pair of mirrors, each mirror configured to rotate about a different axis of rotation. Thus, for example, one of the pair of mirrors may be configured to rotate about a scan axis whereas the other of the pair of mirrors may be configured to rotate about a tilt axis. Additionally or alternatively, the common scanning unit may include a spinning polygon alone or in combination with a mirror configured to rotate about a single axis of rotation. It is also contemplated that in some embodiments, the common scanning unit may include a scanning device attached to a rotating element such as a motor, or that may be driven by a mechanical arrangement that may include, for example, magnetic actuation.

In some embodiments, the common scanning unit includes a first single axis scanning mirror and a second single axis scanning mirror, and wherein the plurality of laser beams are made incident upon the first single axis scanning mirror before proceeding to the second single axis scanning mirror. Although scanning units 720, 860 capable of rotating about two axes of rotation are discussed above, as discussed above, in some embodiments, scanning units 720, 860 may include mirrors or deflectors capable of rotating only about one axis of rotation. By way of example, scanning units 720, 860 may include mirrors or deflectors similar to the mirror in FIG. 3A. In these embodiments, a first single axis scanning mirror 104 may receive laser light beams from laser emission unit 102. The first single axis scanning mirror 104 may be configured to rotate about a first axis (e.g., scan axis) and may also be configured to direct the laser light beams onto a second single axis scanning mirror 104. Second single axis scanning mirror 104 may be configured to rotate about a second axis (e.g., tilt axis) different from the first axis and may also be configured to direct the plurality of laser light beams towards the field of view. In some embodiments, the first and second axis may be disposed generally perpendicular to each other. It is contemplated that in some embodiments the first axis and the second axis of first and second mirrors 104 may be inclined relative to each other at any angle.

In some embodiments, the first single axis scanning mirror is configured to rotate about a scan axis to cause movement of the plurality of laser beams along the first plurality of scan lines traversing the field of view of the LIDAR system, and the second single axis scanning mirror is configured to rotate about a tilt axis to cause displacement of the plurality of laser beams from the first set of locations associated with the first plurality of scan lines to second set of locations associated with a second plurality of scan lines. By way of example, as illustrated in FIG. 9, first mirror 104 may be configured to rotate about an axis (e.g., scan axis) that may direct the plurality of laser beams to traverse the field of view from a minimum extent 902 (e.g., left-most extent) of the field of view 900 to a maximum extent 904 (e.g., right-most extent) of the field of view 900 along a first plurality of scan lines 921, 923, 925, 927. As also illustrated in FIG. 9, the common scanning unit (e.g., 720, 860) may include a second mirror 104 that may be configured to move (e.g., rotate) about a second axis (e.g., tilt axis) to cause the plurality of laser beams to move from the first plurality of spaced apart locations 910, 906, 908, 912 to a second plurality of spaced apart locations 914, 916, 918, 920, respectively. As discussed above, it is contemplated, however, that in some embodiments first mirror 104 may be configured to rotate about the scan axis such that the plurality of scan lines may traverse the field of view in a vertical direction from a minimum extent (e.g., lower-most extent) to a maximum extent (e.g., upper-most extent) of the field of view. Furthermore, in these embodiments, the second mirror 104 may be configured to rotate about the tilt axis such that the plurality of scan lines may be directed from a first plurality of locations to a second plurality of locations spaced apart horizontally from the first plurality of locations of the field of view.

In some embodiments, none of the second plurality of scan lines is spatially located between scan lines of the first plurality of scan lines. As described above, in some embodiments the common scanning unit may be configured to direct a plurality of laser beams towards a plurality of spaced apart locations of the field of view. The plurality of laser beams may span an angle θ (see FIG. 7A). For example, when the common scanning unit is configured to direct N laser beams towards the FOV, an angle between a first and the Nth laser beam may be an angle θ (see FIG. 7A). In some exemplary embodiments the angle θ spanned by the plurality of laser beams may be of the order of 2.4 degrees, although other angles are also contemplated, such 1-10 degrees, 1 degree, 5 degrees, or 10 degrees. As also described above, the common scanning unit may be configured to move or rotate about a tilt axis such that the plurality of laser beams may be displaced from the first plurality of locations to a second plurality of locations of the field of view. In some embodiments, the common scanning unit may be configured to rotate about the tilt axis by more than the angle θ (e.g., more than 2.4 degrees) defining the angular span of the plurality of laser beams. As a result, none of the scan lines in the second plurality of scan lines may occupy the region previously occupied by the first plurality of scan lines. That is, none of the scan lines in the second plurality of scan lines may be located between scan lines of the first plurality of scan lines.

By way of example, as illustrated in FIG. 9, in some embodiments, the plurality of laser beams spanning an angular dimension of θ may illuminate a plurality of locations spanning a height ΔH. Rotation of scanning unit 720, 860 about the tilt axis may displace each horizontal scan line (e.g., 921, 923, 925, 927, etc.) in the first plurality of scan lines by a distance ΔH or greater corresponding to, for example, an angular dimension or span θ (e.g., 2.4 degrees) of the laser beams or greater. Thus, for example, scan lines and 921, 923, 925, 927, etc. may correspond to a first scan pattern. After rotating the scanning mirror by an angle equal to or greater than the angular dimension θ of the laser beam array (e.g., ≥2.4 degrees), horizontal scan lines 929, 931, 933, 935, etc., may be generated during a second scan pattern. Because the scanning mirror is rotated by an angle equal to or greater than the angular dimension θ spanned by the laser beams, each of scan lines, for example, 929, 931, 933, 935 may be displaced from horizontal scan lines 921, 923, 925, 927, respectively, by distance ΔH or by an angle greater than angular dimension θ. As a result, as illustrated in FIG. 9, none of the scan lines in the second plurality of scan lines 929, 931, 933, 935 may be spatially located between any of the scan lines 921, 923, 925, 927 of the first plurality of scan lines.

In some embodiments, the second plurality of scan lines overlap with the first plurality of scan lines. In some embodiments, at least one scan line of the second plurality of scan lines is spatially located between two scan lines included in the first plurality of scan lines. As described above the common scanning unit may be configured to be rotated about a tilt axis. It is contemplated that the common scanning unit (e.g., scanning mirror) may be configured to be rotated by an angle that may be greater than or less than an angle θ corresponding to an angular span of the plurality of laser beams being directed by the common scanning unit towards the field of view. In some embodiments, the common scanning unit may be configured to be rotated about the tilt axis by an angle smaller than angle θ (e.g., 2.4°) corresponding to an angular span of the plurality of laser beams. In this situation, at least some of the scan lines in the second pattern of scan lines may overlap with the scan lines in the first pattern of scan lines. That is at least some of the scan lines in the second pattern of scan lines may be positioned between one or more of the scan lines in the first pattern of scan lines.

By way of example, as illustrated in FIG. 9, the first plurality of scan lines may include, for example, scan lines 921, 923, 925, 927, etc., that may span an angle θ (e.g., 2.4°). The common scanning unit (e.g., 720, 860) may be configured to be rotated about a tilt axis by an angle less than θ (e.g., 2.4°), which in turn may cause the plurality of laser beams to be displaced in a vertical direction by a distance less than ΔH. In this situation, one or more of scan lines 929, 931, 933, 935, etc., forming the second plurality of scan lines may overlap with one or more of the scan lines 921, 923, 925, 927, etc., forming the first pattern of scan lines. For example, scan line 931 may be positioned between scan lines 923 and 925.

Figure 10A:
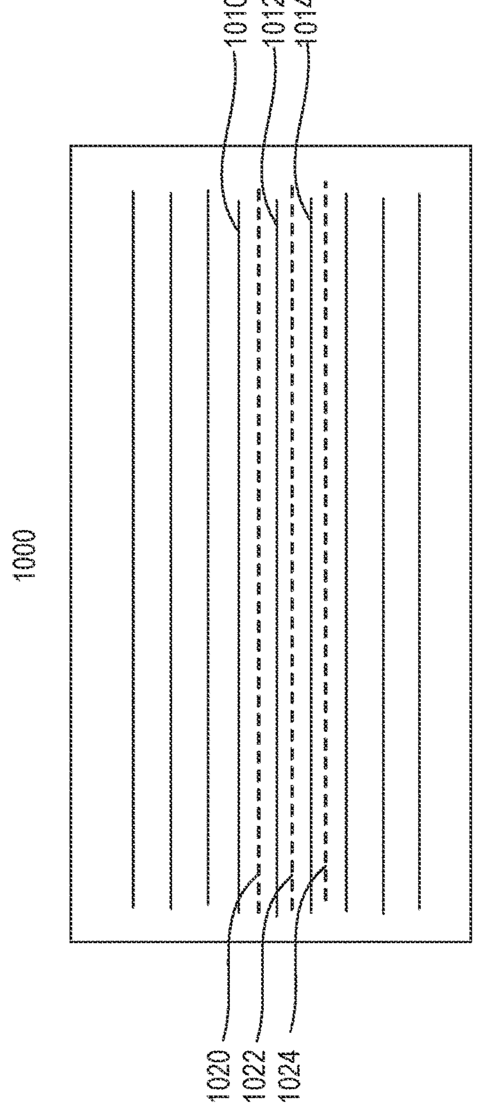
FIGS. 10A and 18B are diagrams illustrating examples of multi-step scans focused on sub-regions of the LIDAR field of view consistent with some embodiments of the present disclosure.

By way of another example, FIG. 10A illustrates an exemplary scan pattern 1000 obtained using a 2-D scanning mirror (e.g., MEMs mirror(s) of FIG. 3B, or biaxial mechanically rotated mirror, etc.) that may direct laser light beams from a laser source toward a field of view. For example, as illustrated in FIG. 10A, by sequentially rotating scanning unit 720, 860 about a scan axis, laser light beams may be directed along a plurality of points in a left-right direction as represented by a first plurality of scan lines 1010, 1012, 1014. Further by sequentially rotating scanning unit 720, 860 about a tilt axis, laser light beams may be displaced in a vertical direction. Subsequently, rotating the scanning unit 720,860 about the scan axis may direct the laser beams along a plurality of points in a left-right direction as represented by a second plurality of scan lines 1020, 1022, 1024. As also illustrated in FIG. 10A, the combined scanning unit may be rotated about the tilt axis by an angle smaller than a span of the plurality of laser beams configured to generate the first plurality of scan lines. As a result, one or more of scan lines 1020, 1022, 1024 may be positioned in between one or more of scan lines 1010, 1012, 1014. For example, as illustrated in FIG. 10A, scan line 1020 is positioned between scan lines 1010 and 1012. Likewise, scan line 1022 is positioned between scan lines 1012 and 1014.

In some embodiments, a displacement between the first set of locations and the second set of locations is a fraction of a size of a field-of-view pixel. For example, as described above, the common scanning unit (e.g., 720, 860) may be rotated about a tilt axis by an angle that may be smaller than angle θ associated with an angular span of the plurality of laser beams being directed by the common scanning unit towards the field of view. In some embodiments, the plurality of light beams may be displaced in the tilt (e.g., vertical direction) by a distance that may be a fraction or a multiple of a size of a field-of-view pixel. By way of example, in some embodiments the plurality of laser beams may be displaced by an amount that may be 0.333× a height of a field-of-view pixel, 0.5× a height of a FOV pixel, or 1.5× a height of a field-of-view pixel. As illustrated in FIG. 10A, the plurality of laser beams may be configured to traverse the field of view along scan lines 1010, 1012, 1014, etc. In some embodiments the common scanning unit may be rotated about a tilt axis by an angle smaller than angle θ associated with an angular span of the plurality of laser beams such that the scan lines in the second scan pattern may be displaced from the scan lines in the first scan pattern by a distance that may be a fraction of the field-of-view pixel size. By way of example as illustrated in FIG. 10A, rotation of the common scanning unit about the tilt axis may cause displacement of the plurality of laser beams from scan lines 1010, 1012, 1014, etc., to scan lines 1020, 1022, 1024, etc., respectively. As one example, a displacement or distance between scan lines 1012 and 1022 may be a fraction of the field-of-view pixel size. For example, a height of a field-of-view pixel may be denoted as px_height. In some exemplary embodiments, the distance between scan lines 1012 and 1022 may be 0.333*px_height or 1.5*px_height. It is to be understood that the multipliers 0.333 and 1.5 are exemplary and nonlimiting and further that the distance between scan lines in the first plurality of scan lines and corresponding scan lines in the second plurality of scan lines may be any fraction or multiple of the height of a field-of-view pixel.

In some embodiments, an amount of overlap between the first plurality of scan lines and the second plurality of scan lines is higher in a region of interest of the field of view as compared to other regions of the field of view. For example, the vertical rotation of the scanning mirror may be controlled to provide a variable resolution scan. Thus, the common scanning unit (e.g., 720, 860) may be configured to rotate about the tilt axis by an angle greater than or equal to angle θ associated with an angular span of the plurality of laser beams in certain portions of the field of view that may be outside a region of interest. In contrast, the common scanning unit may be configured to rotated about the tilt axis by an angle smaller than angle θ associated with an angular span of the plurality of laser beams in the region of interest of the field of view. As described above, rotating the common scanning unit by an angle smaller than angle θ associated with an angular span of the plurality of laser beams, may cause overlapping of the scan lines in the different patterns of scan lines. By allowing the scan lines to overlap in the region of interest, it may be possible to obtain an increased number of scans in the region of interest as compared to portions of the field of view that are outside the region of interest. Increasing the number of scans in the region of interest may in turn increase the resolution in the region of interest.

For example, in the scan shown in FIG. 9, for regions 980 and 982 near the top and bottom of the scan, respectively, the common scanning unit may be rotated about its vertical tilt axis by an angular increment at least as large as the angular dimension θ of the plurality of laser beams. Thus, in regions 980 and 982, the plurality of laser beams may be displaced by at least ΔH (which represents an angular span corresponding to the plurality of laser beams) each time the common scanning unit is rotated about the tilt axis. However, in region 984 including the horizon (e.g., between +/−5 degrees), the common scanning unit may be rotated about its vertical tilt axis by an angular increment less than the angular dimension θ of the plurality of laser beams. Rotating the common scanning unit by an angular increment less than the angular dimension θ of the plurality of laser beams may displace the laser beams by less than the dimension AH each time the common scanning unit is rotated in the tilt direction. This, in turn, may cause the scan lines in successive patterns of scanning to overlap with the scan lines in a previous pattern of scanning. As illustrated in FIG. 9, doing so may allow for increased scanning or sampling of the region of interest, thereby providing a higher resolution in the region of interest.

Figure 10B:
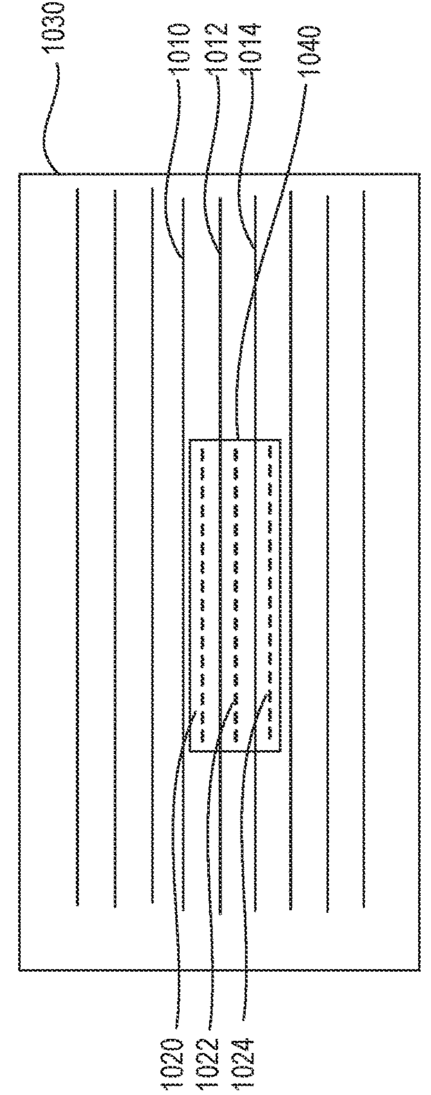

Further examples of multi-step scans focused on sub-regions of the LIDAR FOV are illustrated in FIGS. 10A and 10B. Multi-step scans entail scanning a first region during a first time period, and subsequently scanning a second region (e.g., a subregion of the of the LIDAR FOV) during a second time period. For example, as illustrated in FIG. 10A, a first scan (represented by scan lines 1010, 1012, 1014, etc.) may be performed during a first time period and a second scan (represented by scan lines 1020, 1022, 1024, etc.) may be performed during a second time period. As also illustrated in FIG. 10B, the second scan may be performed over a second region 1040 that may be smaller than first region 1030. In some cases, the sub-region of interest may extend across the entire FOV, and in other cases, the sub-region of interest may have a width less than the FOV.

Figure 11:
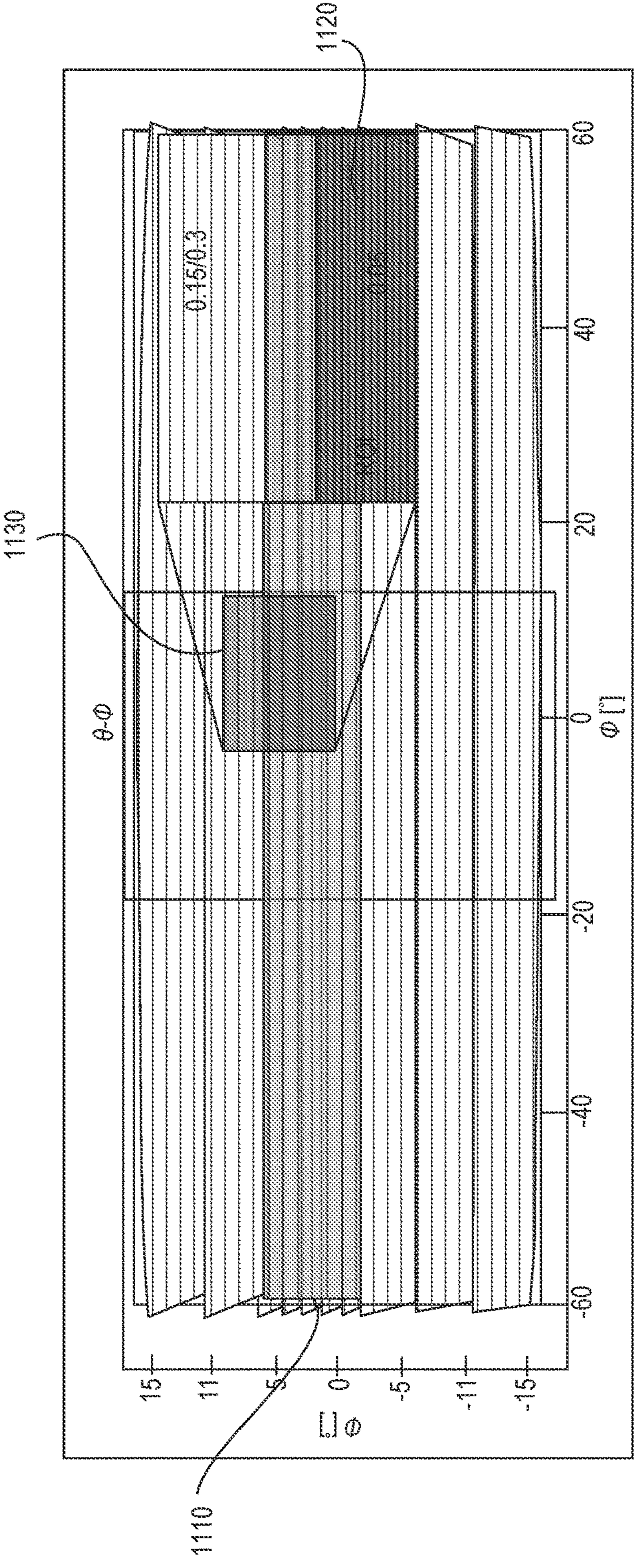
FIG. 11 is a diagram illustrating an exemplary scan pattern obtained using an exemplary LIDAR system consistent with some embodiments of the present disclosure.

FIG. 11 illustrates an exemplary scan pattern that may be obtained using the disclosed LIDAR system 100. As shown in FIG. 11, region 1110 may extend between about −1 degrees to about +6 degrees (which may include the horizon) and may correspond to a region of higher interest where a higher resolution may be desired. This higher resolution may be accomplished, for example, by incrementing the tilt of the scanning mirror about its vertical scan axis by an amount less than the total angular dimension θ spanning the plurality of laser beams. For example, in the region between about −6 degrees to about +6 degrees, six horizontal scans may be performed. Spacing the horizontal scans of the laser array more closely together may provide a higher resolution in the vertical direction (e.g., 0.05 degrees or 0.1 degrees in the region 1120).

The resolution may be increased even further. For example, by generating each of 11 laser beams from just one of the two laser sources, each of the generated beams may be emitted from a source having a vertical angular dimension of, for example, 0.05 degrees. By overlapping subsequent horizontal scans, and further adjusting the laser pulse frequency, a resolution of 0.05 degrees×0.05 degrees (for example) may be provided. Such a technique may be used, for example, to scan certain regions of interest (ROIs), for example, region 1130. Such ROIs may be predetermined within an FOV or may be identified based on a triggering event, such as a detection of a particular object or object type, a partial object detection, detection of an object within a certain distance range, detection of overlapping objects, etc.

The higher resolution may be obtained by using multi-beam scanning and controlling the vertical offset of the scan such that there is overlap between some of the regions that were previously scanned, and the subsequent scan. For example, an exploded view of region 1110 in the FOV is illustrated in FIG. 11 Error! Reference source not found. It can be seen that the resolution between 5-15 degrees is 0.15×0.3, whereas in the center of the ROI region, the resolution increases to 0.05×0.05. In between these regions, there may be a transition resolution that is between the lower resolution and the higher resolution.

Figure 12C:
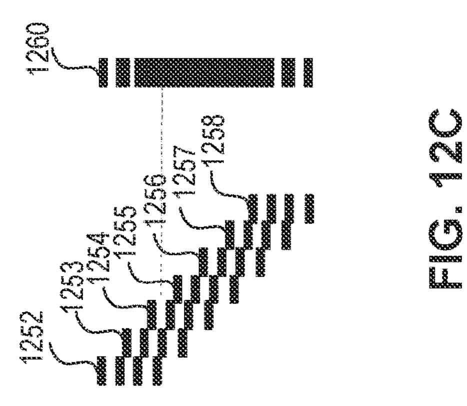
FIGS. 12A-12C are diagrams illustrating examples of overlapping scanning using multiple beam configurations consistent with some embodiments of the present disclosure.
Figure 12B:
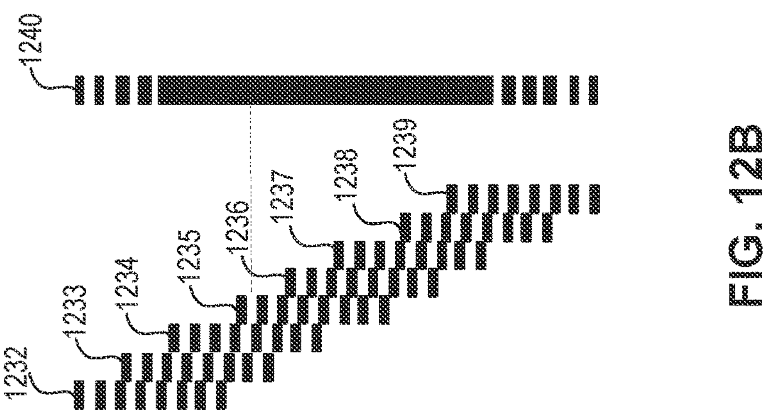
Figure 12A:
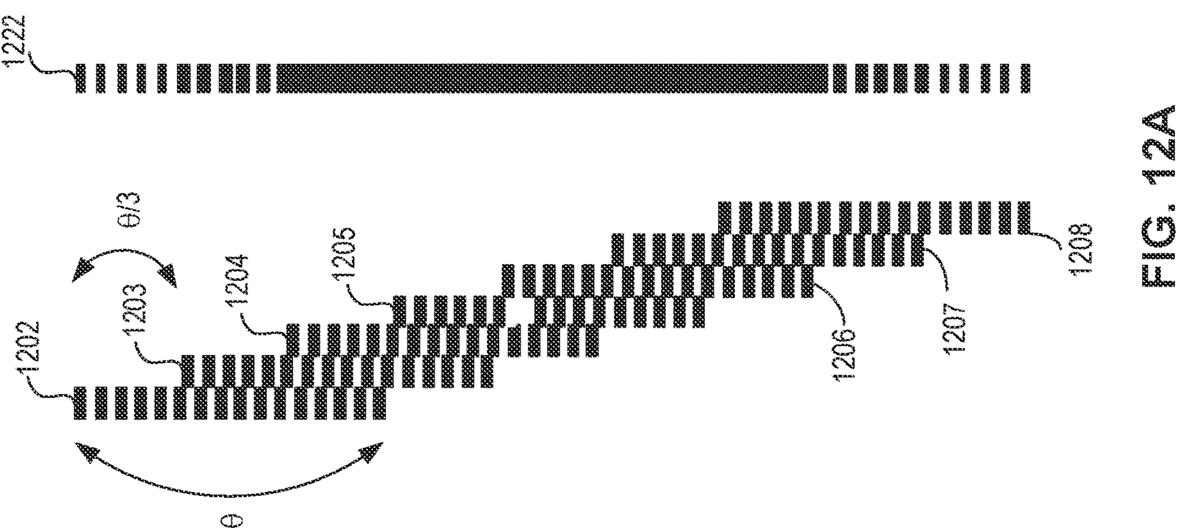

Several examples of overlapping scanning using multiple beam configurations to obtain a variable resolution are illustrated in FIGS. 12A, 12B, and 12C (e.g., using 16, 8, or 4 beams). For example, FIG. 12A, illustrates scans with 16 beams, where scans 1202-1208 are scans each with a rotation of the scanning mirror about the tilt axis by about ⅓ of the angular span θ of the plurality of laser beams. The resulting combined scan is represented by 1222. As can be seen from the combined scan 1222, the resolution gradually increases towards the center of the scan. Similarly, FIG. 12B, illustrates scans with 8 beams, where scans 1232-1239 are scans each with a rotation of the scanning mirror about the tilt axis by about ⅓ of the angular span θ of the plurality of laser beams. The resulting combined scan is represented by 1240. FIG. 12C similarly illustrates scans with 4 beams, where scans 1252-1258 are scans each with a rotation of the scanning mirror about the tilt axis by about ⅓ of the angular span θ of the plurality of laser beams. The resulting combined scan is represented by 1260. In these examples, because the distance between scan lines (i.e., corresponding to the angular displacement of the scanning mirror about its vertical scan axis) is equal to ⅓ of the angular span θ of the plurality of laser beams, the resolution may be increased to 3× that of the resolution obtained by displacing the plurality of beams by the angular span θ.

Figure 12D:
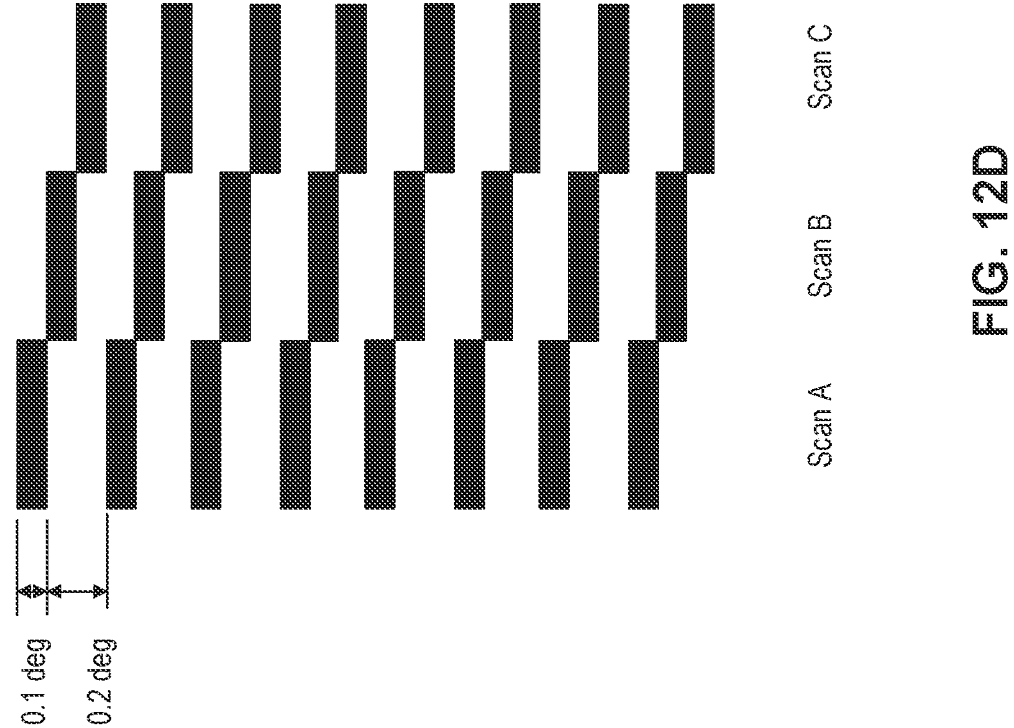
FIG. 12D is a diagram illustrating a close-up view of a portion of FIG. 12A consistent with some embodiments of the present disclosure.

In some embodiments, the at least one processor may cause the scanning unit to displace the plurality of laser beams from the first set of locations associated with the first plurality of scan lines to the second set of locations associated with the second plurality of scan lines by causing the scanning unit to rotate about a tilt axis by a rotational angle less than an angular spacing between one or more adjacent pairs of scan lines of the first plurality of scan lines. FIG. 12D illustrates a close-up view of a portion of FIG. 12A to further illustrate the increased resolution achievable through overlapping scans with a plurality of light beams. As illustrated in FIG. 12D, during Scan A, horizontal lines of the LIDAR FOV will be scanned at a vertical resolution of 0.3 degrees (the spacing between adjacently located laser beams). During a subsequent horizontal scan, Scan B, processor 118 may cause the scanning mirror to be angularly displaced only ⅓ of the vertical angular resolution of 0.3 degrees. During Scan B, horizontal lines of the LIDAR FOV will be scanned at a vertical resolution of 0.3 degrees (the spacing between adjacently located laser beams). Thus, during Scan B, the laser beams scan a different portion (or area) of the FOV as compared to Scan A. However, because the scanning mirror is displaced by only ⅓ of the vertical angular resolution of 0.3 degrees, Scan B partially overlaps with Scan A. As illustrated in FIG. 12D, this overlap in scans results in ½ of the non-illuminated region of Scan A being scanned during Scan B. Similarly, in a subsequent Scan C where the mirror is again tilted only by ⅓ of the vertical angular resolution of 0.3 degrees, the other half of the inactive region of Scan A is covered by Scan C. As a result, the vertical resolution achievable in this overlapping region may be increased from 0.3 degrees, using Scan A alone, to 0.1 degree using the overlap of Scans A, B, and C.

In some embodiments, the overlapping scans may be performed in two steps. In the first step, a subsequent scan may be performed after the scanning mirror is rotated about the tilt axis by an angle corresponding to an angular width of a collimated beam from the plurality of laser beams directed towards the field of view. This process may be continued for n times, where n=(angular spacing between adjacent collimated beams/angle by which scanning mirror is rotated). After the n scans have been completed, in the second step, an additional scan may be performed after rotating the scanning mirror about the tilt axis by an angle corresponding to the angular spacing between the adjacent collimated beams. For example, consider a situation where an angular size of each collimated beam is about 0.1° and an angular width between adjacent collimated beams is about 0.2°. In this case, in the first step, three scans may be performed by rotating the scanning mirror about the tilt axis after each scan by about 0.1°. In the second step, a fourth scan may be performed after rotating the scanning mirror by about the angle of the total angular width of a plurality of laser beams emitted by the laser array (e.g. for 16 beams, the total angular width of a plurality of laser beams emitted by the laser array is about 4.6°-5°). The angular displacements in this case about the tilt axis will be 0.1°, 0.1°, 4.6°, 0.1°, 0.1°, 4.6°, etc. This multi-step scanning scheme may provide a generally uniform sampling resolution over the entire FOV.

Figure 13:
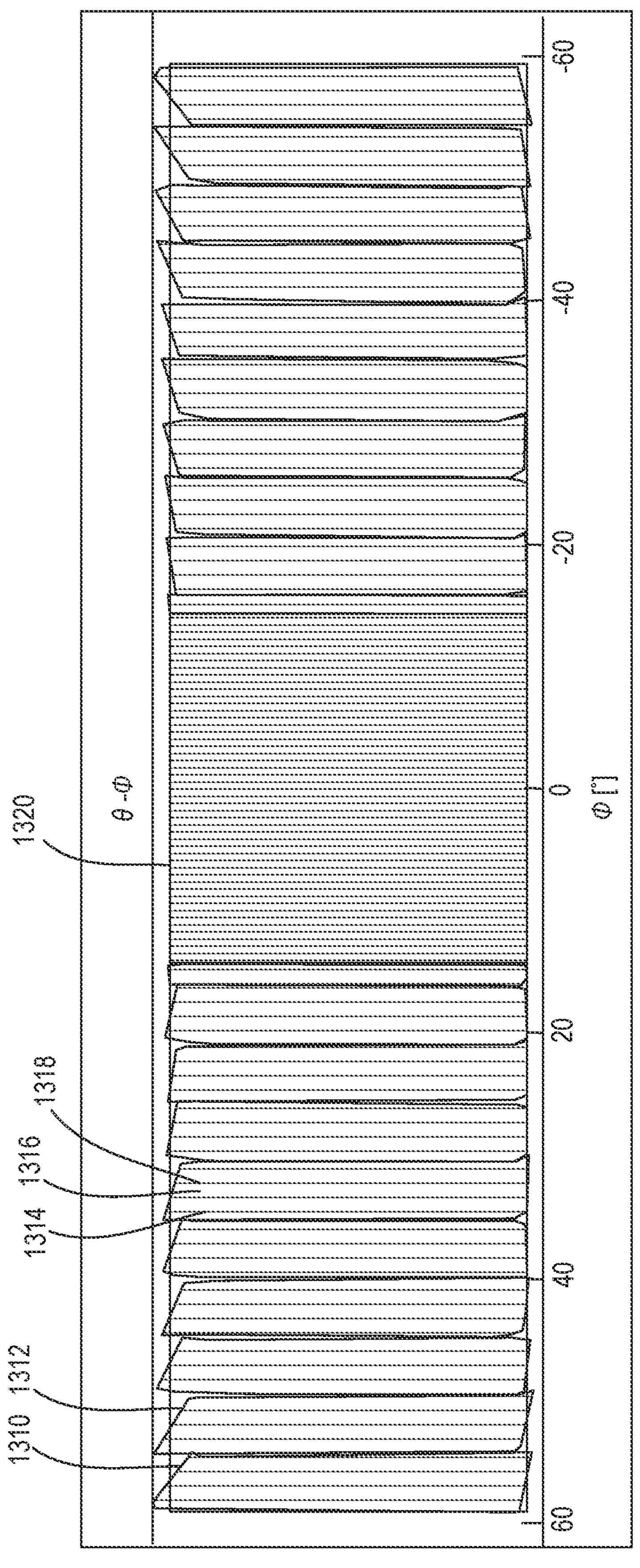
FIG. 13 is a diagram illustrating an exemplary scan pattern obtained using an exemplary LIDAR system consistent with some embodiments of the present disclosure.

As discussed above, in some embodiments, the first plurality of scan lines and the second plurality of scan lines may be vertically oriented relative to the field of view of the LIDAR system. Although the above description discloses a vertical comb pattern (or vertically oriented 1-D array) scanned horizontally over the FOV, some embodiments may employ a horizontally oriented light source array in which a horizontally oriented 1-D array of transmitted laser light spots are scanned vertically over the FOV. The principles, configurations, and embodiments discussed above may apply to vertical scanning systems, in which the scanning mirror is incremented angularly about its horizontal scan axis after each vertical scan of the LIDAR FOV accomplished by rotating the scanning mirror about its vertical scan axis. Such a technique may provide, for example, scan patterns as represented by FIG. 13. FIG. 13 illustrates an exemplary scan pattern including a plurality of scan line sets 1310 corresponding to a plurality of laser beams being scanned in an up-down (e.g., vertical) direction followed by rotation of the scanning mirror in the left-right direction. Each scan line set may include vertical scan lines 1312, 1314, 1316, 1318, etc. As also illustrated in FIG. 13, region 1320 may include scan lines that may be closer together and that may have been obtained by rotating the scanning mirror in a left-right direction by an angle less than an angular width of the plurality of laser beams.

In some embodiments, the common scanning unit is further configured to simultaneously scan the field of view along the first plurality of scan lines by sequentially illuminating non-contiguous segments in a first set of non-contiguous segments of the field of view positioned along the first plurality of scan lines. As discussed above, the field of view of the disclosed LIDAR system may be divided into plurality of segments (or field-of-view pixels) that may be disposed along each of the plurality of scan lines. To avoid damage to a human eye present in the field of view, the disclosed LIDAR system may illuminate non-contiguous segments disposed along each of the plurality of scan lines. The plurality of segments disposed along a particular scan line may be divided into several sets of non-contiguous segments. For example, a first set of non-contiguous segments may include segments, disposed along the scan line, but separated by one or more other segments. As one example, the first set of non-contiguous segments may include every alternate, every third, every fourth, or every nth segment selected from the plurality of segments disposed along the scan line.

Figure 14:
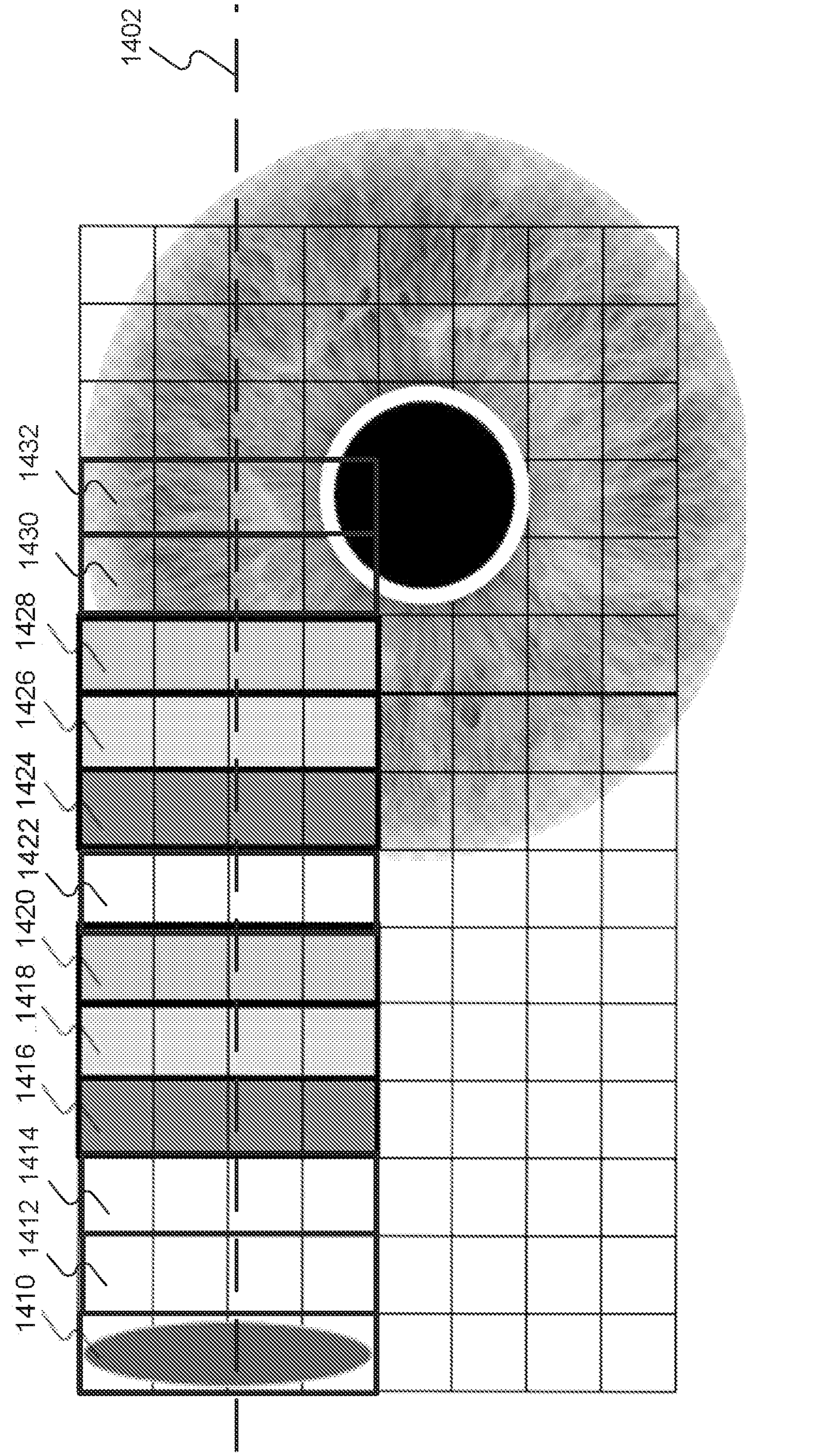
FIG. 14 is a diagram illustrating a portion of an exemplary field of view of a LIDAR system consistent with disclosed embodiments.

By way of example, FIG. 14 illustrates a portion of a field of view 1400 in which a plurality of segments (e.g., 1410, 1412, 1414, 1416, 1418, 1420, 1422, 1424, 1426, 1428, 1430, 1432, etc.) are disposed along scan line 1402. A first set of non-contiguous segments selected from these plurality of segments may include every fourth segment, for example, segments 1410, 1416, 1422, 1428. As illustrated in FIG. 14, each successive pair of segments in this set of non-contiguous segments is separated by at least two other segments.

For example, non-contiguous segments 1410 and 1416 are separated by segments 1412 and 1414. Similarly, non-contiguous segments 1416 and 1422 are separated by segments 1418 and 1420. It is contemplated that the plurality of segments disposed along a scan line may be divided into a plurality of sets of non-contiguous segments. For example, in the illustration of FIG. 14, a second set of non-contiguous segments may include segments 1412, 1418, 1424, 1430, etc. As seen in FIG. 14, the pair of segments 1412 and 1418 in the second set of non-contiguous segments may be separated by segments 1414 and 1416. Likewise the pair of segments 1418 and 4024 in the second set of non-contiguous segments may be separated by segments 1420 and 1422. As another example, in the illustration of FIG. 14, a third set of non-contiguous segments may include segments 1414, 1420, 1426, and 1432.

To avoid damage to a human eye present in the field of view, the common scanning unit may be configured to sequentially illuminate non-contiguous segments 1410, 1416, 1422, 1428, without illuminating intervening segments 1412, 1414, 1418, 1420, 1424, and 1426. After the sequentially illumination of the first set of non-contiguous segments (e.g., segments 1410, 1416, 1422, 1428), the common scanning unit may be configured to sequentially illuminate the second set of non-contiguous segments 1412, 1418, 1424, 1430, etc., in the second set of non-contiguous segments. Although only one scan line 1402 has been described above, it is contemplated that each of the plurality of scan lines (e.g., scan lines 921, 923, 925, 927 of FIG. 9) may include a plurality of segments (e.g., similar to those described above with respect to FIG. 14), and further that each of the plurality of scan lines (e.g., scan lines 921, 923, 925, 927 of FIG. 9) may include one or more sets of non-contiguous segments as described above.

Figure 15A:
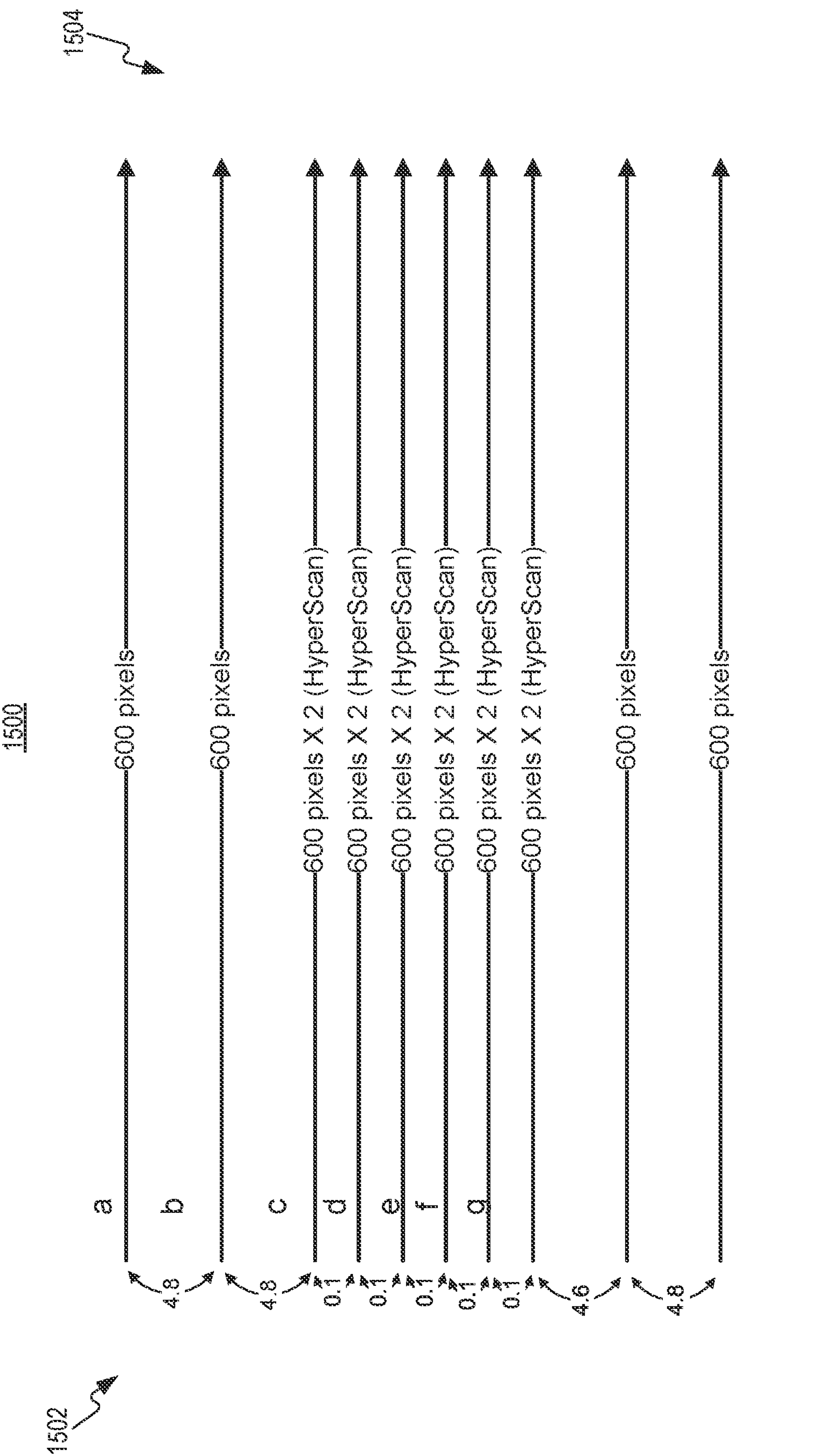
FIG. 15A is a diagram illustrating exemplary scan lines traversing a field of view consistent with some embodiments of the present disclosure.

FIG. 15A illustrates a plurality of a horizontal scan lines (e.g., a, b, c, d, e, f, etc.) traversing a field of view 1500 from a minimum extent (e.g., left-most end) 1502 to a maximum extent (e.g., right-most end) 1504. FIG. 15B illustrates a plurality of segments disposed along one or more of scan lines c, d, e, f, and g. As illustrated in FIG. 15B, the common scanning unit may be configured to sequentially illuminate the non-contiguous segments labeled 1A, 1B, and 1C, included in a first set of non-contiguous segments, and disposed along the first set of scan lines c and f. That is, the common scanning unit may be configured to illuminate segments labeled 1A along scan lines c and f at a first time, segments labeled 1B along scan lines c and f at a second time after the first time, and segments labeled 1C along scan lines c and f at a third time after the second time and so on without illuminating any of the intervening segments labeled 2A, 2B, or 2C between the first and second time or between the second and third time. Furthermore, the common scanning unit may also be configured to sequentially illuminate the segments labeled 1A, 1B, and 1C without illuminating any of segments 3A, 4A, 5A, 3B, 4B, 4C, 5A, 5B, 5C, 6A, 6B, or 6C during the intervening time period between the first time and the second time. or during the intervening time period between the second time and the third time. By doing so, the common scanning unit may be configured to traverse the field of view along scan lines c and f while limiting the amount of energy that may enter an eye that may be present in the field of view. Each of the illuminations directed to the non-contiguous segments in the first set of non-contiguous segments may not exceed a predetermined threshold amount of energy. In some embodiments, the predetermined threshold amount of energy may be an illumination level associated with a standard maximum permissible exposure (MPE), which may be the highest power or energy density (in W/cm2 or J/cm2) of the light directed to a human being that is considered safe, i.e., that has a negligible probability for creating damage. For example, a standard maximum permissible exposure (MPE) may meet the requirement of class 1 eye safety (e.g., according to standard 60825-1 of the International Electrotechnical Commission (IEC)).

In some embodiments, the common scanning unit is further configured to simultaneously scan the field of view along the first plurality of scan lines more than once by sequentially illuminating a second set of non-contiguous segments of the field of view positioned along the first plurality of scan lines after having sequentially illuminated the non-contiguous segments in the first set of non-contiguous segments. As discussed above, a plurality of segments disposed along a particular scan line may be divided into several sets of non-contiguous segments. For example, a first set of non-contiguous segments may include segments disposed along the scan line and separated by one or more other segments. As one example, the first set of non-contiguous segments may include every third, or every nth segment selected from the plurality of segments disposed along the scan line. A second set of non-contiguous segments may include every second or every (n−1) th segment. The common scanning unit may be configured to rotate about the scan axis such that the plurality of laser beams directed towards the field of view may sequentially illuminate the segments included in the first set of non-contiguous segments without illuminating any segments disposed between the first set of non-contiguous segments or any other segments not included in the first set of non-contiguous segments. After having illuminated all the segments in the first set of non-contiguous segments, the common scanning unit may be configured to rotate about the scan axis such that the plurality of laser beams directed toward the field of view may sequentially illuminate the segments included in the second set of non-contiguous segments without illuminating any segments disposed between the second set of non-contiguous segments or any other segments not included in the second set of non-contiguous segments. By scanning the second set of non-contiguous segments after scanning all of the segments in the first set of non-contiguous segments, the common scanning unit may be configured to scan the same scan line more than once.

By way of example, FIG. 15A illustrates a plurality of a horizontal scan lines (e.g., a, b, c, d, e, f, etc.) traversing a field of view 1500 from a minimum extent (e.g., left-most end) 1502 to a maximum extent (e.g., right-most end) 1504. FIG. 15B illustrates a plurality of segments disposed along one or more of scan lines c, d, e, and f. As illustrated in FIG. 15B, a first set of non-contiguous segments disposed along scan lines c and f may include, for example, segments labeled 1A, 1B, and 1C. A second set of non-contiguous segments disposed along scan lines c and f may include, for example, segments labeled 2A, 2B, and 2C. In some embodiments, the common scanning unit may be configured to rotate about the scan axis to sequentially illuminate the non-contiguous segments labeled 1A, 1B, and 1C along the first set of scan lines c and f. That is, the common scanning unit may be configured to rotate about the scan axis to sequentially illuminate the segments included in the first set of non-contiguous segments. For example, the common scanning unit may be configured to illuminate segments labeled 1A along scan lines c and f at a first time, segments labeled 1B along scan lines c and f at a second time after the first time, and segments labeled 1C along scan lines c and f at a third time after the second time and so on without illuminating any of the intervening segments labeled 2A, 2B, or 2C between the first and second time or between the second and third time. The common scanning unit may also be configured to not illuminate any of the segments labeled 3A, 4A, 5A, 3B, 4B, 4C, 5A, 5B, 5C, 6A, 6B, or 6C during the intervening time period between the first time and the second time or during the intervening time period between the second time and the third time.

After illuminated the segments (e.g., 1A, 1B, and 1C) in the first set of non-contiguous segments, the common scanning unit may be configured to rotate about the scan axis to sequentially illuminate segments included in the second set of non-contiguous segments (e.g., 2A, 2B, and 2C) disposed along the first set of scan lines c and f. That is, the common scanning unit may be configured to illuminate segments labeled 2A along scan lines c and f at a fourth time, segments labeled 2B along scan lines c and f at a fifth time after the fourth time, and segments labeled 2C along scan lines c and f at a sixth time after the fifth time and so on without illuminating any of the segments labeled 1A, 1B, or 1C between the fourth and fifth time or between the fifth and sixth time. The common scanning unit may also be configured to not illuminate any of the segments labeled 1A, 1B, 1C, 3A, 4A, 5A, 3B, 4B, 4C, 5A, 5B, 5C, 6A, 6B, or 6C during the intervening time period between the fourth time and the fifth time or during the intervening time period between the fifth time and the sixth time. By doing so, the common scanning unit may be configured to traverse the field of view along scan lines c and f while limiting the amount of energy that may enter an eye that may be present in the field of view in a given time period. Each of the illuminations directed to the non-contiguous segments in the first set of non-contiguous segments or the second set of non-contiguous segments may not exceed a predetermined threshold amount of energy. In some embodiments, the predetermined threshold amount of energy may be an illumination level associated with a standard maximum permissible exposure (MPE), which may be the highest power or energy density (in W/cm2 or J/cm2) of the light directed to a human being that is considered safe, i.e., that has a negligible probability for creating damage. For example, a standard maximum permissible exposure (MPE) may meet the requirement of class 1 eye safety (e.g., according to standard 60825-1 of the International Electrotechnical Commission (IEC)). One of skill in the art would recognize that if contiguous segments were illuminated with no time gap between the illuminations, the total amount of energy to which a human eye may be exposed may exceed the MPE. Thus, in the present disclosure, by avoiding illumination of contiguous segments, it is possible to ensure that a human eye in the LIDAR FOV is not exposed to an energy level higher than the MPE.

As discussed above with respect to FIG. 15B, the first set of non-contiguous segments (e.g., 1A, 1B, 1C), and the second set of non-contiguous segments (e.g., 2A, 2B, 2C) are both disposed along scan lines c and f. Thus, by scanning the second set of non-contiguous segments (e.g., 2A, 2B, 2C) after scanning all of the segments in the first set of non-contiguous segments (e.g., 1A, 1B, 1C), common scanning unit is configured to scan each of the scan lines c and f more than once. Moreover, although the scan lines c and f have been described above as being associated with only two sets of non-contiguous segments, it is contemplated that scan c and f or other scan lines in the field of view may be associated with any number of sets of non-contiguous segments. Thus, by sequentially scanning different sets of non-contiguous segments disposed along a same scan line, the common scanning unit may be configured scan that scan line more than once (e.g., more than two times, more than three times, more than four times, etc.).

In some embodiments, each non-contiguous segment included in the second set of non-contiguous segments is located between successive non-contiguous segments in the first set of non-contiguous segments. In some embodiments, each non-contiguous segment in the second set of non-contiguous segments is contiguous with a non-contiguous segment in the first set of non-contiguous segments. For example, as discussed above, and as illustrated in FIG. 15B, each of the non-contiguous segments 2A, 2B, 2C in the second set of non-contiguous segments is located between successive non-contiguous segments included in the first set of non-contiguous segments (e.g., 1A, 1B, 1C). In particular, non-contiguous segment 2A is located between successive non-contiguous segments 1A and 1B, non-contiguous segment 2B is located between successive non-contiguous segments 1B and 1C, and so on. Moreover each of the non-contiguous segments 2A, 2B, 2C and the second set of non-contiguous segments is contiguous with a non-contiguous segment in the first set of non-contiguous segments (e.g., 1A, 1B, 1C). For example, segment 2A (e.g., which is part of the second set of non-contiguous segments) is contiguous (e.g., attached to and adjacent to) segment 1A (e.g., which is part of the first set of non-contiguous segments). Similarly, for example, segment 2B (e.g., which is part of the second set of non-contiguous segments) is contiguous (e.g., attached to and adjacent to) segment 1B (e.g., which is part of the first set of non-contiguous segments).

By way of another example, referring again to FIG. 14, a first set of non-contiguous segments along a scan line 1402 may include, for example, segments 1410, 1418, 1426, etc., and a second set of non-contiguous segments along the scan line 1402 may include, for example, segments 1414, 1422, 1430, etc. Thus, for example, each of non-contiguous segments 1414, 1422, 1430 may be located between successive non-contiguous segments of the first set of non-contiguous segments. More particularly, non-contiguous segment 1414 may be located between successive non-contiguous segments 1410 and 1418 of the first set of non-contiguous segments, non-contiguous segment 1422 may be located between successive non-contiguous segments 1418 and 1426 of the first set of non-contiguous segments, and so on. However, in contrast to the embodiment illustrated in FIG. 15B, in the above example, segments in the second set of non-contiguous segments (e.g., 1414, 1422, 1430, etc.) are not contiguous with segments in the first set of non-contiguous segments (e.g., 1410, 1418, 1426). For example, segment 1414 (e.g., which is part of the second set of non-contiguous segments) is not contiguous with segment 1410 or 1418 (e.g., which are part of the first set of non-contiguous segments) because segment 1414 is separated from segment 1410 by segment 1412, and similarly segment 1414 is separated from segment 1418 by segment 1416. Likewise, for example, segment 1422 (e.g., which is part of the second set of non-contiguous segments) is not contiguous with segment 1418 or 1426 (e.g., which are part of the first set of non-contiguous segments) because segment 1422 is separated from segment 1418 by segment 1420, and similarly segment 1422 is separated from segment 1426 by segment 1424.

In some embodiments, the non-contiguous segments in the first set of non-contiguous segments are separated by regions having a size that is a multiple of a size of a field-of-view pixel. As discussed above, in some embodiments, non-contiguous segments of the field of view included in the first set of non-contiguous segments are separated from each other by one or more other segments (or field-of-view pixels) of the field of view. The segments separating the non-contiguous segments in the first set of non-contiguous segments may have the same size as or a size different from the non-contiguous segments in the first set of non-contiguous segments. In some embodiments a size of the segments separating the non-contiguous segments in the first set of non-contiguous segments may be a multiple of a size of the field-of-view pixel. For example, the size of the segments separating the non-contiguous segments in the first set of non-contiguous segments may be 1.25×px_size, 1.5×px_size, 0.33×px_size, or some other multiple of the field-of-view pixel size. By way of example, referring to FIG. 15B, a size of segment 2A, separating non-contiguous segments 1A and 1B may be 1.25 times, 1.5 times, or 0.33 times a size of segments 1A or 1B.

In some embodiments, the common scanning unit is further configured to initiate sequential illumination of the non-contiguous segments in the first set of non-contiguous segments at a first time, and initiate sequential illumination of the non-contiguous segments in the second set of non-contiguous segments at a second time, wherein the second time is after the first time. As discussed above, in some embodiments, the common scanning unit may be configured to rotate about a scan axis such that a segment included in the second set of non-contiguous segments may be illuminated only after all the segments included in the first set of non-contiguous segments have previously been illuminated.

As discussed above, FIG. 15B illustrates the plurality of segments disposed along one or more of scan lines c, d, e, and f. As illustrated in FIG. 15A, a first set of non-contiguous segments disposed along scan lines c and f may include, for example, segments labeled 1A, 1B, and 1C, whereas a second set of non-contiguous segments disposed along scan lines c and f may include, for example, segments labeled 2A, 2B, and 2C. In some embodiments, the common scanning unit may be configured to rotate about the scan axis to sequentially illuminate the non-contiguous segments labeled 1A, 1B, and 1C along the first set of scan lines c and f. For example, the common scanning unit may be configured to illuminate segments labeled 1A along scan lines c and f at a time $t_{10}$, segments labeled 1B along scan lines c and f at a time $t_{11}$ after time $t_{10}$, and segments labeled 1C along scan lines c and f at a time $t_{12}$ after time $t_{11}$. After illuminating all the segments included in the first set of non-contiguous segments (e.g., 1A, 1B, 1C, etc.), the common scanning unit may be configured to rotate about the scan axis to sequentially illuminate segments included in the second set of non-contiguous segments. For example, the common scanning unit may be configured to illuminate segments labeled 2A along scan lines c and f at time $t_{20}$, segments labeled 2B along scan lines c and f at a time $t_{21}$ after time $t_{20}$, and segments labeled 2C along scan lines c and f at a time $t_{22}$ after time $t_{21}$. Thus, for example, the common scanning unit may be configured to illuminate non-contiguous segments in the second set of non-contiguous segments (e.g., 2A, 2B, 2C, etc.) at a second time $t_{10}$ that may occur after the first time $t_{10}$, and in fact after times $t_1$ and $t_{12}$.

In some embodiments, a difference between the first time and the second time corresponds to an elapsed time period for sequentially illuminating all the non-contiguous segments in the first set of non-contiguous segments. By way of example, an elapsed time period between the time $t_{10}$ and time $t_{10}$ in the above example may be determined as a difference Δt between the time $t_{10}$ and the second time $t_{20}$. That is, the common scanning unit may be configured to illuminate segments in the second set of non-contiguous segments (e.g., 2A, 2B, 2C, etc.) after a time period of Δt has elapsed since illuminating segment labeled 1A in the first set of non-contiguous segments (e.g., 1A, 1B, 1C). Thus, the elapsed time period Δt for sequentially illuminating all the non-contiguous segments (e.g., 1A, 1B, 1C) in the first set of non-contiguous segments (e.g., 1A, 1B, 1C) may correspond to a difference between time $t_{10}$ and time $t_{20}$.

Figure 17A:
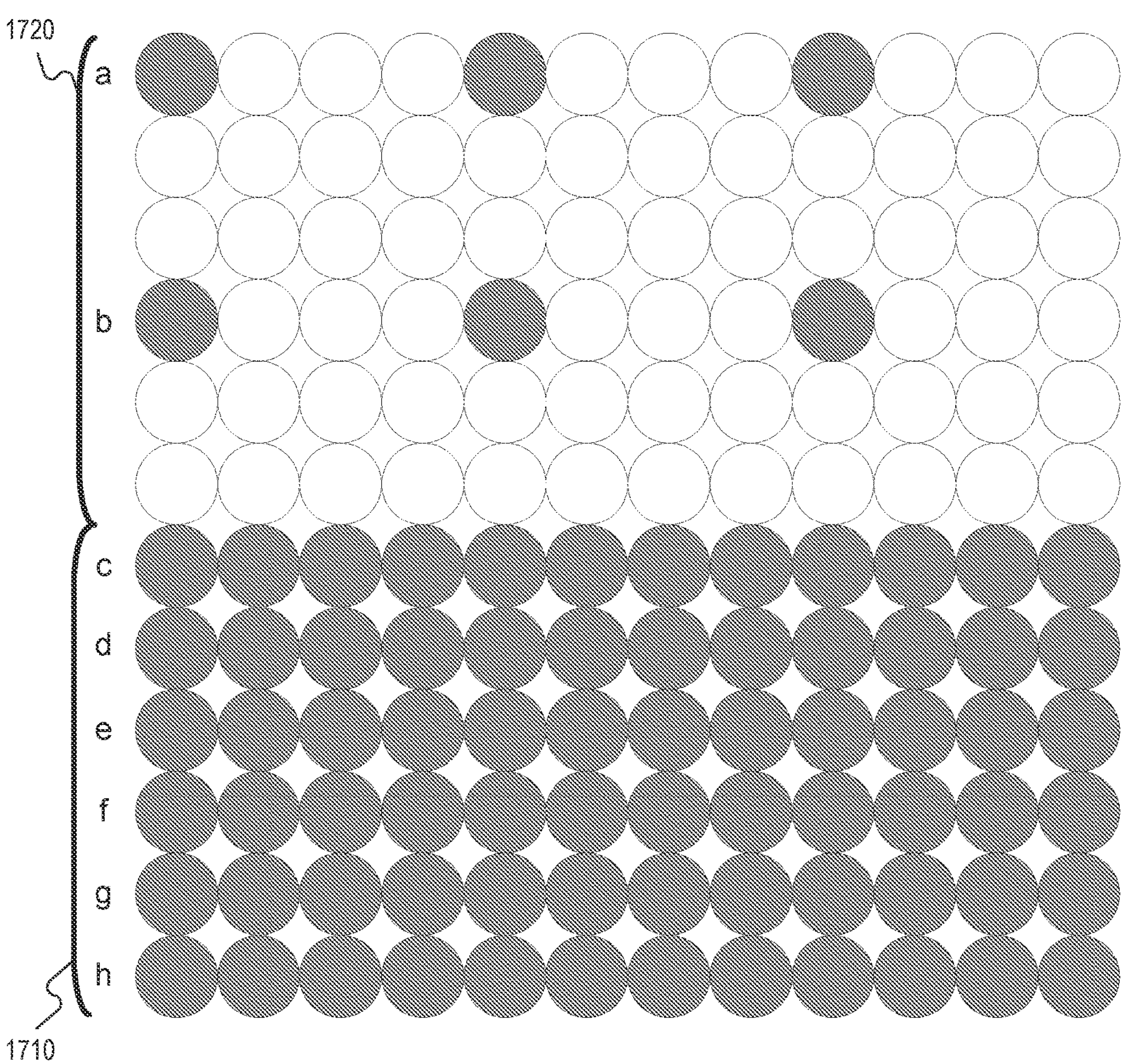
FIG. 17A illustrates an exemplary field of view divided into a plurality of segments (or field-of-view pixels) consistent with some embodiments of the present disclosure.

As described below, scanning the field of view using more than one laser beam and illuminating non-contiguous segments as described above has several advantages. For example, FIG. 17A illustrates an exemplary field of view 1700 divided into a plurality of segments (or field-of-view pixels) as illustrated by the circular regions. Consider a situation where region 1710 is the region of interest of field of view 1700, and whereas region 1720 is outside the region of interest. Further, consider that each field-of-view pixel has a size of 0.05 degrees×0.05 degrees. Also consider a situation where the scanner travels across the field of view in a predetermined amount of time (e.g. M seconds). In a conventional LIDAR system that includes a single laser beam, the LIDAR system would need to generate 3 laser spots (or pulses) per M seconds in region 1720, which is outside the field of view. This would provide a resolution of about 0.2 degrees×0.15 degrees (4×3 field-of-view pixels) in region 1720. To get a finer resolution, for example, of 0.05 degrees×0.05 degrees in the region of interest 1710, the conventional LIDAR system would have to emit 12 spots (or pulses) per M seconds.

Figure 17B:
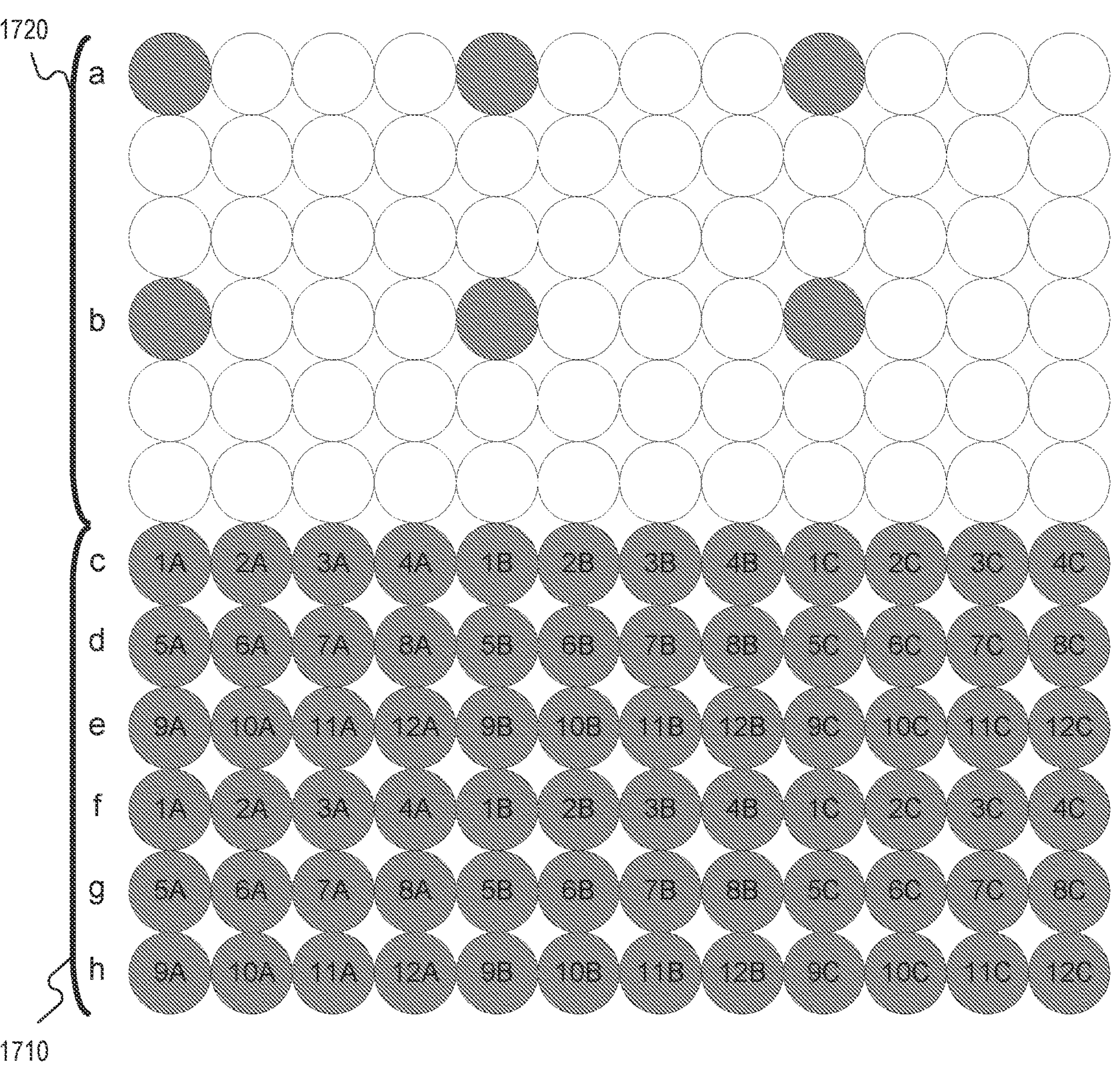
FIG. 17B illustrates another exemplary field of view divided into a plurality of segments (or field-of-view pixels) consistent with some embodiments of the present disclosure.

Alternatively, consider a LIDAR system consistent with the present disclosure that includes at least 2 laser beams. As illustrate in FIG. 17B, in the region 1720, outside the region of interest, the LIDAR system would need to emit 3 spots per M seconds, per beam to be able to scan all 6 spots in region 1720. The common scanning unit may then rotate about its tilt axis so that the two laser beams may be directed towards segments 1A of scan lines c and f, as illustrated in FIG. 17B. As discussed above, the LIDAR system may be configured to illuminate non-contiguous segments 1A, 1B, and 1C in scan lines c and f in region 1710. After illuminating spots 1A, 1B, and 1C, the common scanning unit may scan the same scan lines c and f again by illuminating spots 2A, 2B, and 2C. Thus, the common scanning unit may spend 4M seconds to fully scan all the segments in rows c and f. The common scanning unit may then rotate about the tilt axis to direct the two laser beams towards segments 5A in rows d and g. By a process similar to that described for rows c and f, the common scanning unit may spend 4M seconds to fully scan all the segments in rows d and g. And similarly, the common scanning unit may spend 4M seconds to fully scan all the segments in rows e and h. Thus, in FIG. 17B, the common scanning unit may take 12M seconds to fully scan region 1710 as compared to only 6M seconds required by a LIDAR unit having a single beam as discussed with respect to FIG. 17A.

Figure 18A:
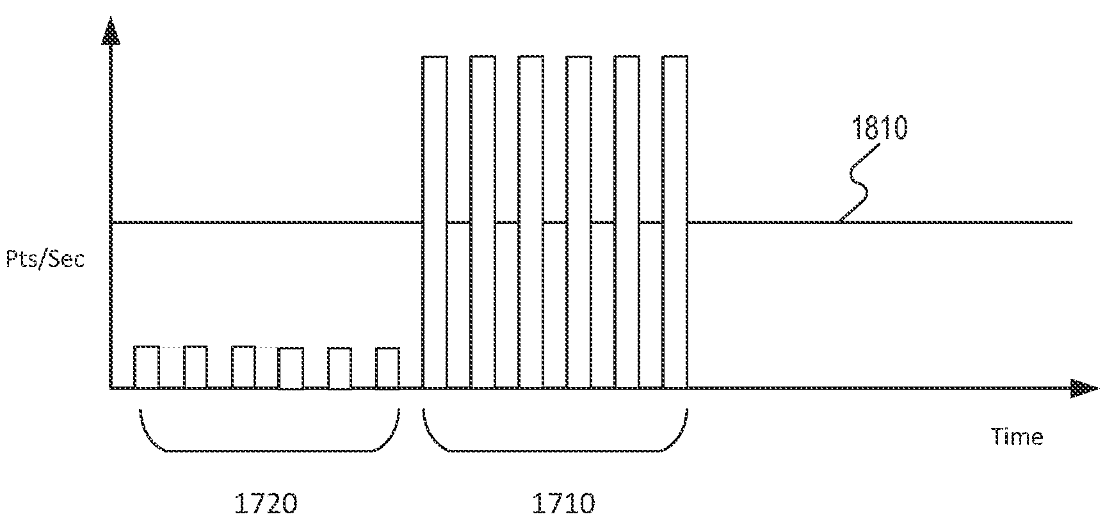
Figure 18B:
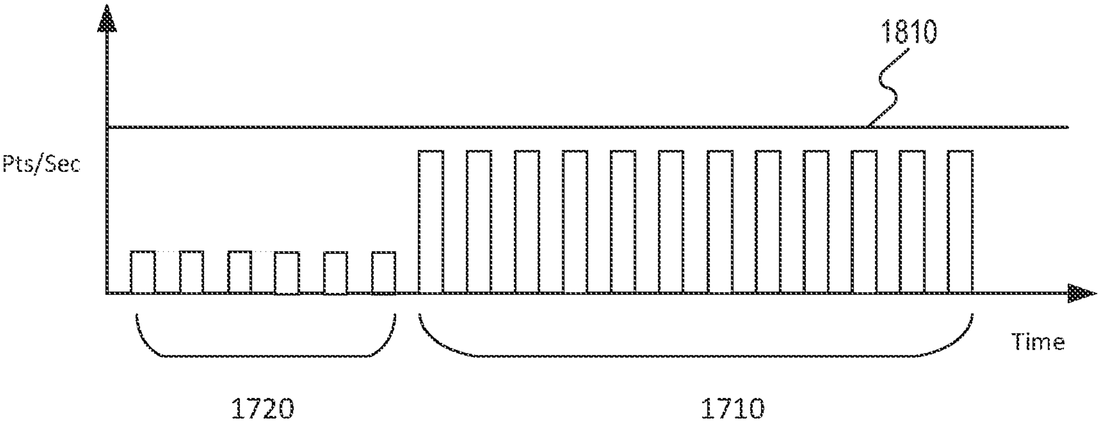

FIGS. 18A and 18B illustrate graphs showing the number of points or pulses per second that may be emitted in regions 1710 and 1720 and the time over which such pulses should be emitted. FIG. 18A illustrates the graph for the conventional LIDAR system having only one laser beam. As shown in FIG. 18A, in the conventional LIDAR system the number of spots (pulses) per second that may be emitted in region 1720 (which is not the region of interest) is low. In contrast, in the conventional LIDAR system a significantly higher number of spots (pulses) per second may be emitted in region 1710 (which is the region of interest). Line 1810 illustrates a limit imposed by one or more system constraints such as maximum available computing power, bandwidth of communications interfaces in the LIDAR system, amount of power available to drive the LIDAR system components, amount of heating of the LIDAR system components due to laser pulse emission, and amount of time required to receive information from a field of view pixel. As seen in FIG. 18A, in region 1710, because a significantly increased number of laser pulses may be emitted per second, the LIDAR system significantly exceeds the system performance limit as illustrated by line 1810. In other words, the LIDAR system may not be able to provide the required higher number of pulses per second to meet the resolution requirement in region 1710 of the field of view. Alternatively, more system power, more computing power, more bandwidth, increased system cooling, etc. may be required to enable the LIDAR system to provide the increased number of pulses per second. Any one or more of these modifications may increase the size and number of components, making the LIDAR system larger, more expensive, and more unreliable due to an increased likelihood of failure or malfunction of the larger number of components.

In contrast, FIG. 18B illustrates the number of pulses per second in regions 1710 and 1720 with the LIDAR system of the present disclosure. As illustrated in FIG. 18B, the number of pulses per second in region 1720 (which is outside the region of interest) is about the same as for the conventional LIDAR system (compare FIGS. 18A and 18B). In region 1710 (which is the region of interest), although the pulses per second used in the LIDAR system of the present disclosure is higher than for region 1720, the system operational parameters are still well within the limit illustrated by line 1810. Although a greater amount of time is used to fully scan region 1720 as compared to the conventional LIDAR system, because the system operates within the limit (shown by line 1810), the disclosed LIDAR system is much more efficient, may have a smaller number of components, may operate at a lower amount of overall power consumption, and may require less cooling. Thus, the LIDAR system of the present disclosure may advantageously be smaller, cheaper, and more reliable as compared to a conventional single beam LIDAR system.

Another advantage of the LIDAR system of the present disclosure is that the resolution in any portion of the field of view is determined based on the number of scans of each of the scan lines in that portion. It may be possible for a LIDAR system to account for different resolutions in different portions of the field of view by having inactive regions between active regions of a laser beam emission unit. However, such an arrangement limits the conventional systems to a predetermined region of interest based on the arrangement of the active and inactive regions. Moreover, using such active and inactive regions on the laser array make the dimensions of the LIDAR system large and make the system more expensive. In contrast, the LIDAR system of the present disclosure can be used to scan arbitrary regions of interest in a field of view simply by scanning the scan lines in the regions of interest more than once using the same hardware components. Thus, the LIDAR system of the present disclosure provides a versatile solution with a smaller sized and inexpensive LIDAR system.

In some embodiments, the common scanning unit is further configured to sequentially illuminate non-contiguous segments in both the first set of non-contiguous segments and the second set of non-contiguous segments in a same direction from a minimum to a maximum extent of the field of view. As discussed above, the common scanning unit may be configured to rotate about a scan axis such that the plurality of laser beams directed by the common scanning unit towards the field of view traverse the field of view from a minimum extent of the field of view to a maximum extent of the field of view. By way of example, as illustrated in FIG. 15A, the common scanning unit may be configured to rotate about the scan axis such that the plurality of laser beams traverse the field of view 1500 from a minimum extent 1502 (e.g., left-most end) to a maximum extent 1504 (e.g., right-most end) in a first direction. For example, as discussed above, the common scanning unit may be configured to cause the plurality of laser beams to traverse the field of view in a left-to-right direction. As also discussed above, the common scanning unit may be configured to scan along the scan lines more than once by first illuminating non-contiguous segments in a first set of non-contiguous segments and subsequently illuminating segments in a second set of non-contiguous segments disposed along the scan lines, and so on. In some embodiments, the common scanning unit may be configured to rotate about the scan axis such that segments in the first set of non-contiguous segments are sequentially illuminated in a direction (e.g., left-to-right direction) and subsequently segments in the second set of non-contiguous segments are also illustrated in the same direction (e.g., left-to-right direction).

By way of example and referring to FIG. 15B, as discussed above, the common scanning unit may be configured to rotate about a scan axis to sequentially illuminate segments labeled 1A, 1B, 1C, which are included in the first set of non-contiguous segments in a left-to-right direction from a minimum extent 1502 to a maximum extent 1504 of the field of view. Furthermore the common scanning unit may be configured to rotate about the scan axis to subsequently, sequentially illuminate segments labeled 2A, 2B, 2C, which are included in the second set of non-contiguous segments in the same left-to-right direction from a minimum extent 1502 to a maximum extent 1504 of the field of view. Such a single direction scan from a minimum extent 1502 to a maximum extent 1504 of the field of view may be achieved using, for example, polygon scanning.

In some embodiments, the common scanning unit is further configured to sequentially illuminate non-contiguous segments in the first set of non-contiguous segments in a first direction from a minimum to a maximum extent of the field of view, and sequentially illuminate non-contiguous segments in the second set of non-contiguous segments in a second direction opposite to the first direction. As discussed above, the common scanning unit may be configured to rotate about a scan axis such that the plurality of laser beams directed by the common scanning unit towards the field of view traverse the field of view in a direction from a minimum extent of the field of view to a maximum extent of the field of view. It is contemplated that the common scanning unit may also be configured to rotate about the scan axis such that the plurality of laser beams may traverse the field of view in a direction from a maximum extent of the field of view towards the minimum extent of the field of view. By way of example, as illustrated in FIG. 15A, the common scanning unit may be configured to rotate about the scan axis such that the plurality of laser beams traverse the field of view 1500 from a minimum extent 1502 (e.g., left-most end) to a maximum extent 1504 (e.g., right-most end) in a first direction during the first scan. It is contemplated that in some embodiments in a subsequent scan the common scanning unit may be configured to rotate about the scan axis such that the plurality of laser beams traverse the field of view 1500 from a maximum extent 1504 (e.g., right-most end) to a minimum extent 1502 (e.g., left-most end) in a second direction during a second scan. For example, as discussed above, the common scanning unit may be configured to cause the plurality of laser beams to traverse the field of view in a left-to-right direction. As also discussed above, the common scanning unit may be configured to scan along the scan lines more than once by first illuminating non-contiguous segments in a first set of non-contiguous segments and then subsequently illuminating segments in a second set of non-contiguous segments disposed along the scan lines. In some embodiments, the common scanning unit may be configured to rotate about a scan axis such that segments in the first set of non-contiguous segments sequentially illuminated in a direction (e.g., left-to-right direction) and subsequently segments in the second set of non-contiguous segments are illuminated in an opposite direction (e.g., right-to-left direction).

By way of example and referring to FIG. 15B, as discussed above, the common scanning unit may be configured to rotate about a scan axis to sequentially illuminate segments in a first set of non-contiguous segments (e.g., 1A, 1B, 1C) in a left-to-right direction. Furthermore, in some embodiments, the common scanning unit may be configured to rotate about the scan axis to subsequently, sequentially illuminate segments in a second set of non-contiguous segments (e.g., 2A, 2B, 2C in an opposite (e.g., right-to-left direction). Thus, the common scanning unit may be configured to illuminate the segments labeled 1A at time $t_{10}$, segments labeled 1B at time $t_{11}$ after the first time, and segments labeled 1C at a time $t_{12}$ after the time $t_{11}$. After illuminating all the segments included in the first set of non-contiguous segments (e.g., 1A, 1B, 1C, etc., after time $t_{13}$), the common scanning unit may be configured to rotate about a scan axis to illuminate segments included in the second set of non-contiguous segments (e.g., 2C, 2B, 2A) in an opposite (e.g., right-to-left) direction. For example, after illuminating segments 1A, 1B, and 1C in a left-to-right direction, the common scanning unit may be configured to illuminate the segments labeled 2C at time $t_{20}$ after time $t_{13}$, segments labeled 2B at time $t_{21}$ after the second time $t_{20}$, and segments labeled 2A at time $t_{22}$ after the time $t_{21}$. Doing so may reduce the time required to return the common scanning unit to a left-most end (e.g., to minimum extent 1502) of the field of view after scanning each set of non-contiguous segments. That is, the common scanning unit may be configured to illuminate a first set of non-continuous segments in a left-to-right direction, a second set of non-contiguous segments in a right-to-left direction, a third set of non-contiguous segments in a left-to-right direction, and so on.

In some embodiments, the common scanning unit is further configured to simultaneously scan the field of view along the second plurality of scan lines by illuminating non-contiguous segments of the field of view positioned along the second plurality of scan lines. In some embodiment, the common scanning unit is further configured to simultaneously scan the field of view along the second plurality of scan lines by sequentially illuminating a third set of non-contiguous segments of the field of view positioned along the second plurality of scan lines in a scanning direction from a minimum to a maximum extent of the field of view. As discussed above, the common scanning unit may be configured to rotate about a tilt axis in such a way that the plurality of laser beams may be displaced vertically to a second set of locations different from the first set of locations. Further, after rotating about the tilt axis, the common scanning unit to be configured to rotate about the scan axis in such a way that the plurality of laser beams directed at the second set of locations traverse the field of view from a minimum extent (e.g., left-most end) to a maximum extent (e.g., right-most end) of the field of view along a second plurality of scan lines. In some embodiments, the common scanning unit may be configured to illuminate non-contiguous segments disposed along both the first plurality of scan lines and the second plurality of scan lines.

By way of example, FIG. 15A illustrates a field of view 1500 extending from a minimum extent 1502 to a maximum extent 1504. As also illustrated in FIG. 15A, the common scanning unit may be configured to rotate about a scan axis to direct the plurality of laser beams along a first plurality of scan lines c and f. Further, after the plurality of laser beams have traverse the field of view along scan lines c and f, the common scanning unit may be configured to rotate about a tilt axis to direct the plurality of laser beams to a second set of locations disposed along scan lines d and g. FIG. 15B illustrates a plurality of segments of the field of view disposed along one or more of scan lines c, d, e, f., and g. As discussed above, a first set of non-contiguous segments (e.g., 1A, 1B, 1C, etc.) and a second set of non-contiguous segments (e.g., 2A, 2B, 2C, etc.) may be disposed along scan lines c and f. As also illustrated in FIG. 15B, the third set of non-contiguous segments (e.g., 3A, 3B, 3C, etc.) and a fourth set of non-contiguous segments (e.g., 4A, 4B, 4C, etc.) may be disposed along scan lines d and g. In some embodiments, after having illuminated one or more segments in, for example of the first set of non-contiguous segments and/or the second set of non-contiguous segments, the common scanning unit may be configured to illuminate segments included in the third set of non-contiguous segments and/or the fourth set of non-contiguous segments. For example, after having illuminated segments 1A, 1B, 1C, etc., and 2A, 2B, 2C, etc., positioned along the first plurality of scan lines c and f, the common scanning unit may be configured to rotate about the scan axis to sequentially illuminate segments labeled 3A, followed by segments labeled 3B, followed by segments labeled 3C, etc., positioned along the second plurality of scan lines d and g. Thus, the common scanning unit may be configured to simultaneously scan the field of view along the second plurality of scan lines d and g by sequentially illuminating segments included in a third set of non-contiguous segments (e.g., 3A, 3B, 3C, etc.) positioned along the second plurality of scan lines d and g in a left-to-right scanning direction from a minimum extent 1502 (e.g., left-most end) to a maximum extent 1504 (e.g., right-most end) of the field of view. Although both the first plurality of scan lines c and f and the second plurality of scan lines d and g have been described above as being traversed in the same left-to-right direction, the present disclosure is not so limited. For example, in some embodiments the common scanning unit may be configured to illuminate non-contiguous segments disposed along the first plurality of scan lines c and f in a first direction (e.g., left-to-right direction). Subsequently the common set scanning unit may be configured to illuminate non-contiguous segments disposed along the second plurality of scan lines d and g in the second direction (e.g., right-to-left direction). Thus, for example, referring to FIG. 15 B, after having illuminated segments 1A, 1B, 1C, etc., and 2A, 2B, 2C, etc., the common scanning unit may be configured to rotate about the scan axis to sequentially eliminate, for example, segments labeled 3C, followed by segments labeled 3B, and then followed by segments labeled 3A.

In some embodiments, the third set of non-contiguous segments of the field of view positioned along the second plurality of scan lines are offset in the scanning direction relative to the first set of non-contiguous segments of the field of view positioned along the first plurality of scan lines. As discussed above, the common scanning unit may be configured to rotate about a tilt axis in such a way that the plurality of laser beams may be displaced vertically to a second set of locations different from the first set of locations. Further, after rotating about the tilt axis, the common scanning unit to be configured to rotate about the scan axis in such a way that the plurality of laser beams directed at the second set of locations traverse the field of view. In some embodiments, the second set of locations may be offset in a horizontal or scanning direction relative to the first set of locations.

By way of example, FIG. 15A illustrates a field of view 1500 extending from a minimum extent 1502 to a maximum extent 1504. As also illustrated in FIG. 15A, the common scanning unit may be configured to rotate about a scan axis to direct the plurality of laser beams along a first plurality of scan lines c and f. Further, after the plurality of laser beams have traverse the field of view along scan lines c and f, the common scanning unit may be configured to rotate about a tilt axis to direct the plurality of laser beams to a second set of locations disposed along scan lines d and g. FIG. 15C illustrates a plurality of segments of the field of view disposed along one or more of scan lines c, d, e, f, and g. As discussed above, a first set of non-contiguous segments (e.g., 1A, 1B, 1C, etc.) and a second set of non-contiguous segments (e.g., 2A, 2B, 2C, etc.) may be disposed along scan lines c and f. As also illustrated in FIG. 15C, the third set of non-contiguous segments (e.g., 3A, 3B, 3C, etc.) and a fourth set of non-contiguous segments (e.g., 4A, 4B, 4C, etc.) may be disposed along scan lines d and g. Unlike the embodiment illustrated in FIG. 15B, however, in the embodiment illustrated in FIG. 15C, each of the segments labeled 3A, 3B, 3C in scan lines d and g may be offset in the scanning direction relative to segments labeled 1A, 1B, 1C, respectively. For example, as illustrated in FIG. 15C, the segments labeled 3A, 3B, 3C, etc. may be positioned below segments 2A, 2B, 2C, respectively, which are offset by the size of one field-of-view pixel in the scanning direction. In contrast, in the embodiment of FIG. 15B, segments labeled 3A, 3B, 3C, etc. may be positioned below segments 1A, 1B, 1C, respectively. In the embodiment of FIG. 15C, the common scanning unit may be configured to sequentially illuminate the first set of non-contiguous segments (e.g., 1A, 1B, 1C, etc.) followed by the second set of non-contiguous segments (e.g., 2A, 2B, 2C, etc.) disposed along scan lines c and f. Subsequently, the common scanning unit may be configured to sequentially illuminate the third set of non-contiguous segments (e.g., 3A, 3B, 3C, etc.) followed by the fourth set of non-contiguous segments (e.g., 4A, 4B, 4C, etc.). The common scanning unit may be configured to continue scanning by illuminating the fifth set of non-contiguous segments (e.g., 5A, 5B, 5C, etc.) followed by the sixth set of non-contiguous segments (e.g., 6A, 6B, 6C, etc.) and so on. Although the common scanning unit has been described above as sequentially illuminating each set of non-contiguous segments in the left-to-right direction, it is contemplated that the common scanning unit may illuminate one or more of the sets of non-contiguous segments of FIG. 15C in an opposite right-to-left direction.

Figure 15D:
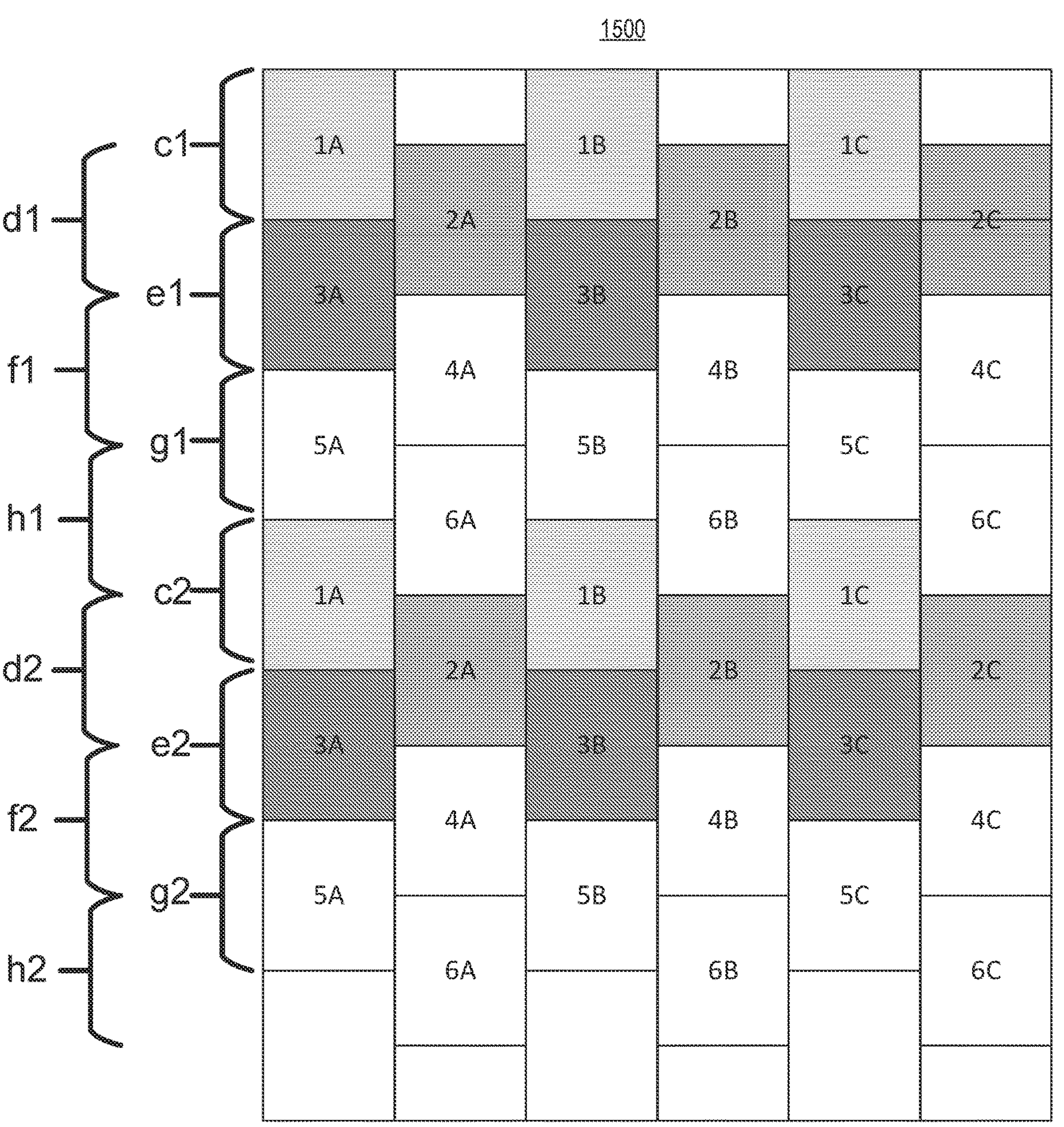
FIG. 15D illustrates another example of a plurality of segments of the field of view disposed along one or more of scan lines of FIG. 15A consistent with some embodiments of the present disclosure.

FIG. 15D illustrates another exemplary method of scanning the field of view by including vertical and horizontal dither while scanning successive sets of scanning lines. As illustrated in FIG. 15D, for example, scan lines c1 through h1 and c2 through h2 may traverse field of view 1500 from a minimum extent 1502 to a maximum extent 1504 of the field of view. As also illustrated in FIG. 15D, a first set of non-contiguous segments (e.g., 1A, 1B, 1C, etc.) may be positioned along scan lines c1 and c2, a second set of non-contiguous segments (e.g., 2A, 2B, 2C, etc.) may be positioned along scan lines the d1 and d2, a third set of non-contiguous segments (e.g., 3A, 3B, 3C, etc.) may be positioned along scan lines e1 and e2, a fourth set of non-contiguous segments (e.g., 4A, 4B, 4C, etc.) may be positioned along scan lines f1 and f2, a fifth set of non-contiguous segments (e.g., 5A, 5B, 5C, etc.) may be positioned along scan lines g1 and g2, and a sixth set of non-contiguous segments (e.g., 6A, 6B, 6C, etc.) may be positioned along scan lines h1 and h2. In some embodiments, for example, the common scanning unit may be configured to rotate about a scan axis to sequentially illuminate segments labeled 1A, followed by segments labeled 1B, followed by segments labeled 1C, etc. in a left-to-right direction along scan lines c1 and c2. After illuminating all the segments positioned along scan lines c1 and c2, the common scanning unit may be configured to rotate about a tilt axis by an amount less than a vertical size of a field-of-view pixel to direct the plurality of laser beams to positions located on, for example, scan lines d1 and d2. Furthermore, the common scanning unit may be configured to rotate about the scan axis to sequentially illuminate segments labeled 2A, followed by segments labeled 2B, followed by segments labeled 2C, etc. in a left-to-right direction along scan lines d1 and d2. The common scanning unit may be configured to similarly sequentially illuminate segments disposed along scanning lines e1 and e2, f1 and f2, g1 and g2, etc. As illustrated in FIG. 15D, segment 2A may be offset (or dithered) from segment 1A in both the vertical and horizontal directions so that at least a portion of segments labeled 2A may overlap with a portion of segments labeled 1A in a vertical direction. Similarly, segment 3A may be offset (or dithered) from segment 2A in both the vertical and horizontal directions so that at least a portion of segments labeled 3A may overlap with a portion of segments labeled 2A in a vertical direction. Scanning the field of view or a portion of the field of view in this manner may allow the common scanning unit to scan certain portions of the field of view multiple times, thereby increasing the resolution in those portions. In contrast to the positioning of the non-contiguous segments in FIG. 15D, in the embodiment illustrated in FIG. 15B, the segments labeled 2A are offset from segments labeled 1A in the scanning direction but not in the tilt direction. Similarly, the segments labeled 3A are offset from segments labeled 1A and 2A in the tilt direction and offset from the segments labeled 2A only in the scanning direction. Thus, the common scanning unit may illuminate segments of the field of view as arranged in FIG. 15B or 15D to obtain an increased resolution in some or all portions of the field of view.

In some embodiments, the common scanning unit is configured perform a first number of scans of the first plurality of scan lines in a region of interest and a second number of scans of the first plurality of scan lines in other regions such that the first number is greater than the second number. As discussed above, the common scanning unit may be configured to direct the plurality of laser beams more than once over a region of interest of the field of view while scanning at a lower resolution in regions outside of the region of interest. As also discussed above, the common scanning unit may be configured to sequentially illuminate non-contiguous segments of the field of view disposed along a plurality of scan lines. In one embodiment, the common scanning unit may be configured to scan a region of interest more times as compared to portions of the field of view that are outside the region of interest. For example, the common scanning unit may be configured to illuminate one or more segments disposed along the one or more scan lines by traversing portions of the field of view outside the region of interest for a first number of times. The common scanning unit may also be configured to illuminate one or more segments disposed along the one or more scan lines by traversing a region of interest in the field of view for a second number of times that may be greater than the first number to times. In some embodiments, a plurality of segments are positioned along the first plurality of scan lines, and the common scanning unit is configured to scan the field of view along the first plurality of scan lines by illuminating all segments of a plurality of segments that are located in a region of interest and by illuminating some segments of a plurality of segments that are located in other regions outside the region of interest.

Figure 16:
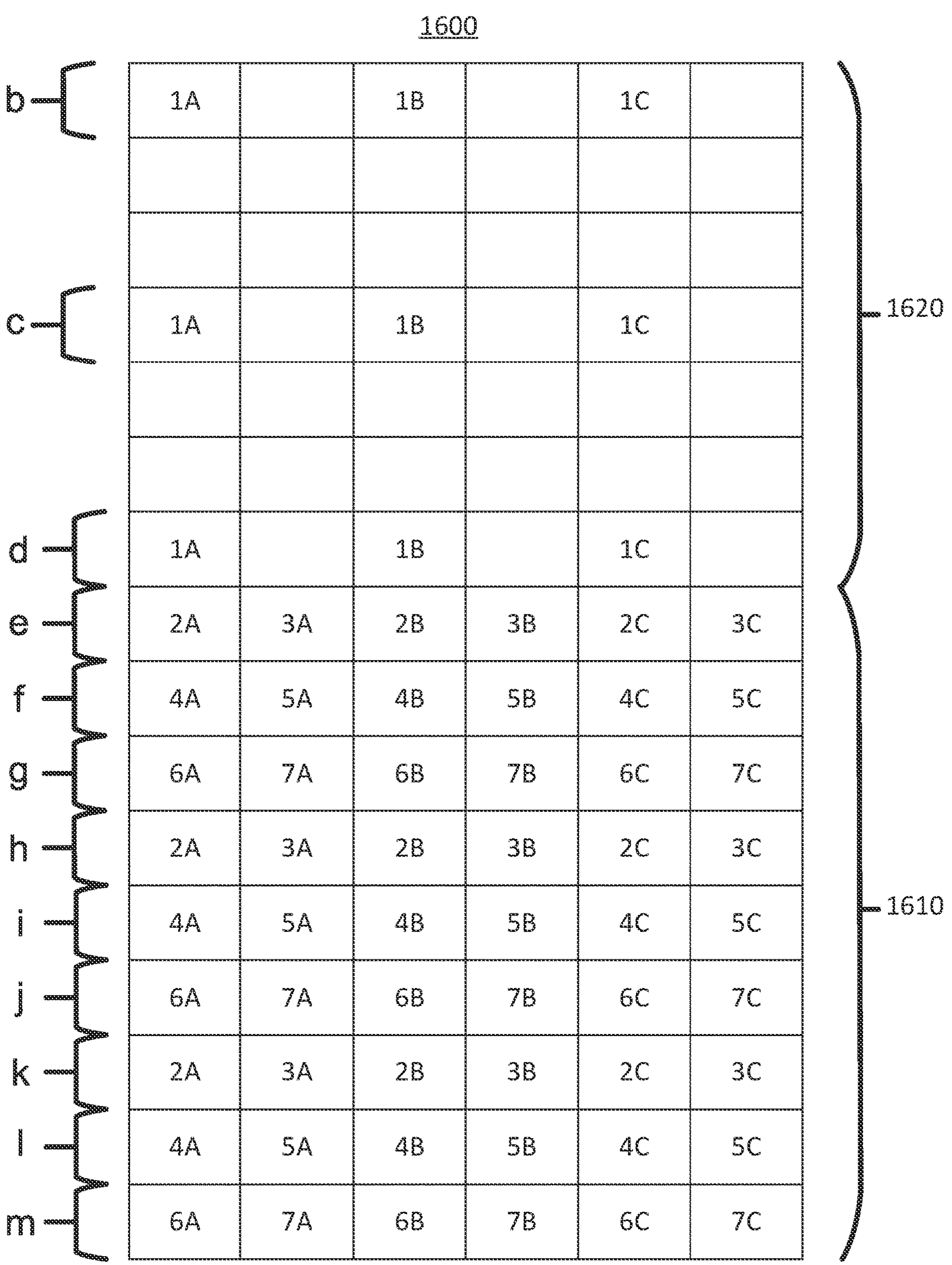
FIG. 16 illustrates another example of a plurality of segments of the field of view disposed along one or more of scan lines of FIG. 15A consistent with some embodiments of the present disclosure.

By way of example, FIG. 16 illustrates a field of view 1600 that includes a region of interest 1610 and portions 1620 outside the region of interest. As also illustrated in FIG. 16, scan lines b, c, and d may traverse the field of view in portions 1620 outside the region of interest, whereas, scan lines d, e, f, g, h, i, j, k, l, and m may traverse the field of view in the region of interest 1610. As illustrated in FIG. 16, in one exemplary embodiment, the common scanning unit may be configured to rotate about the scan axis to sequentially illuminate segments 1A, 1B, 1C, etc., positioned along scan lines b, c, and d in region 1620. Because region 1620 is outside the region of interest, the common scanning unit may be configured to sequentially illuminate segments 1A, 1B, 1C, etc., once, without illuminating any other segments in region 1620. In contrast, in region 1610, as discussed above with respect to FIG. 15B, the common scanning unit may be configured to rotate about the scan axis to sequentially illuminate a first set of non-contiguous segments (e.g., 2A, 2B, 2C) positioned along scan lines e, h, and k, and subsequently illuminate a second set of non-contiguous segments (e.g., 3A, 3B, 3C) also positioned along scan lines scan lines e, h, and k, and occupying occupy intervening portions of the field of view between the segments included in the first set of non-contiguous segments. Thus, the common scanning unit may be configured to traverse scan lines scan lines e, h, and k more than once as compared to scan lines b, c, and d that may be traversed only 1 time. As also illustrated in FIG. 16, the common scanning unit may be configured to rotate about a tilt axis to displace the plurality of laser beams from scan lines e, h, and k to scan lines f, i, and l. After displacing the laser beams, the common scanning unit may be configured to rotate about the scan axis to sequentially illuminate a third set of non-contiguous segments (e.g., 4A, 4B, 4C) positioned along scan lines f, i, and l, and subsequently illuminate a fourth set of non-contiguous segments (e.g., 5A, 5B, 5C) also positioned along scan lines f, i, and l, and occupying intervening portions of the field of view between the segments included in the third set of non-contiguous segments. Thus, the common scanning unit may be configured to perform 1 scan of scan lines b, c, and d in region 1620 and more than one scan of scan lines e, f, g, h, i, j, k, l, and m in region 1610. Furthermore, as discussed above, the common scanning unit may be configured to illuminate only some segments (e.g., 1A, 1B, 1C) along scan lines b, c, and d in region 1620, which lies outside the region of interest, while not illuminating segments disposed between the illuminated segments. In contrast, the common scanning unit may be configured to illuminate all segments (e.g., 2A, 2B, 2C, 3A, 3B, 3C, 4A, 4B, 4C, 5A, 5B, 5C, 6A, 6B, 6C, 7A, 7B, 7C, etc.) along scan lines e, f, g, h, i, j, k, l, and m which traverse the field of view in the region of interest 1610.

In some embodiments, sequentially illuminating non-contiguous segments in the first set of non-contiguous segments includes illuminating a first non-contiguous segment of the first set of non-contiguous segments using a first pulse at a first time; illuminating a second non-contiguous segment of the first set of non-contiguous segments using a second pulse at a second time after the first time; and illuminating a segment of the field of view positioned between the first non-contiguous segment and the second non-contiguous segment, using a third pulse at a time between the first time and the second time. It is contemplated that each of the first pulse and second pulse may include a single pulse or may include a plurality of pulses. Thus, for example, the first pulse may include a single first pulse or a plurality of first pulses emitted over a time period required for the scanning unit to rotate over the extent (or angular span) of a single pixel (or segment) of the FOV. Similarly, for example, the second pulse may include a single second pulse or a plurality of second pulses emitted over the time period required for the scanning unit to rotate over the extent (or angular span) of a single pixel (or segment) of the FOV. Although the above discussion focused on sequentially illuminating non-contiguous segments of a field of view without illuminating intervening segments during illumination of the non-contiguous segments, in some embodiments, the intervening segments may also be illuminated. The laser beam pulses used to illuminate the non-contiguous segments and the intervening segments may be selected such that the total energy that may be incident on an eye in the field of view is still less than the threshold amount making the disclosed LIDAR system eye safe. By way of example, as illustrated in FIG. 15A, the common scanning unit may be configured to rotate about the scan axis such that the plurality of laser beams traverse the field of view 1500 from a minimum extent 1502 (e.g., left-most end) to a maximum extent 1504 (e.g., right-most end). As also discussed above, the common scanning unit may be configured to scan along a plurality of scan lines by sequentially illuminating segments in a set of non-contiguous segments positioned along the scan lines. For example, the common scanning unit may illuminate a first segment of the set of non-contiguous segments using a first laser pulse at a first time. As the common scanning unit rotates about the scan axis, the common scanning unit may be configured to illuminate a second segment separated from the first segment by a third segment. The common scanning unit may be configured to illuminate the second segment, using a second laser pulse at a second time after the first time. In some embodiments, as the common scanning unit rotates about the scan axis, the common scanning unit may be configured to illuminate the third segment, which is disposed between the first and second segments, using a third laser pulse at a time between the first and the second times.

As discussed above, FIG. 15B illustrates the plurality of segments disposed along one or more of scan lines c, d, e, and f. As illustrated in FIG. 15B, a first set of non-contiguous segments disposed along scan lines c and f may include, for example, segments labeled 1A, 1B, and 1C, whereas a second set of non-contiguous segments disposed along scan lines c and f may include, for example, segments labeled 2A, 2B, and 2C. In some embodiments, the common scanning unit may be configured to rotate about the scan axis to sequentially illuminate the non-contiguous segments labeled 1A, 1B, and 1C along the first set of scan lines c and f. For example, the common scanning unit may be configured to illuminate segments labeled 1A along scan lines c and f at a time $t_{10}$, using a first pulse emitted by each of the laser beams directed at segments 1A. The common scanning unit may rotate about a scan axis in a left to right direction. In some embodiments, the third pulse is emitted after the first time after a delay of at least a time of flight associated with the first pulse or the second pulse. As discussed above, an object present in segment 1A of the field of view may reflect the first laser pulse and the reflected laser light may be received by a detector of the LIDAR system. The time period between time $t_{10}$ and the time at which the detector receives the reflected laser light is the time of flight (TOF). A rate of rotation of the common scanning unit may be such that after expiry of the TOF after time $t_{10}$, the common scanning unit may be positioned to direct the laser beams at segments 2A disposed between segments 1A and 2A. In some embodiments, once time TOF has elapsed after time to, the common scanning unit may be configured to illuminate segments 2A disposed between segments 1A and 1B, using a third pulse at a time $t_{20a}$, after time $t_{10}$+TOF. As the common scanning unit continues to rotate about the scan axis, the common scanning unit may be configured to illuminate segments 1B, using a second pulse at time $t_{11}$ after time $t_{20a}$. The common scanning unit may similarly be configured to illuminate segments 2B disposed between segments 1B and 1C. Thus, in this configuration, intervening segments 2A, 2B, 2C may be illuminated between illuminations of the non-contiguous segments of the first set of non-contiguous segments.

The third pulse used to illuminate the intervening segments may be selected such that a total energy entering an eye located in the field of view is still smaller than a standard maximum permissible exposure (MPE), which may be the highest power or energy density (in W/cm2 or J/cm2) of the light directed to a human being that is considered safe, i.e., that has a negligible probability for creating damage. This may be implemented in several ways. Thus, in some embodiments, the third pulse has an energy level between 10 to 200 times less than an energy level of the first pulse or the second pulse. By using a pulse that has a very small energy level to illuminate the intervening segments (e.g., 2A, 2B, 2C in the above example), it may be possible to ensure that an eye present in the field of view is exposed to less than the MPE. In some embodiments, a width of the third pulse is lower than a width of the first pulse or the second pulse. A width of a pulse may refer to a duration or time period for which a particular segment of the FOV may be illuminated by that pulse. In some embodiments, a height of the third pulse is lower than a height of the first pulse or the second pulse. A height of the pulse may refer to a peak or maximum power or energy level associated with the laser light illuminating a particular segment of the FOV. It will also be understood that the height of the pulse may refer to a peak of maximum power associated with a signal received by a detector in response to illumination of a segment of the FOV by the first pulse or the second pulse. The height and/or width of a pulse of a laser beam have an impact on that the total energy of the pulse. Thus, reducing the height and/or the width of the third pulse may reduce the energy of the third pulse. By reducing the energy included in the third pulse, it may be possible to illuminate the intervening segments (e.g., 2A, 2B, 2C in the above example) between illuminations of successive non-contiguous segments of a first set of non-contiguous segments (e.g., 1A, 1B, 1C, etc., in the above example) while still maintaining an eye safe system. Specifically, by reducing an amount of energy in the third pulse, the total amount of energy that may enter an eye present in the field of view may still be lower than the MPE.

Figure 19:
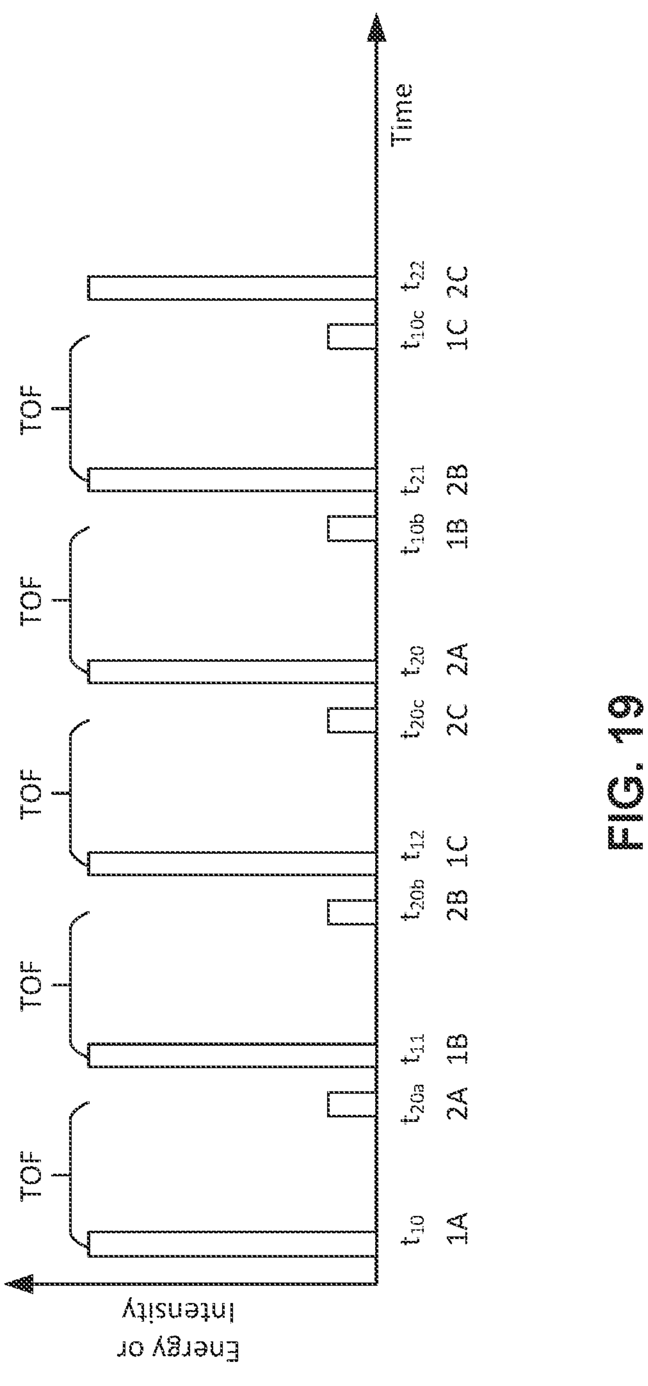
FIG. 19 illustrates an exemplary graph of the energy of laser pulses over time emitted in a region of interest and in regions outside the region of interest consistent with some embodiments of the present disclosure.

FIG. 19 illustrates an example of the illumination scheme described above. In FIG. 19, the intensity (or amount of energy) in each pulse is plotted on the y axis and the x axis represents time. As illustrated in FIG. 19, and with reference to FIG. 15B, the common scanning unit may illuminate segment 1A of the first set of non-contiguous segments, using a relatively high energy pulse (first pulse) at time $t_{10}$. It is also contemplated that instead of a single high energy pulse, segment 1A may be illuminated by a sequence of pulses (e.g., a plurality of pulses). After a TOF associated with the first pulse has elapsed, the common scanning unit may illuminate segment 2A of the second set of non-contiguous segments (and separating segments 1A and 1B), using a relatively low energy pulse (third pulse) at time $t_{20a}$. The TOF may refer to a maximum time-of-flight for a single pixel of the FOV. The maximum time of flight is determined based on the system range, i.e. the time required for light to travel to a target at the maximum range and back to the LIDAR system. Subsequently, the common scanning unit may illuminate segment 1B of the first set of non-contiguous segments using a relatively high energy pulse (second pulse) at time $t_{11}$. After a TOF associated with the third pulse has elapsed, the common scanning unit may illuminate segment 2B of the second set of non-contiguous segments (and separating segments 1B and 1C), using a relatively low energy pulse at time $t_{20b}$. Subsequently, the common scanning unit may illuminate segment 1C of the first set of non-contiguous segments using a relatively high energy pulse at time $t_{12}$. After a TOF has elapsed, the common scanning unit may illuminate segment 2C of the second set of non-contiguous segments, using a relatively low energy pulse at time $t_{20c}$. At this point, for example, illumination of all the segments in the first set of non-contiguous segments (e.g., 1A, 1B, 1C, etc.), using relatively high energy pulses would be complete.

As previously discussed, common scanning unit may next turn to sequentially illuminating the segments in the second set of non-contiguous segments (e.g., 2A, 2B, 2C, etc.), using relatively high energy pulses. Thus, for example, as illustrated in FIG. 19 and with reference to FIG. 15B, the common scanning unit may illuminate segment 2A of the second set of non-contiguous segments, using a relatively high energy pulse at time $t_{20}$ after time $t_{20c}$. After a TOF has elapsed, the common scanning unit may illuminate segment 1B of the first set of non-contiguous segments (and separating segments 2A and 2B), using a relatively low energy pulse (third pulse) at time $t_{20b}$. Subsequently, the common scanning unit may illuminate segment 2B of the second set of non-contiguous segments using a relatively high energy pulse at time $t_{21}$. After a TOF has elapsed, the common scanning unit may illuminate segment 1C of the first set of non-contiguous segments (and separating segments 2B and 2C), using a relatively low energy pulse at time $t_{20c}$. Subsequently, the common scanning unit may illuminate segment 2C of the second set of non-contiguous segments using a relatively high energy pulse at time $t_{22}$. At this point, for example, illumination of all the segments in the second set of non-contiguous segments (e.g., 2A, 2B, 2C, etc.), using relatively high energy pulses would be complete. Although low energy pulses have been described above as being emitted between successive high energy pulses, it is contemplated that in some embodiments, the low energy pulses may be used to illuminate intervening segments after every third, every fourth, every fifth, or every nth high energy pulse (n=1, 2, 3, . . . etc.).

FIGS. 20A, 20B, 20C, and 20D represent various exemplary schemes for using the high and low energy pulses to illuminate non-contiguous segments of the field of view. In FIGS. 20A, 20B, 20C, and 20D, segments being illuminated using relatively high energy pulses are illustrated with dark grey shading, and segments being illuminated using relatively low energy pulses are illustrated in light grey shading. For example, as illustrated in FIG. 20A, the common scanning unit may be configured to sequentially illuminate the segments 1A, 1B, IC, etc. in a first set of non-contiguous segments using relatively high energy pulses. Further, the common scanning unit may be configured to illuminate each of the intervening segments 2A, 2B, 2C, etc. in between respective pairs of segments 1A-1B, 1B-1C, etc. using relatively low energy pulses. After having illuminated all the non-contiguous segments of the first set of non-contiguous segments (1A, 1B, 1C, etc.) using relatively high energy pulses, the common scanning unit may be configured to rescan the scan lines associated with first set of non-contiguous segments. The common scanning unit may do so by sequentially illuminating segments in a second set of non-contiguous segments. To do this, the common scanning unit may follow the scheme shown in FIG. 20B. Thus, for example, while scanning the second set of non-contiguous segments, the common scanning unit may illuminate segments 2A, 2B, 2C using relatively high energy pulses. Further, the common scanning unit may illuminate intervening segments 1B, 1C, etc. in between respective pairs of segments 2A-2B, 2B-2C, etc. using relatively low energy pulses.

After having illuminated all segments in the first set of non-contiguous segments (e.g., 1A, 1B, 1C, etc.) and the second set of non-contiguous segments (e.g., 2A, 2B, 2C), using relatively high energy pulses, the common scanning unit may rotate about a tilt axis so as to direct the plurality of laser beams to segments 3A of a third set of non-contiguous segments. The common scanning unit may illuminate segments of the third set of non-contiguous segments (e.g., 3A, 3B, 3C, etc.), using relative high energy pulses. Further, the common scanning unit may illuminate each of the intervening segments 4A, 4B, 4C, etc. in between respective pairs of segments 3A-3B, 3B-3C, etc. using relatively low energy pulses. After having illuminated all the non-contiguous segments of the third set of non-contiguous segments (3A, 3B, 3C, etc.) using relatively high energy pulses, the common scanning unit may be configured to rescan the scan lines associated with third set of non-contiguous segments. The common scanning unit may do so by sequentially illuminating segments in a fourth set of non-contiguous segments. To do this, the common scanning unit may follow the scheme shown in FIG. 20B. Thus, for example, while scanning the fourth set of non-contiguous segments, the common scanning unit may illuminate segments 4A, 4B, 4C using relatively high energy pulses. Further, the common scanning unit may illuminate intervening segments 3B, 3C, etc. in between respective pairs of segments 4A-4B, 4B-4C, etc. using relatively low energy pulses. Thus, the common scanning unit may alternate between the scheme illustrated in FIGS. 20A and 20B to sequentially illuminate sets of non-contiguous segments along scan lines of the field of view.

FIGS. 20C and 20D show an alternate scheme of illuminating segments of a field of view using relatively high and relatively low energy pulses. As discussed above, segments being illuminated using relatively high energy pulses are illustrated with dark grey shading, and segments being illuminated using relatively low energy pulses are illustrated in light grey shading. In the scheme of FIGS. 20C and 20D, the common scanning unit may sequentially illuminate the first and second sets of non-contiguous segments in the same manner as discussed above for FIGS. 20A and 20B. After having illuminated all segments in the first set of non-contiguous segments (e.g., 1A, 1B, 1C, etc.) and the second set of non-contiguous segments (e.g., 2A, 2B, 2C), using relatively high energy pulses, the common scanning unit may rotate about a tilt axis so as to direct the plurality of laser beams to segments 4A of a fourth set of non-contiguous segments. The common scanning unit may illuminate segments of the fourth set of non-contiguous segments (e.g., 4A, 4B, 4C, etc.), using relative high energy pulses as illustrated in FIG. 20C. Further, the common scanning unit may illuminate each of the intervening segments 3B, 3C, etc. in between respective pairs of segments 4A-4B, 4B-4C, etc. using relatively low energy pulses. After having illuminated all the non-contiguous segments of the fourth set of non-contiguous segments (4A, 4B, 4C, etc.) using relatively high energy pulses, the common scanning unit may be configured to rescan the scan lines associated with fourth set of non-contiguous segments. The common scanning unit may do so by sequentially illuminating segments in a third set of non-contiguous segments. To do this, the common scanning unit may follow the scheme shown in FIG. 20D. Thus, for example, while scanning the third set of non-contiguous segments, the common scanning unit may illuminate segments 3A, 3B, 3C using relatively high energy pulses. Further, the common scanning unit may illuminate intervening segments 4A, 4B, 4C, etc. in between respective pairs of segments 3A-3B, 3B-3C, etc., using relatively low energy pulses. Thus, the common scanning unit may alternate between the scheme illustrated in FIGS. 20C and 20D to sequentially illuminate sets of non-contiguous segments along scan lines of the field of view.

Using relatively low energy pulses to illuminate segments disposed between successive non-contiguous segments has several advantageous effects. For example, the low energy pulses may help to detect blockages closer to the LIDAR system's laser detector. For example, in vehicular applications, the low energy pulses may help to detect items on the windshield of the vehicle (such as blockages or even rain drops). High energy laser pulses when reflected by the blockages on the windshield tend to saturate the detector making it difficult to identify the object located on the windshield (e.g., at a distance closer to the detector). In contrast, the amount of detector saturation is significantly reduced with the low energy pulses.

The low energy pulses may also help to overcome effects of blooming. When non-contiguous segments of the field of view are illuminated, any reflections from those segments are detected by non-contiguous segments of the detector. However, even when the segments intervening between the non-contiguous segments are not illuminated, intervening detector segments disposed between the corresponding non-continuous segments of the detector may still generate spurious signals corresponding to reflected light. This phenomenon is called blooming of the detector. Illuminating the segments intervening between the non-contiguous segments, using low energy pulses causes the intervening detector segments disposed between the corresponding non-continuous segments of the detector to detect the reflected low energy pulses. These signals of the detector segments disposed between the corresponding non-continuous segments of the detector may be compared with the spurious signals to determine whether those signals correspond to a real object in the field of view. Thus, the use of low energy pulses to illuminate the segments separating successive non-contiguous segments of a field of view may help overcome problems associated with blooming.

Figure 21:
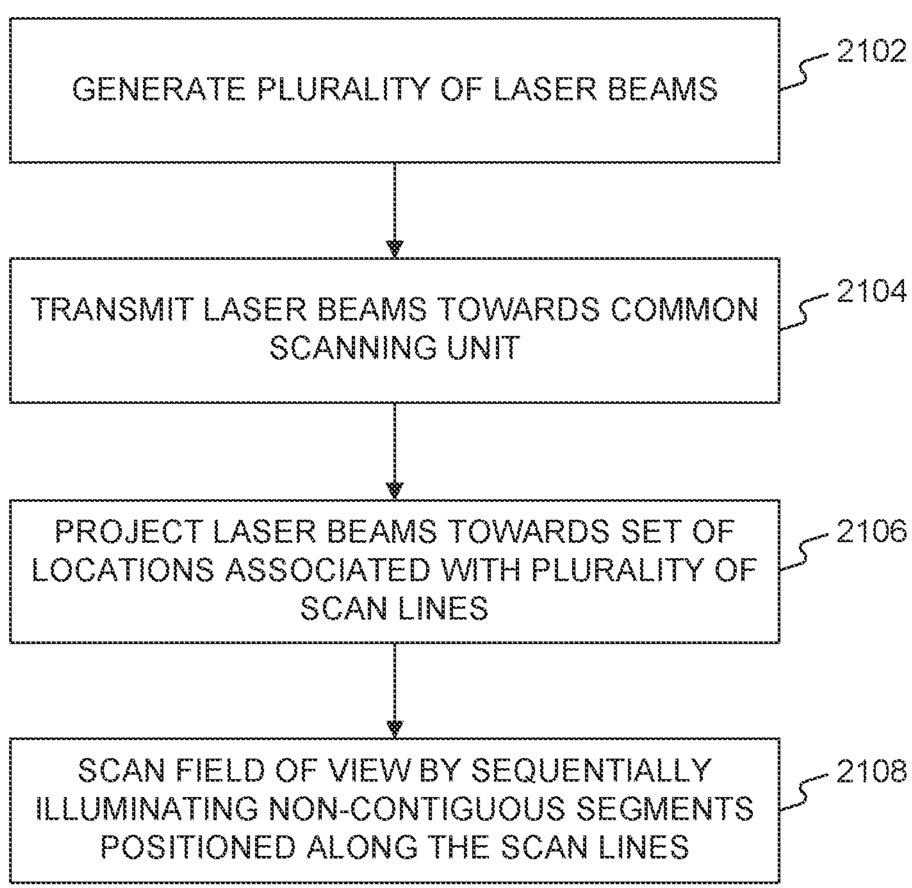
FIG. 21 is a flowchart illustrating an exemplary process for operating a LIDAR system consistent with some embodiments of the present disclosure.

FIG. 21 is a flowchart illustrating an exemplary process 2100 for operating a LIDAR system consistent with disclosed embodiments. One or more steps of process 2100 may be performed by LIDAR system 700 via one or more components thereof (e.g., processing unit 108, processor 118).

Method 2100 includes a step 2102 of generating a plurality of laser beams. As discussed above, LIDAR system 100 may include laser emission unit 102 (e.g., projecting unit). LIDAR system 100 may include laser emission unit 102 configured to emit two or more beams of laser light (see e.g., FIG. 2B). It is contemplated that in some embodiments, LIDAR system 100 may include a laser light source in the form of a laser array, and the laser array may include two or more laser emitters. Various laser sources may be employed. For example, the plurality of laser beams may be generated by multiple laser emitters, a laser bar/array, or by one or more laser beam split into multiple laser beams. It is also contemplated that in some embodiments, LIDAR system 100 may include one or more beam splitters configured to split the one or more laser beams emitted by laser emission unit 102 into a plurality of laser beams.

Method 2100 includes a step 2104 of transmitting the laser beams towards a common scanning unit. As discussed above, LIDAR system 100 may include one or more optical elements, for example, collimating lenses, mirrors, prisms, or other optical elements to transmit the laser beams generated by laser emission unit 102 towards a common scanning unit. For example, as illustrated in FIG. 7A, laser beams 714 generated by a laser array 712 may be directed to the scanning mirrors 721 (e.g., a MEMs scanner, or common scanning unit) by a system of lenses 716 and folding mirrors 718 (e.g., optical system 710).

Method 2100 includes a step 2106 of projecting laser beams towards a set of locations associated with a plurality of scan lines. As discussed above, the LIDAR system may include a common scanning unit configured to receive the plurality of laser beams, wherein the common scanning unit is configured to project the plurality of laser beams toward a field of view of the LIDAR system. For example, as illustrated in FIGS. 7A and 8, LIDAR system 100 may include a common scanning unit (e.g., 721, 860). Common scanning unit 721, 860 may include a variety of optical components configured to direct laser light towards the field of view. For example, scanning unit 721, 860 may include one or more light-transmissive scanning prisms, diffraction elements, liquid crystal deflectors, MEMs mirrors, etc. As also discussed above, the two or more beams, resultant from beam splitter (e.g., 221 or 1110) or the laser array (900, 950, etc.) may be made incident on a scanning mirror device (e.g., 721, 860). Common scanning unit 721, 860 may be configured to direct the plurality of light beams towards a plurality of locations of a field of view. By way of example, FIG. 9 illustrates a plurality of parallel scan lines 921, 923, 925, 927 that may traverse the field of view 900 horizontally from a left-most end 902 (e.g., minimum extent of the field of view) to a right-most end 904 (e.g., maximum extent of the field of view). As also illustrated in FIG. 9, scan lines 921, 923, 925, 927 are associated with the plurality of vertically spaced apart locations 906, 908, 910, 912, respectively.

Method 2100 includes a step 2108 of scanning the field of view by sequentially illuminating non-contiguous segments positioned along the scan lines. As discussed above, a field of view of the disclosed LIDAR system may be divided into plurality of segments that may be disposed along each of the plurality of scan lines. To avoid damage to a human eye present in the field of view, the disclosed LIDAR system may illuminate non-contiguous segments disposed along each of the plurality of scan lines. The plurality of segments disposed along a particular scan line may be divided into several sets of non-contiguous segments. For example, a first set of non-contiguous segments may include segments disposed along the scan line and separated by one or more other segments. As one example the first set of non-contiguous segments may include every alternate, every third, every fourth, or every nth segment selected from the plurality of segments disposed along the scan line. By way of example, FIG. 14 illustrates a plurality of segments (e.g., 1410, 1412, 1414, 1416, 1418, 1421, 1424, 1426, 1428, etc.) disposed along scan line 1402. A first set of non-contiguous segments selected from these plurality of segments may include, for example, segments 1410, 1416, 1422, 1428, such that each pair of segments in this set of non-contiguous segments is separated by at least two other segments. For example, non-contiguous segments 1410 and 1416 are separated by segments 1412 and 1414. Similarly, non-contiguous segments 1416 and 1422 are separated by segments 1418 and 1421. It is contemplated that the plurality of segments disposed along a scan line may be divided into the plurality of sets of non-contiguous segments. For example, in the illustration of FIG. 14, a second set of non-contiguous segments may include segments 1412, 1418, 1424, etc. As seen in FIG. 14, the pair of segments 1412 and 1418 in the second set of non-contiguous segments may be separated by segments 1414 and 1416. Likewise the pair of segments 1418 and 4024 in the second set of non-contiguous segments may be separated by segments 1421 and 1422.

To avoid damage to a human eye present in the field of view, the common scanning unit may be configured to sequentially illuminate non-contiguous segments 1410, 1416, 1422, 1428, without illuminating intervening segments 1412, 1414, 1418, 1421, 1424, and 1426. After the sequentially illumination of the first set of non-contiguous segments (e.g., segments 1410, 1416, 1422, 1428), the common scanning unit may be configured to sequentially illuminate segments 1412, 1418, 1424, 1430, etc., in the second set of non-contiguous segments. Although only one scan line 1402 has been described above, it is contemplated that each of the plurality of scan lines (e.g., scan lines 921, 923, 925, 927 of FIG. 9) may include a plurality of segments, and further each of the plurality of scan lines (e.g., scan lines 921, 923, 925, 927 of FIG. 9) may include one or more sets of non-contiguous segments as described above. Scanning the field of view by sequentially illuminating non-contiguous segments positioned along the scan lines may additionally or alternatively be performed by any of the other methods of illuminating non-contiguous segments as described elsewhere in this disclosure.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A LIDAR system, comprising:

a laser emission unit configured to generate a first plurality of laser beams;

a common scanning unit; and an optical system configured to transmit the first plurality of laser beams received from the laser emission unit towards the common scanning unit, wherein the common scanning unit is configured to simultaneously scan the first plurality of laser beams over a field of view of the LIDAR system along a second plurality of parallel scan lines traversing the field of view in a first direction, including at least first and second groups of the scan lines, such that the scan lines in the first group of the parallel scan lines are separated from one another along a second direction, perpendicular to the first direction, by the scan lines in at least the second group of the parallel scan lines, wherein each of the scan lines is divided into multiple sets of non-contiguous segments, including at least first and second sets, such that the segments of each scan line in the first set of the non-contiguous segments are separated from one another along the first direction by the segments in at least the second set of the non-contiguous segments, and wherein the common scanning unit is further configured to simultaneously scan the field of view along the first group of the scan lines followed by simultaneously scanning the field of view along the second group of the scan lines and within each of the scan lines sequentially illuminating the noncontiguous segments in the first set of the non-contiguous segments along the scan lines followed by illuminating the non-contiguous segments in the second set of the non-contiguous segments along the scan lines so that the illuminated non-contiguous segments are separated from one another along both the first and second directions.

2. The LIDAR system of claim 1, wherein each non-contiguous segment in the second set of non-contiguous segments is contiguous with a non-contiguous segment in the first set of non-contiguous segments.

3. The LIDAR system of claim 2, wherein the common scanning unit is further configured to initiate sequential illumination of the non-contiguous segments in the first set of non-contiguous segments at a first time, and initiate sequential illumination of the non-contiguous segments in the second set of non-contiguous segments at a second time, wherein the second time is after the first time, and wherein a difference between the first time and the second time corresponds to an elapsed time period for sequentially illuminating all the non-contiguous segments in the first set of non-contiguous segments.

4. The LIDAR system of claim 1, wherein the common scanning unit is further configured to sequentially illuminate the non-contiguous segments in both the first set of non-contiguous segments and the second set of non-contiguous segments in a same direction from a minimum to a maximum extent of the field of view.

5. The LIDAR system of claim 1, wherein the common scanning unit is further configured to sequentially illuminate the non-contiguous segments in the first set of non-contiguous segments in a forward direction from a minimum to a maximum extent of the field of view, and sequentially illuminate the non-contiguous segments in the second set of non-contiguous segments in a backward direction opposite to the forward direction.

6. The LIDAR system of claim 1, wherein a displacement between the first group of the parallel scan lines and the second group of the parallel scan lines is a fraction of a size of a field-of-view pixel.

7. The LIDAR system of claim 1, wherein the common scanning unit is further configured to simultaneously scan the field of view along the second group of the parallel scan lines by illuminating the non-contiguous segments of the field of view positioned along the second group of the parallel scan lines.

8. The LIDAR system of claim 1, wherein the common scanning unit is further configured to simultaneously scan the field of view along the second group of the parallel scan lines by sequentially illuminating a third set of non-contiguous segments of the field of view positioned along the second group of the parallel scan lines in a scanning direction from a minimum to a maximum extent of the field of view.

9. The LIDAR system of claim 8, wherein the third set of non-contiguous segments of the field of view are offset in the scanning direction relative to the first set of non-contiguous segments of the field of view.

10. The LIDAR system of claim 1, wherein at least one scan line of the second group of the parallel scan lines is spatially located between two scan lines included in the first group of the parallel scan lines.

11. The LIDAR system of claim 1 wherein none of the second group of the parallel scan lines is spatially located between scan lines of the first group of the parallel scan lines.

12. The LIDAR system of claim 1 wherein the second group of the parallel scan lines overlap with the first group of the parallel scan lines.

13. The LIDAR system of claim 12, wherein an amount of overlap between the first group of the parallel scan lines and the second group of the parallel scan lines is higher in a region of interest of the field of view as compared to other regions of the field of view.

14. The LIDAR system of claim 1, wherein the common scanning unit is configured perform a first number of scans of the first group of the parallel scan lines in a region of interest and a second number of scans of the first group of the parallel scan lines in other regions such that the first number is greater than the second number.

15. The LIDAR system of claim 1, wherein a third plurality of the non-contiguous segments are positioned along the first group of the parallel scan lines, and the common scanning unit is configured to scan the field of view along the first group of the parallel scan lines by illuminating all the segments of the third plurality that are located in a region of interest and by illuminating some of the segments of the third plurality that are located in other regions outside the region of interest.

16. The LIDAR system of claim 1, wherein the non-contiguous segments in the first set of non-contiguous segments are separated by regions having a size that is a multiple of a size of a field-of-view pixel.

17. The LIDAR system of claim 1, wherein the common scanning unit includes a single biaxial scanning mirror upon which the first plurality of laser beams are made incident.

18. The LIDAR system of claim 17, wherein the biaxial scanning mirror is rotatable in two axes, the two axes including a tilt axis and a scanning axis.

19. The LIDAR system of claim 17, wherein rotation of the biaxial scanning mirror about the scanning axis causes movement of the first plurality of laser beams along the first group of the parallel scan lines traversing the field of view of the LIDAR system, and rotation of the biaxial scanning mirror about the tilt axis causes displacement of the first plurality of laser beams from a first set of locations associated with the first group of the parallel scan lines to a second set of locations associated with the second group of the parallel scan lines.

20. The LIDAR system of claim 1, wherein the common scanning unit includes one of a biaxial scanner, a combination of a single axis mirror and a polygon, or a single axis scanner mounted on a rotating element.

21. The LIDAR system of claim 1, wherein the common scanning unit includes a first single axis scanning mirror and a second single axis scanning mirror, and wherein the first plurality of laser beams are made incident upon the first single axis scanning mirror before proceeding to the second single axis scanning mirror.

22. The LIDAR system of claim 21, wherein the first single axis scanning mirror is configured to rotate about a scanning axis to cause movement of the first plurality of laser beams along the first plurality of scan lines traversing the field of view of the LIDAR system, and the first single axis scanning mirror is configured to rotate about a tilt axis to cause displacement of the first plurality of laser beams from a first set of locations associated with the first group of the parallel scan lines to second set of locations associated with the second group of the parallel scan lines.

23. The LIDAR system of claim 1, wherein sequentially illuminating non-contiguous segments in the first set of non-contiguous segments includes:

illuminating a first non-contiguous segment of the first set of non-contiguous segments using a first pulse at a first time;

illuminating a second non-contiguous segment of the first set of non-contiguous segments using a second pulse at a second time after the first time; and illuminating a third non-contiguous segment of the field of view positioned between the first non-contiguous segment and the second non-contiguous segment, using a third pulse at a time between the first time and the second time.

24. The LIDAR system of claim 23, wherein the third pulse has an energy level between 10 to 200 times less than an energy level of the first pulse or the second pulse.

25. The LIDAR system of claim 23, wherein a width of the third pulse is lower than a width of the first pulse or the second pulse.

26. The LIDAR system of claim 23, wherein a height of the third pulse is lower than a height of the first pulse or the second pulse.

27. The LIDAR system of claim 23, wherein the third pulse is emitted after the first time after a delay of at least a time of flight associated with the first pulse or the second pulse.

28. A method of operating a LIDAR system, comprising:

generating, using a laser emission unit, a first plurality of laser beams;

transmitting, using an optical system, the first plurality of laser beams received from the laser emission unit towards a common scanning unit;

projecting, using the common scanning unit, the first plurality of laser beams over a field of view of the LIDAR system along a second plurality of parallel scan lines traversing the field of view in a first direction, including at least first and second groups of the scan lines, such that the scan lines in the first group of the parallel scan lines are separated from one another along a second direction, perpendicular to the first direction by the scan lines in at least the second group of the parallel scan lines, wherein each of the scan lines is divided into multiple sets of non-contiguous segments, including at least first and second sets, such that the segments of each scan line in the first set of the non-contiguous segments are separated from one another along the first direction by the segments in at least the second set of the non-contiguous segments; and simultaneously scanning, using the common scanning unit, the field of view along the first group of the scan lines followed by simultaneously scanning the field of view along the second group of the scan lines and within each of the scan lines sequentially illuminating the noncontiguous segments in the first set of the non-contiguous segments along the scan lines followed by illuminating the non-contiguous segments in the second set of the non-contiguous segments along the scan lines so that the illuminated non-contiguous segments are separated from one another along both the first and second directions.

* * * * *